(12) United States Patent
Ho et al.

(10) Patent No.: US 12,716,139 B2
(45) Date of Patent: Aug. 25, 2026

(54) CATALYST, ITS PREPARATION AND ITS USE IN AMMONIA SYNTHESIS

(71) Applicant: City University of Hong Kong, Kowloon (HK)

(72) Inventors: Johnny Chung Yin Ho, Shatin (HK); Dong Chen, Kowloon (HK); Shaoce Zhang, Kowloon (HK)

(73) Assignee: City University of Hong Kong, Kowloon (HK)

( * ) Notice: Subject to any disclaimer, the term of this patent is extended or adjusted under 35 U.S.C. 154(b) by 653 days.

(21) Appl. No.: 18/187,912

(22) Filed: Mar. 22, 2023

(65) Prior Publication Data

US 2024/0318335 A1 Sep. 26, 2024

(51) Int. Cl.

*C25B 11/091* (2021.01)
*B01J 19/08* (2006.01)
*C25B 1/27* (2021.01)
*C25B 9/17* (2021.01)

(52) U.S. Cl.

CPC ........... *C25B 11/091* (2021.01); *B01J 19/088* (2013.01); *C25B 1/27* (2021.01); *C25B 9/17* (2021.01); *B01J 2219/0843* (2013.01); *B01J 2219/0877* (2013.01); *B01J 2219/0892* (2013.01)

(58) Field of Classification Search

CPC . C25B 11/091; C25B 1/27; C25B 9/17; B01J 19/088; B01J 2219/0843; B01J 2219/0877; B01J 2219/0892

See application file for complete search history.

(56) References Cited

U.S. PATENT DOCUMENTS

2014/0335407 A1 11/2014 Yao et al.

FOREIGN PATENT DOCUMENTS

CN 114242886 3/2022
KR 101273495 6/2013

OTHER PUBLICATIONS

Chia, "Layered SnS versus SnS2: Valence and Structural Implications on Electrochemistry and Clean Energy Electrocatalysis", The Journal of Physical Chemistry C, pp. 24098-24111, 2016 (Year: 2016).*

Yu "Enhanced electrocatalytic nitrogen reduction activity by incorporation of a carbon layer on SnS microflowers", Journal of Materials Chemistry A, Issue 39, 2020 (Year: 2020).*

Wang "The optical properties of Ce-doped SnS quantum dots with fast nanosecond lifetime", Journal of Alloys and Compounds, vol. 799, pp. 425-432, 2019 (Year: 2019).*

(Continued)

*Primary Examiner* — Anthony J Zimmer
*Assistant Examiner* — Jaanzeb C Raja
(74) *Attorney, Agent, or Firm* — Renner, Kenner, Greive, Bobak, Taylor & Weber

(57) ABSTRACT

A catalyst in ammonia synthesis includes a first layer of metal monochalcogenide-based material; a second layer of metal monochalcogenide-based material stacked with and is spaced from the first layer of metal monochalcogenide-based material by a first distance; wherein the metal monochalcogenide-based material includes SnS. A method of preparing the catalyst and an electrochemical ammonia synthesizing device making use of the catalyst thereof are also addressed.

16 Claims, 74 Drawing Sheets
(5 of 74 Drawing Sheet(s) Filed in Color)

(56) References Cited

OTHER PUBLICATIONS

Su "Ce-Doped Sns Quantum Dots Sensitized SnS2 Nanocomposites for NO2 Monitoring", ECS Meeting Abstracts, vol. MA2020-01, 2020 (Year: 2020).*
K. Qi, X. Cui, L. Gu, S. Yu, X. Fan, M. Luo, S. Xu, N. Li, L. Zheng, Q. Zhang, Nat. Commun. 2019, 10, 1.
Y. Zheng, T. Deng, N. Yue, W. Zhang, X. Zhu, H. Yang, X. Chu, W. Zheng, J. Raman Spectrosc. 2021, 52, 2119.
D. Philip, A. Eapen, G. Aruldhas, J. Solid State Chem. 1995, 116, 217.
M. Asadi, B. Kumar, A. Behranginia, B. A. Rosen, A. Baskin, N. Repnin, D. Pisasale, P. Phillips, W. Zhu, R. Haasch, Nat. Commun. 2014, 5, 1.
S. Sun, X. Zhou, B. Cong, W. Hong, G. Chen, ACS Catal. 2020, 10, 9086.
Z. Chen, Y. Song, J. Cai, X. Zheng, D. Han, Y. Wu, Y. Zang, S. Niu, Y. Liu, J. Zhu, Angew. Chem. Int. Ed. 2018, 130, 5170.
S. He, F. Ni, Y. Ji, L. Wang, Y. Wen, H. Bai, G. Liu, Y. Zhang, Y. Li, B. Zhang, Angew. Chem. Int. Ed. 2018, 130, 16346.
H. Shin, Y. Ha, H. Kim, J. Phys. Chem. Lett. 2016, 7, 4124.
Y. Ding, M. Zeng, Q. Zheng, J. Zhang, D. Xu, W. Chen, C. Wang, S. Chen, Y. Xie, Y. Ding. Bidirectional and reversible tuning of the interlayer spacing of two-dimensional materials. Nature communications, 2021, 12(1): 1-7. DOI: 10.1038/s41467-021-26139-5.
Simon P. Two-dimensional MXene with controlled interlayer spacing for electrochemical energy storage. ACS nano, 2017, 11(3): 2393-2396. DOI: 10.1021/acsnano.7b01108.
Zhu, J., Hou, J., Uliana, A., Zhang, Y., Tian, M., Van der Bruggen, B. The rapid emergence of two-dimensional nanomaterials for high-performance separation membranes. Journal of Materials Chemistry A, 2018, 6(9), 3773-3792. DOI: 10.1039/C7TA10814A.
Yu, Z., Si, C., LaGrow, A. P., Tai, Z., Caliebe, W. A., Tayal, A., Sampaio M. J., Sousa, J. P. S, Amorim, I., Araujo, A., Meng, L., Faria, J. L., Xu, J., Li, B., Liu, L., Liu, L. Iridium-Iron Diatomic Active Sites for Efficient Bifunctional Oxygen Electrocatalysis. ACS Catalysis, 2022, 12(15), 9397-9409. DOI: 10.1021/acscatal.2c01861.
Shi, Y., Li, Z., Wang, J., Zhou, R. Synergistic effect of Pt/Ce and USY zeolite in Pt-based catalysts with high activity for VOCs degradation. Applied Catalysis B: Environmental, 2021, 286, 119936. DOI: 10.1016/j.apcatb.2021.119936.
D. Zhu, L. Zhang, R. E. Ruther, R. J. Hamers, Nature mater. 2013, 12, 836.
L. C. Green, D. A. Wagner, J. Glogowski, P. L. Skipper, J. S. Wishnok, S. R. Tannenbaum, Anal. Biochem. 1982, 126, 131.
G. W. Watt, J. D. Chrisp, Anal. Chem. 1952, 24, 2006.
J. P. Perdew, K. Burke, M. Ernzerhof, Phys. Rev. Lett. 1996, 77, 3865.
D. Hamann, M. Schluter, C. Chiang, Phys. Rev. Lett. 1979, 43, 1494.
S. Liu, T. Qian, M. Wang, H. Ji, X. Shen, C. Wang, C. Yan, Nat. Catal. 2021, 4, 322.
N. Zhang, J. Shang, X. Deng, L. Cai, R. Long, Y. Xiong, Y. Chai, ACS nano 2022.
Z. Gao, Y. Lai, Y. Tao, L. Xiao, L. Zhang, F. Luo, ACS Cent. Sci. 2021.
X. Zhang, G. Ma, L. Shui, G. Zhou, X. Wang, Chem. Eng. J. 2022, 430.
Q. Hu, Y. Qin, X. Wang, Z. Wang, X. Huang, H. Zheng, K. Gao, H. Yang, P. Zhang, M. Shao, C. He, Energy Environ. Sci. 2021.
Z. Y. Wu, M. Karamad, X. Yong, Q. Huang, D. A. Cullen, P. Zhu, C. Xia, Q. Xiao, M. Shakouri, F. Y. Chen, J. Y. T. Kim, Y. Xia, K. Heck, Y. Hu, M. S. Wong, Q. Li, I. Gates, S. Siahrostami, H. Wang, Nat Commun 2021, 12, 2870.
X. Zhao, Z. Zhu, Y. He, H. Zhang, X. Zhou, W. Hu, M. Li, S. Zhang, Y. Dong, X. Hu, Chem. Eng. J. 2022, 433, 133190.
F. Lei, W. Xu, J. Yu, K. Li, J. Xie, P. Hao, G. Cui, B. Tang, Chem. Eng. J. 2021, 426, 131317.
Y. Xu, K. Ren, T. Ren, M. Wang, Z. Wang, X. Li, L. Wang, H. Wang, Appl. Catal. B 2022, 306.
R. Jia, Y. Wang, C. Wang, Y. Ling, Y. Yu, B. Zhang, ACS Catal. 2020, 10, 3533.
Y. Zhang, X. Chen, W. Wang, L. Yin, J. C. Crittenden, Appl. Catal. B 2022, 121346.
P. Li, W. Fu, P. Zhuang, Y. Cao, C. Tang, A. B. Watson, P. Dong, J. Shen, M. Ye, Small 2019, 15, 1902535.
H. Liu, X. Cao, L. X. Ding, H. Wang, Adv. Funct. Mater. 2022, 32, 2111161.
W. Yu, F. Shu, Y. Huang, F. Yang, Q. Meng, Z. Zou, J. Wang, Z. Zeng, G. Zou, S. Deng, J. Mater. Chem. 2020, 8, 20677.
K. Chu, Y.-p. Liu, Y.-b. Li, J. Wang, H. Zhang, ACS Appl. Mater. Interfaces 2019, 11, 31806.
Y.-p. Liu, Y.-b. Li, H. Zhang, K. Chu, Inorg. Chem. 2019, 58, 10424.
P. Wang, Y. Ji, Q. Shao, Y. Li, X. Huang, Science Bulletin 2020, 65, 350.
X. Hu, Y. Sun, S. Guo, J. Sun, Y. Fu, S. Chen, S. Zhang, J. Zhu, Appl. Catal. B 2021, 280, 119419.
Y. Deng, Z. Xiao, Z. Wang, J. Lai, X. Liu, D. Zhang, Y. Han, S. Li, W. Sun, L. Wang, Appl. Catal. B 2021, 291, 120047.
L. Ye, R. Nayak-Luke, R. Banares-Alcantara, E. Tsang, Chem 2017, 3, 712.
V. Kyriakou, I. Garagounis, A. Vourros, E. Vasileiou, M. Stoukides, Joule 2020, 4, 142.
H. Jin, L. Li, X. Liu, C. Tang, W. Xu, S. Chen, L. Song, Y. Zheng, S. Z. Qiao, Adv. Mater. 2019, 31, 1902709.
X. Zhao, G. Hu, G. F. Chen, H. Zhang, S. Zhang, H. Wang, Adv. Mater. 2021, 33, 2007650.
K. P. Ramaiyan, S. Ozden, S. Maurya, D. Kelly, S. K. Babu, A. Benavidez, F. G. Garzon, Y. S. Kim, C. R. Kreller, R. Mukundan, J. Electrochem. Soc. 2020, 167, 044506.
Y. Guo, R. Zhang, S. Zhang, Y. Zhao, Q. Yang, Z. Huang, B. Dong, C. Zhi, Energy Environ. Sci. 2021, 14, 3938.
R. Zhang, Y. Guo, S. Zhang, D. Chen, Y. Zhao, Z. Huang, L. Ma, P. Li, Q. Yang, G. Liang, Adv. Energy Mater. 2022, 2103872.
W. He, J. Zhang, S. Dieckhofer, S. Varhade, A. C. Brix, A. Lielpetere, S. Seisel, J. R. Junqueira, W. Schuhmann, Nat. Commun. 2022, 13, 1.
H. Liu, X. Lang, C. Zhu, J. Timoshenko, M. Ruscher, L. Bai, N. Guijarro, H. Yin, Y. Peng, J. Li, Angew. Chem. Int. Ed. 2022, e202202556.
G.-F. Chen, Y. Yuan, H. Jiang, S.-Y. Ren, L.-X. Ding, L. Ma, T. Wu, J. Lu, H. Wang, Nat. Energy 2020, 5, 605.
M. Bajdich, M. García-Mota, A. Vojvodic, J. K. Nørskov, A. T. Bell, J. Am. Chem. Soc. 2013, 135, 13521.
T. Hu, C. Wang, M. Wang, C. M. Li, C. Guo, ACS Catal. 2021, 11, 14417.
Y. Zhang, F. Gao, H. You, Z. Li, B. Zou, Y. Du, Coord. Chem. Rev. 2022, 450, 214244.
D. Schilter, Nat. Rev. Chem. 2018, 2, 1.
W. Qian, S. Xu, X. Zhang, C. Li, W. Yang, C. R. Bowen, Y. Yang, Nano-Micro Lett. 2021, 13, 1.
F. Gao, Y. Zhang, F. Ren, Y. Shiraishi, Y. Du, Adv. Funct. Mater. 2020, 30, 2000255.
F. Gao, Y. Zhang, Z. Wu, H. You, Y. Du, Coord. Chem. Rev. 2021, 436, 213825.
P. Thangasamy, S. Oh, S. Nam, I.-K. Oh, Carbon 2020, 158, 216.
J. Liang, S. Ma, J. Li, Y. Wang, J. Wu, Q. Zhang, Z. Liu, Z. Yang, K. Qu, W. Cai, J. Mater. Chem. 2020, 8, 10426.
Q. Fu, H. Saltsburg, M. Flytzani-Stephanopoulos, Science 2003, 301, 935.
Y. Nagai, T. Hirabayashi, K. Dohmae, N. Takagi, T. Minami, H. Shinjoh, S. Matsumoto, J. Catal. 2006, 242, 103.
M. Yoo, Y.-S. Yu, H. Ha, S. Lee, J.-S. Choi, S. Oh, E. Kang, H. Choi, H. An, K.-S. Lee, Energy Environ. Sci. 2020, 13, 1231.
A. Beniya, S. Higashi, Nat. Catal. 2019, 2, 590.
Y. Shi, Z. Li, J. Wang, R. Zhou, Appl. Catal. B 2021, 286, 119936.
N. L. Hamidah, M. Shintani, A. S. Ahmad Fauzi, G. K. Putri, S. Kitamura, K. Hatakeyama, M. Sasaki, A. T. Quitain, T. Kida, ACS Appl. Nano Mater. 2020, 3, 4292.
M. Chen, S. Wan, L. Zhong, D. Liu, H. Yang, C. Li, Z. Huang, C. Liu, J. Chen, H. Pan, Angew. Chem. Int. Ed. 2021, 60, 26233.

(56) References Cited

OTHER PUBLICATIONS

X. Chia, P. Lazar, Z. k. Sofer, J. Luxa, M. Pumera, J. Phys. Chem. C 2016, 120, 24098.
M. Li, Y. Wu, T. Li, Y. Chen, H. Ding, Y. Lin, N. Pan, X. Wang, RSC advances 2017, 7, 48759.
K. Sato, K. Yamada, K. Sakowski, M. Iwaya, T. Takeuchi, S. Kamiyama, Y. Kangawa, P. Kempisty, S. Krukowski, J. Piechota, Appl. Phys. Express 2021, 14, 096503.
Y. Jiang, D. Song, J. Wu, Z. Wang, S. H, Y. Xu, Z. Chen, B. Zhao, J. Zhang, ACS nano 2019, 13, 9100.
L. Wang, X. Zhang, Y. Xu, C. Li, W. Liu, S. Yi, K. Wang, X. Sun, Z. Wu, Y. Ma, Adv. Funct. Mater. 2021, 31, 2104286.
Y. Ding, M. Zeng, Q. Zheng, J. Zhang, D. Xu, W. Chen, C. Wang, S. Chen, Y. Xie, Y. Ding, Nat. Commun. 2021, 12, 1.
Z. Chen, K. Leng, X. Zhao, S. Malkhandi, W. Tang, B. Tian, L. Dong, L. Zheng, M. Lin, B. S. Yeo, Nat. Commun. 2017, 8, 1.
Y. Bo, H. Wang, Y. Lin, T. Yang, R. Ye, Y. Li, C. Hu, P. Du, Y. Hu, Z. Liu, Angew. Chem. Int. Ed. 2021.
J. He, W. Li, P. Xu, J. Sun, Appl. Catal. B 2021, 298, 120528.
N. Padma, in Handbook on Synthesis Strategies for Advanced Materials, Springer, 2022, 377.
P.-C. Huang, Y.-M. Shen, S. Brahma, M. O. Shaikh, J.-L. Huang, S.-C. Wang, Catalysts 2017, 7, 252.
M. Liu, K. A. Min, B. Han, L. Y. S. Lee, Adv. Energy Mater. 2021, 11, 2101281.
W. Xu, G. Fan, J. Chen, J. Li, L. Zhang, S. Zhu, X. Su, F. Cheng, J. Chen, Angew. Chem. Int. Ed. 2020, 59, 3511.
S. Zhang, D. Chen, Z. Liu, M. Ruan, Z. Guo, Appl. Catal. B 2021, 284, 119686.
L. Li, C. Tang, B. Xia, H. Jin, Y. Zheng, S.-Z. Qiao, ACS Catal. 2019, 9, 2902.
X. Chen, Y.-T. Liu, C. Ma, J. Yu, B. Ding, J. Mater. Chem. 2019, 7, 22235.
Z.-Y. Wu, M. Karamad, X. Yong, Q. Huang, D. A. Cullen, P. Zhu, C. Xia, Q. Xiao, M. Shakouri, F.-Y. Chen, Nat. Commun. 2021, 12, 1.
M. X. Jin, Y. L. Pu, Z. J. Wang, Z. Zhang, L. Zhang, A. J. Wang, J. J. Feng, ACS Appl. Energy Mater. 2019, 2, 4188.
M. Duca, M. T. Koper, Energy Environ. Sci. 2012, 5, 9726.
S. Garcia-Segura, M. Lanzarini-Lopes, K. Hristovski, P. Westerhoff, Appl. Catal. B 2018, 236, 546.
Y. Wang, A. Xu, Z. Wang, L. Huang, J. Li, F. Li, J. Wicks, M. Luo, D. H. Nam, C. S. Tan, Y. Ding, J. Wu, Y. Lum, C. T. Dinh, D. Sinton, G. Zheng, E. H. Sargent, J. Am. Chem. Soc. 2020, 142, 5702.

* cited by examiner

| Sample | Sn (wt.%) | S (wt.%) | Ce (wt.%) | Ce (at.%) |
|---|---|---|---|---|
| $Ce_{0.1}$-$SS_2$ | 64.76 | 34.99 | 0.25 | 0.11 |
| $Ce_{0.5}$-$SS_2$ | 64.06 | 34.73 | 1.21 | 0.53 |
| $Ce_{1.0}$-$SS_2$ | 63.46 | 34.14 | 2.40 | 1.06 |
| $Ce_{0.5}$-SS | 77.07 | 21.92 | 1.01 | 0.54 |

Fig. 3A

| Sample | Sn (wt.%) | S (wt.%) | Ce (wt.%) | Pt (wt.%) | Pt (at.%) |
|---|---|---|---|---|---|
| $Pt_{0.3}/Ce_{0.5}$-SS | 76.51 | 21.71 | 0.97 | 0.81 | 0.31 |
| $Pt_{0.6}/Ce_{0.5}$-SS | 76.15 | 21.47 | 0.91 | 1.47 | 0.57 |
| $Pt_{0.9}/Ce_{0.5}$-SS | 75.15 | 21.63 | 0.89 | 2.33 | 0.90 |
| $Pt_{1.2}/Ce_{0.5}$-SS | 74.76 | 21.22 | 0.90 | 3.12 | 1.22 |

Fig. 3B

| Sample | Interlayer spacing (Å) | standard deviation |
| --- | --- | --- |
| $SS_2$ | 5.858 | 0.021 |
| $Ce_{0.5}$-$SS_2$ | 6.030 | 0.024 |
| SS | 5.672 | 0.019 |
| $Ce_{0.1}$-SS | 5.700 | 0.025 |
| $Ce_{0.5}$-SS | 5.898 | 0.028 |
| $Ce_{1.0}$-SS | 6.040 | 0.034 |
| $Pt_{0.3}/Ce_{0.5}$-SS | 5.697 | 0.025 |
| $Pt_{0.9}/Ce_{0.5}$-SS | 5.434 | 0.025 |
| $Pt_{1.2}/Ce_{0.5}$-SS | 5.220 | 0.031 |

Fig. 14B

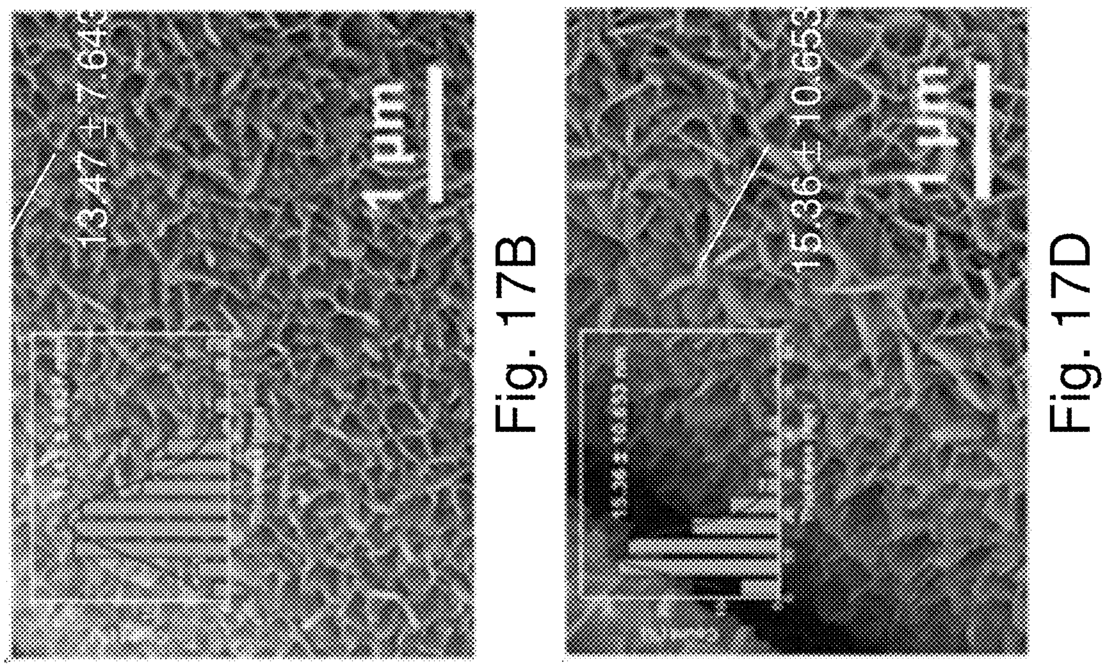
Fig. 17B
Fig. 17D
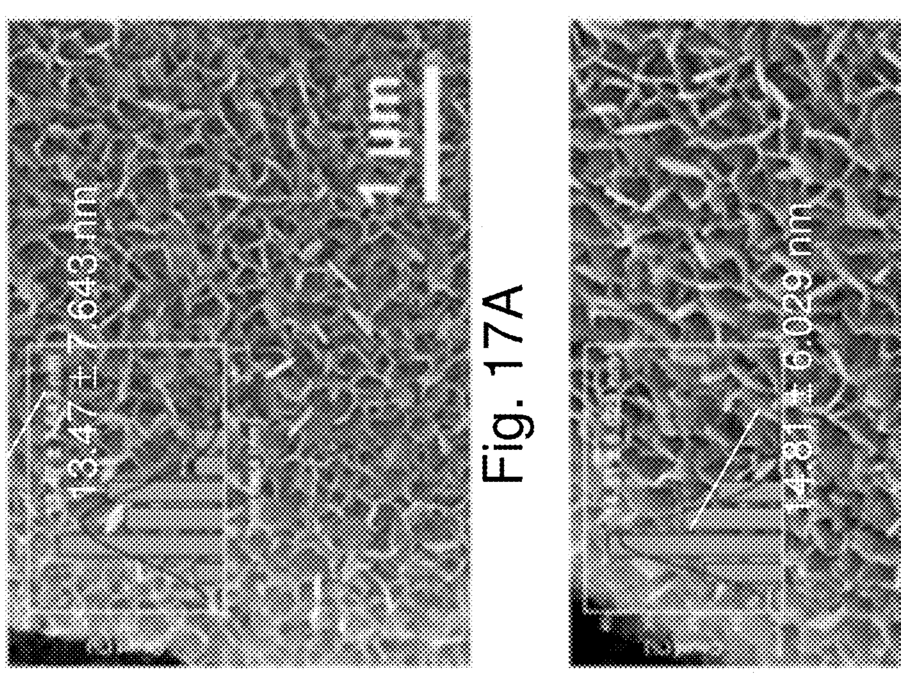
Fig. 17A
Fig. 17C

| Sample | Sn3d | | S2p | |
|---|---|---|---|---|
| | $3d_{5/2}$ | $3d_{3/2}$ | $2p_{3/2}$ | $2p_{1/2}$ |
| $SS_2$ | 486.9 | 495.4 | 161.6 | 162.8 |
| $Ce_{0.5}$-$SS_2$ | 486.6 | 495.1 | 161.4 | 162.5 |
| $Pt_{0.3}/Ce_{0.5}$-SS | 486.4<br>485.4 | 495.0<br>493.9 | 161.2 | 162.3 |
| $Pt_{0.9}/Ce_{0.5}$-SS | 486.1<br>485.2 | 494.8<br>493.8 | 161.0 | 162.0 |
| $Ce_{0.5}$-SS | 486.6<br>485.9 | 495.1<br>494.0 | 161.4 | 162.5 |
| $Pt_{1.2}$-SS | 486.5<br>485.8 | 494.9<br>493.7 | 161.2 | 162.1 |

Fig. 24

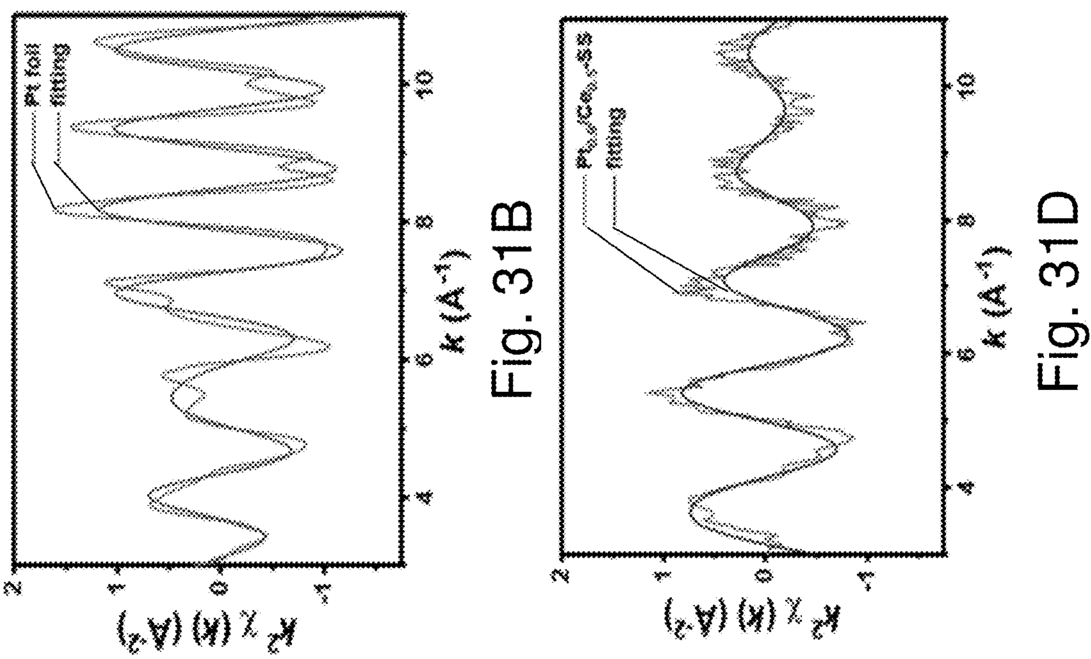
Fig. 31B
Fig. 31D
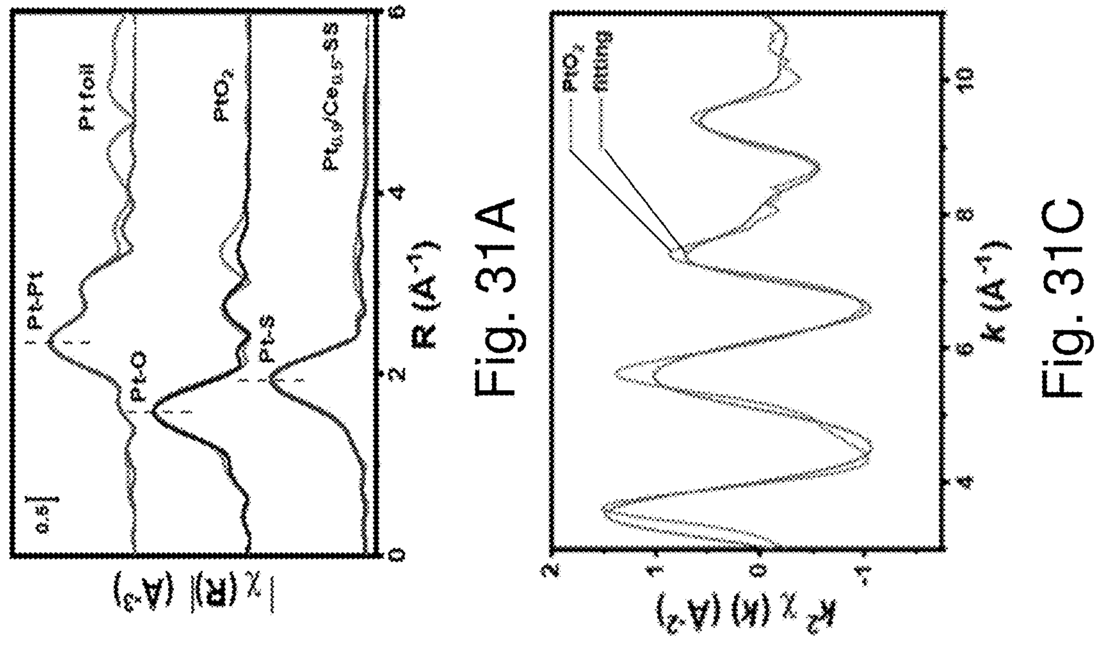
Fig. 31A
Fig. 31C

| Sample | Shell | R (Å) | CN | $\Delta\sigma^2 \times 10^{-3}$ (Å$^2$) | $\Delta E_0$ (eV) |
|---|---|---|---|---|---|
| **Pt foil** | Pt-Pt | 2.76 | 12 | 4.21 | 8.55 |
| **$PtO_2$** | Pt-O | 1.99 | 6 | 3.65 | 7.47 |
| **$Pt_{0.3}/Ce_{0.5}$-SS** | Pt-S | 2.30 | 4.5 | 4.26 | 9.32 |

Fig. 32

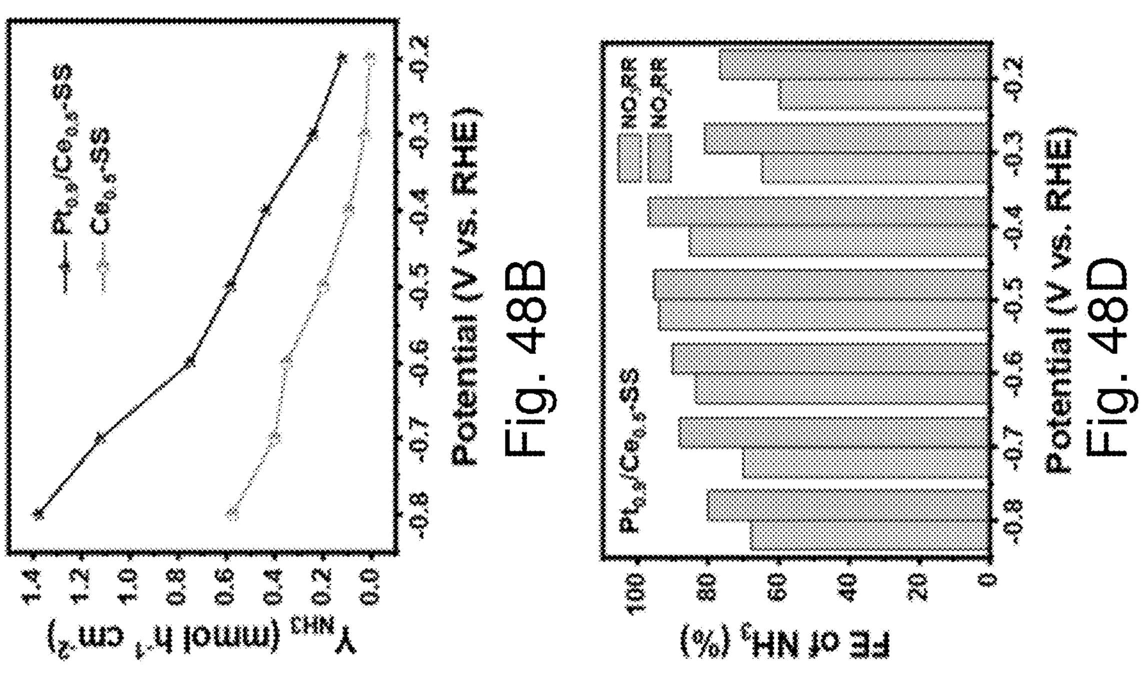
Fig. 48B
Fig. 48D
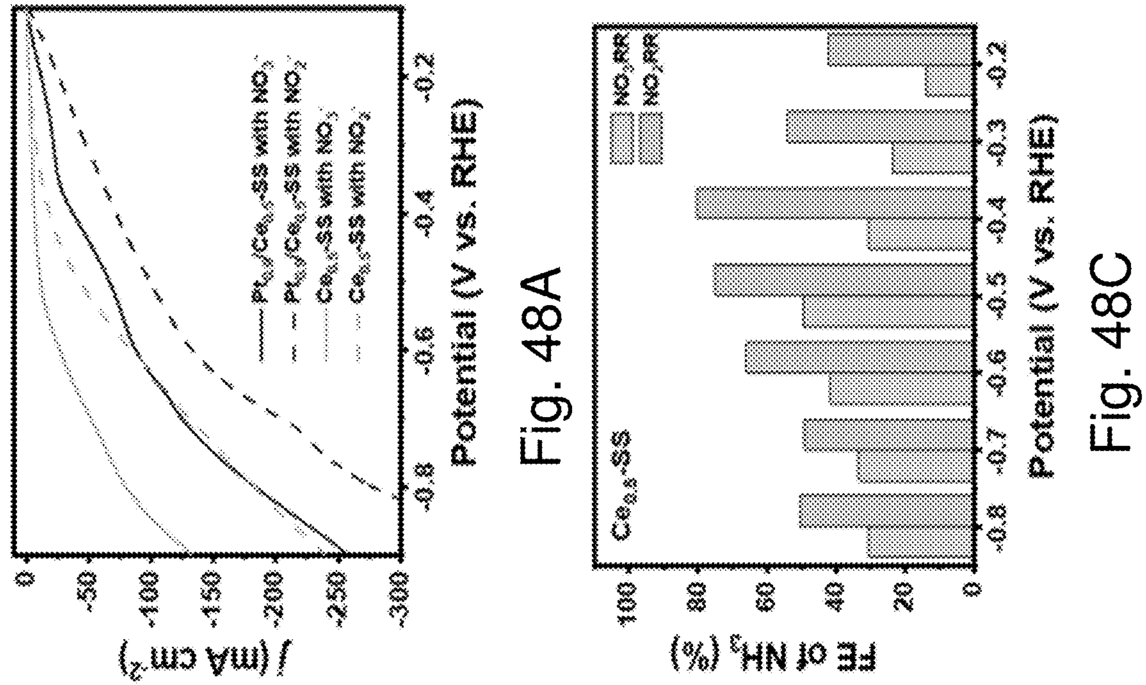
Fig. 48A
Fig. 48C

| Electrocatalyst | Electrolyte | Maximum FE (%) | Yield Rate |
|---|---|---|---|
| **Electrochemical nitrate reduction** | | | |
| **$Pt_{0.5}/C_{e0.5}$-SS** | **0.5 M $Na_2SO_4$ + 0.1 M $NO_3^-$** | **94.12** | **0.3056 mmol $cm^{-2}$ $h^{-1}$ (-0.5 VRHE)** |
| BiOCl derived Bi | 1.0 M KOH + 0.5 M $KNO_3$ | 90.6 | 0.303 mmol $cm^{-2}$ $h^{-1}$ (-0.5 $V_{RHE}$) |
| Fe/$Ni_2P$ | 0.2 M $K_2SO_4$ + 0.05 M $NO_3^-$ | 94.3 | 0.2447 mmol $cm^{-2}$ $h^{-1}$ (-0.4 $V_{RHE}$) |
| Cu@Th-BPYDC | 1.0 M KOH + 100 mM $KNO_3$ | 92.5 | 0.2253 mmol $cm^{-2}$ $h^{-1}$ (0 $V_{RHE}$) |
| $Ni_3N$/N-C-800 | 0.5 M $Na_2SO_4$ + 0.05 M $NO_3^-$ | 85.0 | 0.2775 mmol $cm^{-2}$ $h^{-1}$ (-1.45 $V_{SCE}$) |
| Cu(100)-rich rrugged Cu | 0.1 M PBS + 500 ppm $KNO_3$ | 72.88 | 0.131 mmol $cm^{-2}$ $h^{-1}$ (-0.6 $V_{RHE}$) |
| Fe single-atom catalyst | 0.1 M $K_2SO_4$ + 0.5 M $KNO_3$ | 74.9 | 0.1234 mmol $cm^{-2}$ $h^{-1}$ (-0.66 $V_{RHE}$) |
| BCN@Ni | 0.1 M HCl + 0.1 M $NO_3^-$ | 58.2 | 0.12102 mmol $cm^{-2}$ $h^{-1}$ (-0.4 $V_{RHE}$) |
| In-S-G | 1 M KOH + 0.1 M $NO_3^-$ | 75.0 | 0.07482 mmol $cm^{-2}$ $h^{-1}$ (-0.5 $V_{RHE}$) |
| Pd/$TiO_2$ | 1.0 M LiCl + 0.25 M $NO_3^-$ | 92.05 | 0.0658 mmol $cm^{-2}$ $h^{-1}$ (-0.8 $V_{RHE}$) |
| Pd-$Cu_2O$ corner-etched octahedra | 0.5 M $K_2SO_4$ + 50 ppm $NO_3^-$ | 96.56 | 0.0544 mmol $cm^{-2}$ $h^{-1}$ (-1.3 $V_{SCE}$) |
| O-deficient $TiO_2$ | 0.5 M $Na_2SO_4$ + 50 ppm $NO_3^-$ | 85.0 | 0.045 mmol $cm^{-2}$ $h^{-1}$ (-1.6 $V_{SCE}$) |
| PTCDA/O-Cu on carbon cloth | 0.1 M PBS + 500 ppm $NO_3^-$ | 85.90 | 0.0256 (-0.4 $V_{RHE}$) |

Fig. 53B

| Defective $Au_3Cu$ (111) | 0.1 M KOH + 7.14 mM $KNO_3$ | 98.7 | 0.0326 mmol $cm^{-2}$ $h^{-1}$ (-0.2 $V_{RHE}$) |
|---|---|---|---|
| **Electrochemical nitrogen reduction** | | | |
| **$Pt_{0.9}/C_{e0.5}$-SS** | **0.5 M $Na_2SO_4$ + 0.1 M $NO_3$** | **94.12** | **2734.315 μg $h^{-1}$ $mg_{cat}^{-1}$ (-0.5 $V_{RHE}$)** |
| Sn/$SnS_2$ | 0.1 M PBS | 6.5 | 23.8 μg $h^{-1}$ $mg_{cat}^{-1}$ (-0.8 $V_{RHE}$) |
| Sn-BPene | 0.1 M PBS | 36.51 | 26.98 μg $h^{-1}$ $mg_{cat}^{-1}$ (-0.4 $V_{RHE}$) |
| SnS@C | 0.1 M $Na_2SO_4$ | 14.56 | 24.33 μg $h^{-1}$ $mg_{cat}^{-1}$ (-0.5 $V_{RHE}$) |
| $SnO_2$/RGO | 0.1 M $Na_2SO_4$ | 7.1 | 25.6 μg $h^{-1}$ $mg_{cat}^{-1}$ (-0.5 $V_{RHE}$) |
| F-$SnO_2$/CC | 0.1 M $Na_2SO_4$ | 8.6 | 19.3 μg $h^{-1}$ $mg_{cat}^{-1}$ (-0.45 $V_{RHE}$) |
| Au@$SnO_2$ | 0.5 M $K_2SO_4$ | 15.2 | 21.9 μg $h^{-1}$ $mg_{cat}^{-1}$ (-0.2 $V_{RHE}$) |
| $Ce_{1/3}NbO_3$ | 0.1 M $Na_2SO_4$ | 6.87 | 1.40 μg $h^{-1}$ $mg_{cat}^{-1}$ (-0.8 $V_{RHE}$) |
| Pt-FeP/C | 0.1M KOH | 15.3 | 51.1 μg $h^{-1}$ $mg_{cat}^{-1}$ (-0.05 $V_{RHE}$) |

Fig. 53C

CATALYST, ITS PREPARATION AND ITS USE IN AMMONIA SYNTHESIS

TECHNICAL FIELD

The present invention relates a catalyst in ammonium synthesis for example particularly, but not exclusively, a catalyst in ammonium synthesis involving a metal monochalcogenide-based material; a method of preparing the catalyst and an electrochemical ammonia synthesizing device making use of the catalyst thereof.

BACKGROUND OF THE INVENTION

There has been much interested in the development of green energy since people have recognized the progressively serious energy crises in the world. Among various green energies, ammonia ($NH_3$) is a newly developed green energy that can be used to produce fertilizers, chemicals, and carbon-free fuels.

Synthesis of ammonia generally relies on the Haber-Bosch process and electrochemical nitrogen reduction reaction (eNRR), both of which have limited application conditions, such as harsh operating requirements and excessive energy for dissociate the highly stable nonpolar N≡N bonds (945 KJ $mol^{-1}$). One of the alternatives to the above two processes may be the electrochemical nitrate reduction reaction ($eNO_3RR$), which involves conversion of nitrate into ammonia.

The $eNO_3RR$ may be advantageous in some aspects over the Haber-Bosch process and eNRR in terms of, for example, non-polluting, lower dissociation energy requirement (dissociation energy of the N═O bond≈204 KJ $mol^{-1}$), abundant nitrate supply from various sources such as agricultural and industrial wastewater as well as non-thermal plasma techniques and nitrogen oxidation. However, it is believed that the $eNO_3RR$, in particular, the large-scale $eNO_3RR$, generally suffers from low $NH_3$ selectivity and Faradaic efficiency because of the complex by-products in the eight-electron transfer process and the triggered competitive hydrogen evolution reaction (HER) when the applied bias reaches a specific size.

Although it is appreciated that two-dimensional (2D) material generally offers properties that could facilitate catalytic process, such as providing large specific areas for multiple catalytic reactions, reports indicated that the selectivity and catalytic activity of the 2D material towards $eNO_3RR$ still appear to be far from satisfactory. To circumvent the poor selectivity and catalytic activity (i.e. the Faradaic efficiency) of 2D material towards $eNO_3RR$, it is believed that by manipulating the material, such as by tuning the interlayer spacing thereof, it may affect the chemical affinity of adsorbates on the active sites of the catalyst and thereby affecting the electrocatalytic performance.

Typically, structural transformation of host materials is unavoidable in the attempt to control the interlayer spacing of 2D materials and the maintenance of the stability of the interlayer spacing requires constant external stimulation in physical strategy. The regulation of interlayer spacing in a 2D material without structural transformation and constant external stimulation remains a challenge.

The invention seeks to eliminate or at least to mitigate such shortcomings by providing a new or otherwise improved catalyst, in particular, an electrocatalyst comprising a 2D material for ammonia synthesis.

SUMMARY OF THE INVENTION

In a first aspect of the present invention, there is provided a catalyst in ammonia synthesis comprising a first layer of metal monochalcogenide-based material; a second layer of metal monochalcogenide-based material stacked with and is spaced from the first layer of metal monochalcogenide-based material by a first distance. The metal monochalcogenide-based material includes SnS. Optionally, the metal monochalcogenide-based material is doped by a lanthanide atom. Optionally, the first distance is expanded to a second distance when the metal monochalcogenide-based material is doped by the lanthanide atom, the second distance is an expansion of the first distance by about 4% to about 12%. Optionally, the first and second layers of metal monochalcogenide-based material are intercalated by a metal intercalating atom.

It is optional that the metal intercalating atom is a transition metal atom, in particular, a noble metal atom, that covalently bonds the first and second layers of metal monochalcogenide-based material at a bonding site. Furthermore, optionally, the second distance is compressed to a third distance when the first and second layers of metal monochalcogenide-based material are intercalated by the metal intercalating atom, the third distance is a compression of the second distance by about 4% to about 12%. Optionally, the lanthanide atom is Ce.

In an embodiment of the invention, intercalated first and second layers of metal monochalcogenide-based material has a general formula of $A_y/B_x$–MX, A is the intercalating metal atom, B is the lanthanide atom and MX represents the first and second layers of metal monochalcogenide-based material. Optionally, MX is SnS, B is Ce and A is Pt; wherein y is about 0.3 at. % to about 1.2 at. % and x is about 0.1 at. % to about 1 at. %.

In an embodiment of the invention, wherein the second distance is about 5.700±0.025 Å to about 6.040±0.034 Å, optionally, the third distance is about 5.220±0.031 Å to about 5.697±0.025 Å. It is optional that the intercalated first and second layers of metal monochalcogenide-based material is $Pt_{0.9}/Ce_{0.5}$—SnS, the third distance is about 5.434±0.025 Å. Optionally, the catalyst has a Faradaic efficiency of ammonia of about 94.12% and a yield rate of about 0.3056 mmol $cm^{-2}$ $h^{-1}$ for ammonia at −0.5 V vs. RHE.

In a second aspect of the present invention, there is provided a method of preparing the catalyst in accordance with the first aspect of the invention. The method comprises the steps of:

a) forming a two-dimensional metal dichalcogenide-based material by a hydrothermal process;
b) introducing a trivalent cation of a lanthanide atom to form a doped two-dimensional metal dichalcogenide-based material; and
c) converting the doped two dimensional metal dichalcogenide-based material to a doped two dimensional metal monochalcogenide-based material by way of electrochemical reduction.

It is optional that the method further comprises the step of b1) performing electrochemical intercalation of a metal atom after step b). Optionally, the step b1) and step c) are conducted simultaneously. Optionally, the step a) and the step b) are conducted simultaneously during the hydrothermal process.

In an optional embodiment, the two-dimensional metal dichalcogenide-based material is $SnS_2$, the lanthanide atom is Ce and the doped two-dimensional metal monochalcogenide-based material is $Ce_xSnS$, x is about 0.1 at. % to about 1 at. %. Optionally, the metal atom is Pt, the doped two-dimensional metal monochalcogenide-based material is $Pt_y/Ce_x$—SnS, y is about 0.3 at. % to about 1.2 at. %, and x is about 0.1 at. % to about 1 at. %.

In a third aspect of the present invention, there is provided an electrochemical ammonia synthesizing device, which comprises an anode including a carbon-based anode material; a cathode including the catalyst in accordance with the first aspect of the invention; and an electrolyte including a nitrate source in electrical communication with the anode and the cathode; the electrolyte has a pH of about 11.5.

BRIEF DESCRIPTION OF DRAWINGS

The patent or application file contains at least one drawing executed in color. Copies of this patent or patent application publication with color drawing(s) will be provided by the Office upon request and payment of the necessary fee.

The invention will now be more particularly described, by way of example only, with reference to the accompanying drawings, in which:

FIG. 3A is a table summarizing the contents of the Ce-doped samples determined by ICP-OES/MS;

FIG. 3B is a table summarizing the contents of the Pt-intercalated Ce-doped samples determined by ICP-OES/MS;

FIG. 14B is a table summarizing the interlayer spacings of different samples. The standard derivation collected from over 10 independent replicates at least;

FIG. 17A is a SEM image of $Pt_{0.3}/Ce_{0.5}$—SS, with the insert figure showing the thickness statistics of the nanosheet;

FIG. 17B is a SEM image of $Pt_{0.6}/Ce_{0.5}$—SS, with the insert figure showing the thickness statistics of the nanosheet;

FIG. 17C is a SEM image of $Pt_{0.9}/Ce_{0.5}$—SS, with the insert figure showing the thickness statistics of the nanosheet;

FIG. 17D is a SEM image of $Pt_{1.2}/Ce_{0.5}$—SS, with the insert figure showing the thickness statistics of the nanosheet;

FIG. 24 is a table showing the binding energies of corresponding samples in Sn 3d and S 2p XPS spectra;

FIG. 31A shows the Fourier transform of $k^2$-weighted EXAFS spectra of $Pt_{0.9}/Ce_{0.5}$—SS and reference Pt foil and $PtO_2$ at the Pt Lin-edge;

FIG. 31B shows Pt LIII-edge EXAFS fitting results of Pt foil in k space;

FIG. 31C shows Pt LIII-edge EXAFS fitting results of $PtO_2$ in k space;

FIG. 31D shows Pt LIII-edge EXAFS fitting results of $Pt_{0.9}/Ce_{0.5}$—SS in k space;

FIG. 32 is a table summarizing the fitting results of EXAFS spectra ($S_0^2$=0.80). $S_0^2$, the amplitude reduction factor; R, distance between absorber and back-scatterer atoms; CN, coordination number; $\Delta\sigma^2$, disorder term; $\Delta E_0$, inner potential correction. Error bounds that characterize the structural parameters obtained by EXAFS spectroscopy are estimated as CN, ±20%; R, ±0.02 Å; $\Delta\sigma^2$, ±20%; $\Delta E_0$, ±20%. The parameters used for data fitting list as follows: R range, 1-3.2 Å; k range, 3.5-10.0 $Å^{-1}$;

FIG. 48A shows the LSV curves of $Ce_{0.5}$—SS and $Pt_{0.9}/Ce_{0.5}$—SS in the electrolyte with 0.1 M $NO_2^-$ and with 0.1 M $NO_3^-$, respectively;

FIG. 48B shows the yield rate for $NH_3$ ($Y_{NH3}$) in the electrolyte with 0.1 M $NO_2$—;

FIG. 48C shows the FEs of $NH_3$ of $Ce_{0.5}$—SS and $Pt_{0.9}/Ce_{0.5}$—SS in the process of $NO_3RR$;

FIG. 48D shows the FEs of $NH_3$ of $Ce_{0.5}$—SS and $Pt_{0.9}/Ce_{0.5}$—SS in the process of $NO_2RR$;

FIG. 53B is a table showing the comparison of $NH_3$ synthesis performance among $Pt_{0.9}/Ce_{0.5}$—SS and reported representatives $eNO_3RR$ electrocatalysts corresponding to FIG. 53A;

FIG. 53C is a table showing the comparison of $NH_3$ synthesis performance among $Pt_{0.9}/Ce_{0.5}$—SS and reported representatives eNRR electrocatalysts corresponding to FIG. 53A;

DETAILED DESCRIPTION OF OPTIONAL EMBODIMENT

As used herein, the forms "a", "an", and "the" are intended to include the singular and plural forms unless the context clearly indicates otherwise.

The words "example" or "exemplary" used in this invention are intended to serve as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Without intending to be limited by theory, the inventors have, through their own research, trials, and experiments, devised a catalyst, in particular a 2D catalyst, with high selectivity and activity in electrochemical ammonia synthesis. The 2D catalyst is devised by employing an active diatomic A-B pair into the material structure of 2D catalyst, it would alter the interlayer spacing of the 2D catalyst in a bidirectional manner and affecting the electronic structure thereof, thereby enhancing the chemical affinity of the adsorbates towards the catalyst, facilitating the activity and selectivity of the ammonia conversion process.

According to the invention, there is provided a catalyst in ammonia synthesis comprising a first layer of metal monochalcogenide-based material; a second layer of metal monochalcogenide-based material stacked with and is spaced from the first layer of metal monochalcogenide-based material by a first distance; wherein the metal monochalcogenide-based material includes SnS.

The term "catalyst" as used herein generally refers to a catalyst that participates in electrochemical reactions, such as the electrochemical ammonia synthesis. That said, the catalyst generally refers to an electrocatalyst. Whilst it is appreciated the term "electrochemical ammonia synthesis" generally refers to the electrochemical nitrogen reduction reaction (eNRR) and the electrochemical nitrate reduction reaction ($eNO_3RR$), as used herein, such term preferably refers to the $eNO_3RR$.

Figure 1:
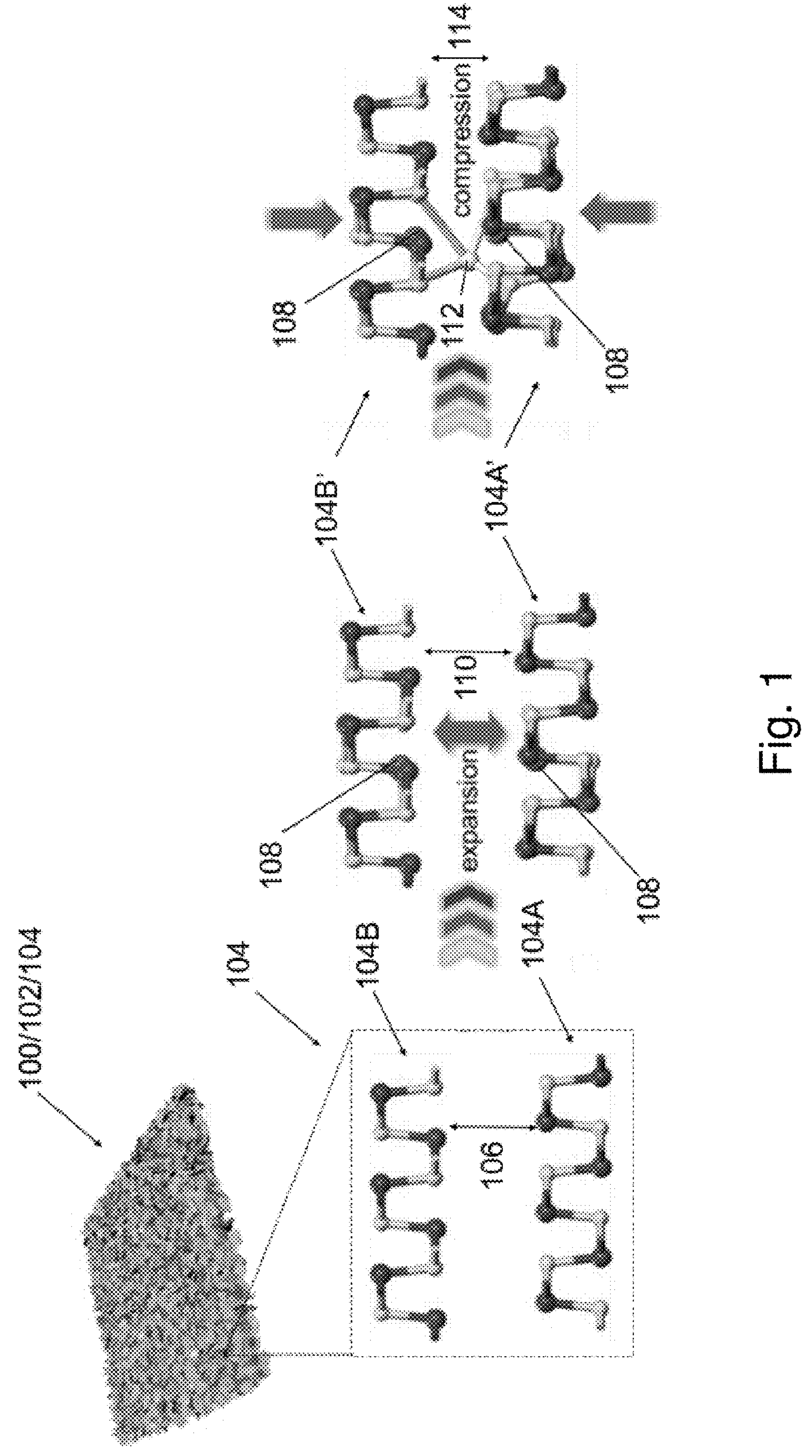
FIG. 1 is a schematic diagram illustrating the catalyst in accordance with an embodiment of the present invention.

The catalyst may be a two-dimensional (2D) material (2D catalyst). The term "2D material" generally denotes a crystalline solid with a thickness defined by one or more of a single atomic layer. The catalyst may be of various forms such as a coat, a film, a sheet, a plate, and the like. In an embodiment, the catalyst may be implemented as a nanosheet. With reference to FIG. 1, there is provided an exemplary embodiment of a catalyst 100 in ammonia synthesis, taking the form of a nanosheet. The catalyst/nanosheet 100 may comprises a substrate 102, which is covered with a metal monochalcogenide-based material 104. The metal monochalcogenide-based material may be covered on the substrate by way of, for example, lamination, spraying coating, physical or chemical vapor deposition, growth by crystallization, hydrothermal process, etc. The substrate may be of any material that may allow the metal monochalcogenide-based material to be deposited or grown thereon. For example, the substrate may be a carbon-based material such as a carbon cloth, a carbon nanotube (CNT)

paper and the like, or a metal foil or plate made of, for instance, aluminum, titanium, and the like.

As shown in FIG. 1, the catalyst/nanosheet 100 comprises a first layer of metal monochalcogenide-based material 104A and a second layer of metal monochalcogenide-based material 104B arranged in stack with the first layer of metal monochalcogenide-based material 104A. In particular, the first layer 104A and the second layer 104B may form a physical interaction such as van der Waals forces, therebetween, separating the first layer 102 and the second layer 104 from each other by a first distance 106. That said, the first and the second layers 104A, 104B may be held together by such physical interaction while distanced apart from each other by the first distance 106.

The metal monochalcogenide-based material generally refers a material having the metal monochalcogenides as one of the components, preferably as a substantially dominant component existing in such material. For example, the metal monochalcogenides may have an atomic percentage of about 97% with respect to the whole material. The term "metal monochalcogenides" denotes a series of chemical compounds consisting of one (single) chalcogen anion and one or more of metal cations. As used herein, the metal monochalcogenide particularly refers to the one having a non-transition metal atom and a (single) chalcogen atom. Examples of non-transition metal atom may include any one of Si, Ge, Sn, Pb, and In, and examples of chalcogen atom may include any one of S, Se, Te, and Po. Preferably, the metal monochalcogenide-based material may be the one with the chalcogen atom being S. That is, the metal monochalcogenide-based material may be one of SiS, GeS, SnS, PbS, and InS. In a specific embodiment, the metal monochalcogenide-based material includes SnS.

Without wishing to be limited by theory, the inventors have devised that by inclusion of one or more metal atoms in the material structure of the catalyst, the interlayer spacing of the material structure would become adjustable, in particular, to be adjustable in a bidirectional manner, such as becoming both expandable and compressible.

In an embodiment, the metal monochalcogenide-based material may be doped by a lanthanide atom. Referring again to FIG. 1, the first layer of the metal monochalcogenide-based material 104A and the second layer of the metal monochalcogenide-based material 104B may be doped by a lanthanide atom 108. As shown, the lanthanide atom 108 is doped in-plane into the first and the second layers, by occupying the metal site in the metal monochalcogenide-based material. For example, when the metal monochalcogenide-based material is SnS, the doped lanthanide atom would occupy in-plane in the Sn site of SnS.

The lanthanide atom-doped first layer 104A' and the lanthanide atom-doped second layer 104B' may be distanced by a second distance 110. In particular, the second distance is an expansion of the first distance 106. It is believed that when the metal monochalcogneide-based material is doped by the lanthanide atom, the lanthanide atom may lead to an electron transfer from the lanthanide atom to the metal monochalcogenide-based material, thereby creating a repulsive force between the anti-orbitals of metal-monochalcogenide bond, resulting in an enhanced interlayer spacing (i.e. the second distance 110). In an embodiment, the second distance may be an expansion of the first distance by about 4% to about 12%, about 4.5% to about 12.5%, about 3.8% to about 11.8%, about 4% to about 10%, about 3.9% to about 8%, about 4% to about 7%, about 4% to about 6.8%, or about 4% to about 6.5%. In particular, the second distance may be of about 5.700±0.025 Å to 6.040±0.034 Å.

The lanthanide atom 108 may be selected from one of Ce, Pr, Nd, Sm, Eu, and Gd. In a specific embodiment, the lanthanide atom is Ce and doped into the metal monochalcogneide-based material such as SnS by an atomic percentage of about 0.3 at. % to about 1 at. %. By doping Ce, the electron transfer from Ce to the anti-bonding of Sn—S increases the repulsive force between adjacent layers, thus leading to the expansion of interlayer spacing as described above.

In another embodiment, the first and the second layers of metal-monochalcogenide-based material, particularly the first and the second layers doped by the lanthanide atom 108 (i.e., the first and second layers of metal-monochalcogenide-based material 104A' and 104B') may be intercalated by an intercalating metal atom. The intercalating metal atom may be a transition metal atom that covalently bonds the first and second layers of metal-monochalcogenide-based material 104A' and 104B' at a bonding site. For example, referring further to FIG. 1, the (lanthanide atom-doped) first and second layers of metal-monochalcogenide-based material 104A' and 104B' are intercalated by a transition metal atom 112. As shown, the transition metal atom is arranged to form two or more covalent bonds with the chalcogen atoms in the first and second layers of metal-monochalcogenide-based material 104A' and 104B' at a (bonding) site that is proximate to the doped lanthanide atoms 108.

After the intercalation of the transition metal atom 112, the (lanthanide atom-doped) first and second layers of metal-monochalcogenide-based material 104A' and 104B' may be distanced by a third distance 114, which is, in particular, a compression of the second distance 110. It is believed that the doped lanthanide atom(s) 108 may interact with and stabilize the transition metal atom 112. By such a diatomic interaction, it is also believed that it would promote the formation of transition metal atom-chalcogen atom bonds, enhancing the interlayer force and shortening the interlayer spacing (i.e. the third distance 114). In an embodiment, the third distance may be a compression of the second distance by about 4% to about 12%, about 4.5% to about 12.5%, about 3.8% to about 11.8%, about 4% to about 10%, about 3.9% to about 8%, about 4% to about 7%, about 4% to about 6.8%, or about 4% to about 6.5%. For example, the third distance may be of about 5.220±0.031 Å to about 5.697±0.025 Å.

The intercalating metal atom 108 may be selected from one of Pt, Au, Pd, Rh, and the like. In a specific embodiment, the intercalating metal atom is Pt and may be added to the catalyst with an atomic percentage of about 0.1 at. % to about 1.2 at. %.

In a particular embodiment, the intercalated first and second layers of metal monochalcogenide-based material may have a general formula of $A_y/B_x$–MX, where A is the intercalating metal atom, such as the transition metal 112, B is the lanthanide atom, such as the lanthanide atom 108 and MX represents the first and second layers of metal monochalcogenide-based material, such as the first and second layers 104A' and 104B'. Preferably, MX is SnS, B is Ce and A is Pt, with x and y being the atomic percentages as described above. It is believed that due to the strong chemical interaction between Ce and Pt atoms, Pt atoms intercalate into the interlayer of SnS as the behavior of single atoms and bonding with S which could enhance the forces of adjacent layers, thus closing the distance between SnS layers. In an example, the tailored interlayer spacing may lead to a linear expansion and compression rate from 6.49% to 7.97% compared to the intrinsic value of SnS (5.672±0.019 Å).

As a specific embodiment, the intercalated first and second layers of metal monochalcogenide-based material may be $Pt_{0.9}/Ce_{0.5}$—SnS, or in other words, the catalyst in accordance with this embodiment may be $Pt_{0.9}/Ce_{0.5}$—SnS. The catalyst $Pt_{0.9}/Ce_{0.5}$—SnS may have a third distance of about 5.434±0.025 Å. In particular, it is believed that with the compressed interlayer spacing, it may significantly improve $NO_3$-to-$NH_3$ conversion of the catalyst for both activity and selectivity in electrochemical nitrate reduction. For example, it is found that the interlayer spacing regulation may tune the electron density of localized p-orbital in Sn into its delocalized states, thus enhancing the chemical affinity towards $NO_3^-$ and $NO_2^-$ but inhibiting hydrogen evolution simultaneously, leading to an enhanced activity and selectivity in electrochemical nitrate reduction. In an example, the catalyst may have a Faradaic efficiency of ammonia of about 94.12% and a yield rate of about 0.3056 mmol $cm^{-2}$ $h^{-1}$ for ammonia at −0.5 V vs. RHE, which is revealed to be a result of the increased internal electron concentration by the inclusion of diatomic Pt—Ce pair. Details of the experimental data will be discussed in the later part of the present disclosure.

The method of preparing the catalyst with the metal monochalcogenide-based material doped by a lanthanide atom is described as follows.

The method may comprise the steps of: a) forming a two-dimensional metal dichalcogenide-based material by a hydrothermal process; b) introducing a trivalent cation of a lanthanide atom to form a doped two-dimensional metal dichalcogenide-based material; and c) converting the doped two dimensional metal dichalcogenide-based material to a doped two dimensional metal monochalcogenide-based material by way of electrochemical reduction.

Step a) may commence with providing a first precursor mixture comprising a metal source and chalcogen source. For example, in an embodiment where the two-dimensional metal dichalcogenide-based material is $SnS_2$, the first precursor mixture may be provided by mixing, for example, water-soluble salts of Sn and S, such as by mixing $SnCl_4·5H_2O$ (Sn source) and $C_2H_5NS$ (S source) at a weight ratio (Sn:S) of about 1:5 to about 1:6. The Sn source and the S source may be prepared as separate solutions such as an ethanol solution of Sn source and an ethanol solution of S source, followed by mixing these ethanol solutions to form the first precursor mixture. Alternatively, the Sn source and the S source may be dissolved in the same ethanol solution to obtain the first precursor mixture.

After that, the first precursor mixture may be transferred to an autoclave to perform the hydrothermal process. The hydrothermal process may be performed at a temperature of about 150° C. to about 180° C. and may be performed for about 10 hours to about 24 hours. After the reaction solvent, i.e., ethanol in this embodiment, is removed, solids such as powders of the two-dimensional metal dichalcogenide-based material may be obtained. Optionally or additionally, the as-obtained two-dimensional metal dichalcogenide-based material may be further subjected to washing with suitable solvent such as deionized water and ethanol, followed by a drying process such as drying the material in an oven at a temperature of about 50° C. to about 80° C. for about 10 hours to about 16 hours.

Optionally or additionally, a substrate such as a carbon cloth, Ti foil, etc. may be transferred to the autoclave along with the first precursor mixture for performing the hydrothermal process. As such, instead of forming solids, the two-dimensional metal dichalcogenide-based material may then grow on the substrate to form a nanosheet of the two-dimensional metal dichalcogenide-based material. In particular, the substrate may be pretreated with a strong acid such as $HNO_3$ prior to placing into the autoclave for hydrothermal process. Optionally or additionally, the acid-pretreated substrate may be washed with suitable solvent such as deionized water.

Step b) may commence with providing a second precursor mixture comprising a lanthanide source. For example, in an embodiment where the lanthanide atom is Ce, and the two-dimensional metal dichalcogenide-based material is $SnS_2$, the second precursor mixture may be prepared by mixing a water-soluble salt of Ce such as $Ce(NO_3)_3·6H_2O$ (Ce source) with the two-dimensional metal dichalcogenide-based material. The Ce source may be prepared in form of an ethanol solution, with a Ce amount of about 1 wt. % to about 3 wt. %. The ethanol solution of Ce source may be mixed with the two-dimensional metal dichalcogenide-based material, which is either in the form of solids such as powder or in the form of a nanosheet as described above to form the second precursor mixture.

After that, the second precursor mixture may be transferred to an autoclave to perform the hydrothermal process, at a temperature of about 150° C. to about 180° C. for about 10 hours to about 24 hours. In an embodiment where the two-dimensional metal dichalcogenide-based material takes the form of solids such as powders, the doped two-dimensional metal dichalcogenide-based material may be obtained as solids such as powders after the reaction solvent, i.e., ethanol in this embodiment, is removed. Optionally or additionally, these solids of doped two-dimensional metal dichalcogenide-based material may be subjected to further hydrothermal process along with an acid-pretreated substrate as described above to obtain a nanosheet of doped two-dimensional metal dichalcogenide-based material.

In another embodiment where the two-dimensional metal dichalcogenide-based material takes the form of a nanosheet, a nanosheet of doped two-dimensional metal dichalcogenide-based material may be obtained after the reaction solvent i.e., ethanol in this embodiment, is removed.

Optionally or additionally, the as-obtained doped two-dimensional metal dichalcogenide-based material may be further subjected to washing with suitable solvent such as deionized water and ethanol, followed by a drying process such as drying the material in an oven at a temperature of about 50° C. to about 80° C. for about 10 hours to about 16 hours.

In an alternative or preferred embodiment, step a) and step b) may be conducted simultaneously during the hydrothermal process. In this embodiment, the second precursor mixture may be prepared by mixing the metal source, the chalcogen source and the lanthanide source as described above, such as the Sn, S, and Ce sources, in an ethanol solution. In particular, the S source may have a weight ratio to the remaining sources (i.e. the Sn and Ce sources) of about 5:1 to about 6:1. After that, the second precursor mixture may be transferred to an autoclave, optionally or additionally along with the acid-pretreated substrate, for hydrothermal process as described above to obtain the doped two-dimensional metal dichalcogenide-based material as solids or a nanosheet. Optionally or additionally, the as-obtained doped two-dimensional metal dichalcogenide-based material may be further subjected to washing and drying processes as described above.

In a specific embodiment, the doped two-dimensional metal dichalcogenide-based material as obtained by the method described above may have a general formula of $Ce_xSnS_2$, where x is about 0.1 at. % to about 1 at. %.

Turning to step c), the electrochemical reduction of the doped two-dimensional metal dichalcogenide-based material may be performed in a three-electrode system comprising an anode (counter electrode), a cathode (working electrode), and a reference electrode in electrical communication with an electrolyte. For example, in an embodiment where the doped two-dimensional metal dichalcogenide-based material is $Ce_xSnS_2$, with x being about 0.1 at. % to about 1 at. %, the three-electrode system may comprise an anode having a carbon-based anode material such as carbon cloth, graphite plate/rod, CNT paper, etc., a cathode including the doped two-dimensional metal dichalcogenide-based material, a reference electrode being selected from standard hydrogen electrode, normal hydrogen electrode, silver chloride electrode, reversible hydrogen electrode, saturated calomel electrode, etc., and an electrolyte such as 1 M $H_2SO_4$ in electrical communication with the electrodes as described.

In particular, the cathode may be a standalone electrode deposited with the doped two-dimensional metal dichalcogenide-based material. For example, the cathode may be a glassy carbon electrode having an electrode surface of about 1×1 $cm^2$, where the doped two-dimensional metal dichalcogenide-based material is deposited thereonto. The doped two-dimensional metal dichalcogenide-based material may take the form of an ink (e.g. a homogeneous ink comprising powders of the doped two-dimensional metal dichalcogenide-based material) and being drop-casted onto the glassy carbon electrode. In another embodiment, the cathode may be the doped two-dimensional metal dichalcogenide-based material taking the form of a nanosheet with an area of about 1 cm×1 cm.

The electrochemical reduction preferably is a cyclic voltammetry process and may be performed in the voltage from about-0.4 V to 0 V vs. RHE at a scan rate of about 100 mV $s^{-1}$ at ambient temperature. After the electrochemical reduction, optionally or additionally, the (reduced) cathode may be isolated/separated from the system, followed by washing with suitable solvents such as deionized water and ethanol, and drying under vacuum at an elevated temperature such as about 60° C. for about 8 to 24 hours.

In a specific embodiment, the doped two-dimensional metal monochalcogenide-based material obtained by the method as described above may have a general formula of $Ce_xSnS$, with x being about 0.1 at. % to about 1 at. %.

In an embodiment, step b) may further comprise the step of b1) performing electrochemical intercalation of a metal atom after step b). The metal atom is particularly a transition metal atom, or preferably a noble atom as described above. The electrochemical intercalation may be performed in a three-electrode system comprising an anode (counter electrode), a cathode (working electrode), and a reference electrode in electrical communication with an electrolyte similar to the one as configured in step c), expect that the counter electrode is replaced with the transition metal, such a foil, plate, rod, etc. thereof. For example, in an embodiment where the metal atom is Pt, the electrochemical intercalation may be performed in a three-electrode system comprising a Pt foil (anode), a cathode comprising the doped two-dimensional metal dichalcogenide-based material as described above and a reference electrode as described above in electrical communication with an electrolyte as described above.

The electrochemical intercalation preferably is a cyclic voltammetry process. In particular, the cyclic voltammetry process may be performed, for example, in the voltage from about-0.4 V to 0 V vs. RHE at a scan rate of about 100 mV $s^{-1}$ for one or more cycles. It is believed that the amount of Pt to be intercalated into the doped two-dimensional metal dichalcogenide-based material may be controlled by the cycle numbers of the cyclic voltammetry process. In particular, it is devised that the cycle numbers is positively correlated with the amount of Pt being intercalated. For example, with the cycle numbers of about 350, 700, 1000, and 1500, the amount of intercalated Pt may be of about 0.3 at. %, 0.6 at. %, 0.9 at. % and 1.2 at. %, respectively.

In an embodiment, the step b1) and step c) may be conducted simultaneously. In particular, it is believed that during the cyclic voltammetry process, the metal atom such as Pt on the anode may be dissolved and redeposited onto the doped two-dimensional metal dichalcogenide-based material along with the phase transformation of the dichalcogenide to monochalcogenide. That said, the metal intercalation process and the phase transformation of dichalcogenide to monochalcogenide may occur at the same time by a single cyclic voltammetry process.

In a specific embodiment, doped two-dimensional metal monochalcogenide-based material obtained from the method as described above may have a general formula of $Pt_y/Ce_x$—SnS, with y being about 0.3 at. % to about 1.2 at. %, and x being about 0.1 at. % to about 1 at. %.

As described herein, the catalyst of the present invention is useful in electrochemical ammonia synthesis, particularly by way of electrochemical nitrate reduction reaction ($eNO_3RR$). According to another aspect of the invention, there is provided an electrochemical ammonia synthesizing device, comprising an anode including a carbon-based anode material; a cathode including the catalyst as described above; and an electrolyte including a nitrate source in electrical communication with the anode and the cathode; wherein the electrolyte has a pH of about 11.5.

Figure 2:
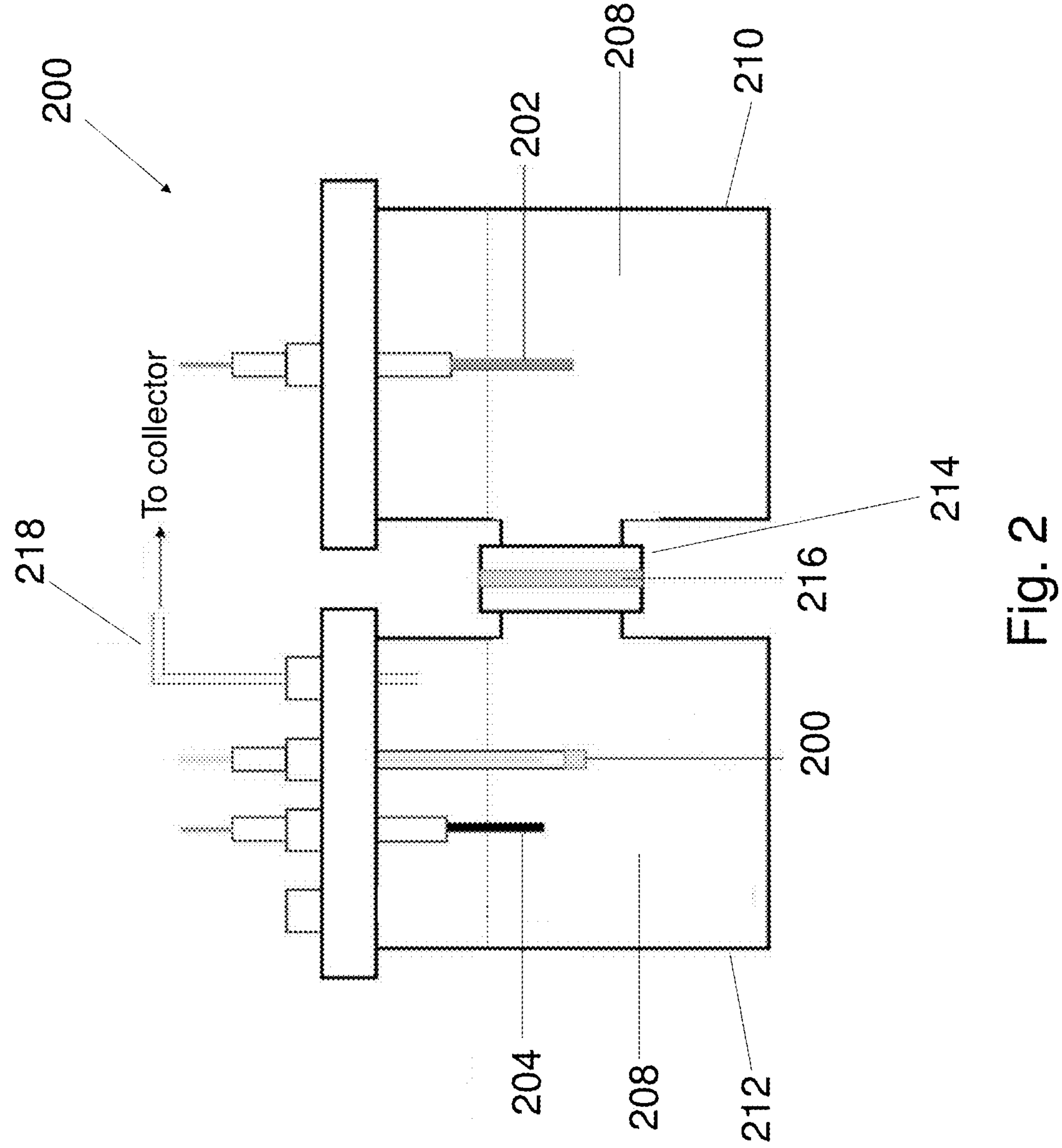
FIG. 2 is a schematic diagram illustrating the electrochemical ammonia synthesizing device in accordance with an embodiment of the present invention.

In an embodiment, the device may be implemented as a three-electrode system. With reference to FIG. 2, there is shown an exemplary embodiment of an electrochemical ammonia synthesizing device 200 configured in an H-type electrolytic cell. The device 200 comprises an anode 202, a cathode 204, a reference electrode 206 and an electrolyte 206 that is in electrical communication with the anode, the cathode and the reference electrode via the connection of DC power supply (not shown) and optionally an ammeter (not shown). The anode 202 is housed in a chamber 210 whereas the cathode 204 and the reference electrode 206 are housed in a separate chamber 212. The chambers 210, 212 are in fluidic communication via a channel 214 with a membrane such as an ion exchange membrane 216. Each chamber is filled with the electrolyte, to which the electrodes 202, 204, and 206 are immersed. The chamber 212 may optionally include a gas outlet 218 for avoiding build-up of gas pressure during the electrochemical synthetic process.

The anode 202 may comprise an anode material such as a carbon-based anode material. Examples of the carbon-based anode material may include graphite, carbon cloth, carbon nanotube (CNT) paper and the like. The carbon-based anode material may take the form of, for instance, a rod, a plate, a foil, a film, etc. In a specific embodiment, the anode may be a piece of carbon cloth.

The cathode 204 may comprise the catalyst as described above. In an embodiment, the cathode may be a standalone electrode deposited with the catalyst. For example, the cathode may be a glassy carbon electrode having an electrode surface of about 1×1 $cm^2$, where the catalyst is deposited thereonto. The catalyst may take the form of a catalyst ink and being drop-casted onto the glassy carbon electrode. In another embodiment, the cathode may be the catalyst taking the form of a nanosheet with an area of about 1 cm×1 cm.

The reference electrode 206 may be any of the reference electrodes known in the art. Examples may include standard hydrogen electrode, normal hydrogen electrode, silver chloride electrode, reversible hydrogen electrode, saturated calomel electrode, etc. It is appreciated that a person skilled in the art could recognize the reference electrode that would meet their practical needs. In a specific embodiment, the reference electrode 206 may be a Ag/AgCl (saturated KCl electrolyte) electrode.

The electrolyte of the device may comprise a nitrate source for the $eNO_3RR$ to proceed. In particular, the nitrate source may only be present in the electrolyte on the cathodic side (i.e. in chamber 212). The nitrate source may be any water-soluble nitrate compounds, such as sodium nitrate, potassium nitrate, zinc nitrate, calcium nitrate, magnesium nitrate, etc. In an embodiment, the electrolyte may comprise potassium nitrate as the nitrate source, with a concentration of, for example, about 0.3 M to about 1.2 M, about 0.4 M to about 1.2 M, about 0.4 M to about 1 M, about 0.4 M to about 0.8 M, or about 0.4 M to about 0.6 M.

The electrolyte may additionally comprise a metal salt, such as a metal sulfate as a supporting electrolyte. The metal sulfate is optionally sodium sulfate. In an embodiment, the sodium sulfate may have a concentration of about 0.5 M.

Preferably, the electrolyte may have an alkaline pH such as a pH value of about 11.5. It is believed that the (initial) pH of electrolyte would change from neutral to about 11 owing to the gradually consumed $H^+$ along with $eNO_3RR$ and competitive HER, and also that the alkaline pH could prevent side reaction of the catalyst during the $eNO_3RR$. That said, by having the electrolyte with an alkaline pH, it would maintain both the stability of pH and catalyst composition and therefore it would be advantageous to the yield of ammonia production.

Additionally or optionally, the device 200 may further include a stirrer such as a mechanical stirrer, a magnetic stirrer and the like in at least one of the chambers 210, 212, facilitating a uniform distribution of the components in the electrolyte upon the $eNO_3RR$ process.

Hereinafter, the present invention is described more specifically by way of examples, but the present invention is not limited thereto.

EXAMPLES

Materials/Chemicals

Tin (IV) chloride pentahydrate ($SnCl_4 \cdot 5H_2O$, 99.0%), thioacetamide ($C_2H_5NS$, 99.0%), anhydrous sodium sulfate ($Na_2SO_4$, 99.95%), sodium hydroxide (NaOH, >98%), and ammonium sulfate ($(NH_4)_2SO_4$, 99.95%) were purchased from Shanghai Meryer Co., Ltd. Potassium nitrate ($KNO_3$, 99.99%), potassium nitrate-$^{15}N$ ($K_{15}NO_3$, 98.5 atom %), hydrazine monohydrate ($N_2H_4 \cdot H_2O$, >98%), potassium nitrite ($KNO_2$, 99%), and deuterium oxide ($D_2O$, 99.9 atom %) were purchased from Shanghai Macklin Biochemical Co., Ltd. Cerous nitrate ($Ce(NO_3)_3 \cdot 6H_2O$, 99.99%) was purchased from Sinopharm Group Co., Ltd. Sulphuric acid ($H_2SO_4$, >95%), hydrochloric acid (HCl, 37%), and nitric acid ($HNO_3$, 65%) were purchased from the Sigma-Aldrich. W1S1005 carbon cloth (CC) was purchased from the Fuel Cell Store Ltd.

Methods and Characterization

Structural Characterization

The micromorphology and elemental distribution of the catalyst samples were observed and contrasted by scanning electron microscopy (SEM, FEI Quanta 450 FESEM), transmission electron microscopy (TEM, Tecnai G2 20), high-resolution TEM (HRTEM, Tecnai G2 20) and selected area electron diffraction (SAED). High-angle annular dark-field scanning transmission electron microscopy (HAADF-STEM) were conducted on atomic-resolution JEM-ARM300F2 operating at 300 KV. The phase structure was confirmed by X-ray diffraction (XRD) measurement using a Bruker D8 Advance powder diffractometer. X-ray photoelectron spectroscopy (XPS) analyses using Thermo ESCALAB 250XI system with an Al-Kα X-ray source (hv=1486.6 eV) were used to determine the elemental composition and valance state. The C Is peak with the binding energy of 284.8 eV was used as the calibration standard. To ensure the accuracy of the results, all samples were treated with Ar plasma etching before being tested to remove the adsorbed contaminant. The contents of Sn and S were measured by Inductively Coupled Plasma Optical Emission Spectroscopy (ICP-OES) on Agilent 730es spectrometer. And the contents of Ce and Pt were determined by the inductively coupled plasma-mass spectroscopy (ICP-MS) recorded by Agilent 7700ce spectrometer.

Raman spectroscopy was performed on a WITec alpha300 R Raman System under an excitation of 532 nm laser light with a power of 10 mW. Isotope labeling experiments were carried out on a Bruker 400 MHz "AVANCE III" Nuclear Magnetic Resonance System (NMR-400). Zeta potential was determined with SurPASS 3 from Anton Paar in Austria in aqueous KCl solution (pH=10). Since a higher pH value (>10) will lead to inaccurate test results, the choice of pH=10 can not only be close to the experimental condition (pH=11.5) but also ensure the accuracy of the results.

The X-ray absorption near edge structure (XANES) and the extended X-ray absorption fine structure (EXAFS) analysis were investigated at the 1W1B station of the Beijing Synchrotron Radiation Facility, China. During the measurement, the synchrotron radiation ring was operated at 2.5 GeV. The sample was measured in the highly sensitive fluorescence detection mode, while Pt foil and $PtO_2$ were used as reference samples and measured in the transmission mode. All XAFS spectra were processed using the IFEFFIT package.

Data reduction, data analysis, and EXAFS fitting were performed according to the standard procedures using the ATHENA and ARTEMIS program integrated within the Demeter packages. The $k^2$-weighted EXAFS spectra were obtained by subtracting the post-edge background from the overall absorption and then normalizing with respect to the edge-jump step. Then, $k^2$-weighted $\chi(k)$ data of Pt $L_{III}$-edge were Fourier transformed to real (R) space using a Hanning windows (dk=1.0 Å$^{-1}$).

In-Situ Raman Spectroscopy

In-situ Raman spectra were collected on a WITec alpha300 R Raman System under an excitation of 532 nm laser light. The in-situ electrochemical cell comes with a three-electrode system and a quartz window to protect the objective. The catalyst grown on CC was cut to a plate shape with a diameter of 1 cm, which was used as the working electrode. A platinum wire and Ag/AgCl were served as the counter and reference electrodes, respectively. During the test, the Raman spectra were obtained at different times under control by an electrochemical workstation. In detail, each spectrum is an average of five continuously acquired spectra with a collection time of 20 s each. The in-situ Raman spectra of the electrochemical reduction of $SnS_2$ to SnS were collected after different CV cycles. For the in-situ Raman spectra of $Pt_{0.9}/Ce_{0.5}$—SS during $eNO_3RR$, the potential was set at −0.5 V vs. RHE, and the electrolyte was 0.5 M $Na_2SO_4$ (pH 11.5) with 0.1 M $KNO_3$. The $eNO_3RR$ was kept in operation for 1 h, and the Raman spectra were collected every 10 min.

Electrochemical Nitrate Reduction

All the electrochemical measurements were conducted at room temperature on Gamry G300 potential station in an H-type electrolytic cell separated by a Nafion 117 membrane (DuPont). The electrodes grown on CC (1.0 cm×1.0 cm) were used as working electrodes, and a piece of CC and Ag/AgCl (Saturated KCl electrolyte) represented the counter and reference electrodes, respectively. The electrolyte was 0.5 M $Na_2SO_4$ solution. All the final reference potential was converted to the reversible hydrogen electrode (RHE) using the Nernst equation:

$$E_{RHE} = E_{Ag/AgCl} + 0.0591 \times \mathrm{pH} + 0.198 \quad (1)$$

In detail, the linear sweep voltammetry (LSV) curves were recorded by a scan rate of 5 mV $s^{-1}$, and the electrochemical impedance spectroscopy (EIS) was obtained in the frequency range from 0.01 Hz to 100 kHz upon an AC voltage amplitude of 5 mV. For electrochemical $NO_3RR$ experiments, potentiostatic tests were conducted in the electrolyte of 0.5 M $Na_2SO_4$ (adjusted to pH 11.5 using 1.0 M NaOH solution) with 0.1 M $KNO_3$ at different potentials. Each potential operates for 1 h with a magnetic stirring rate of 300 rpm. Also, each kind of catalyst was prepared for three samples for testing three times to determine the error bar. After the electrochemical reduction reaction, the indophenol blue method was used to identify and quantify the produced $NH_3$. UV-vis spectroscopy was recorded using UV/VIS Spectrometer Lambda 2S.

Determination of $NH_3$

The concentration of $NH_3$ was evaluated by the indophenol blue method. Firstly, the color agent was prepared as follows: Solution A was prepared by adding 5.0 wt % salicylic acid ($C_7H_6O_3$) and 5.0 wt % sodium citrates ($C_6H_5Na_3O_7 \cdot 2H_2O$) into 1.0 M NaOH solution. Solution B was a diluted NaClO solution with a concentration of 0.05 M. Solution C was 1.0 wt % sodium nitroferricyanide ($Na_2[Fe(NO)(CN)_5] \cdot 2H_2O$) solution. In detail, a certain amount of electrolyte after the $eNO_3RR$ process was removed from the electrochemical cell and diluted to the detection range. 2 mL diluted electrolyte was taken out into a test tube, followed by adding 2 mL solution A, 1 mL solution B and 0.2 mL solution C. After standing for 2 h in dark place under ambient conditions, the absorption spectrum of the solution was measured by a UV-Vis spectrophotometer, and the absorbance value at a wavelength of 655 nm was collected. In order to quantify the concentration, the concentration-absorbance calibration curve was plotted using a series of standard $NH_4(SO_4)_2$ solutions dissolved in 0.5 M $Na_2SO_4$.

Determination of $NO_2^-$

The concentration of $NO_2^-$ was determined by Griess method. The color agent was prepared as follows: 50 mL deionized water and 10 mL phosphoric acid were mixed together, followed by adding 4.0 g p-aminobenzenesulfonamide and 0.2 g of N-(1-naphthyl)-ethylenediamine dihydrochloride. The mixture was then poured into a 100 mL volumetric flask and diluted to the calibration tail. For nitrate detection, 5 mL electrolyte diluted to the detection range was taken out into a test tube, followed by adding 0.1 mL color reagent. After shaking and standing for 20 min, the absorption spectrum of the solution was measured by UV-Vis spectrophotometer, and the absorbance value at a wavelength of 540 nm was collected. The concentration-absorbance calibration curve was plotted using a series of concentrations known as standard $KNO_2$ solutions dissolved in 0.5 M $Na_2SO_4$.

Determination of $N_2H_4$

The concentration of $N_2H_4$ was evaluated by Watt and Chrisp's method. The chromogenic reagent contains 5.99 g of p-(dimethylamino)benzaldehyde, 30 mL concentrated HCl, and 300 mL ethanol. Specifically, 2 mL of as-prepared color reagent was added to 2 mL of the diluted reaction solution. After shaking and standing for 30 min, the absorption spectrum of the solution was measured by UV-Vis spectrophotometer, and the absorbance value at a wavelength of 460 nm was collected. The concentration-absorbance calibration curve was plotted using a series of concentrations known as standard $N_2H_4$ solutions dissolved in 0.5 M $Na_2SO_4$.

Isotope Labeling Experiment

The isotope labeling experiments were recorded by Bruker 400 MHZ "AVANCE III" Nuclear Magnetic Resonance System (NMR-400) using maleic acid ($C_4H_4O_4$) as the internal standard. The $K^{15}NO_3$ (98.5 atom %) was used as the feeding N-source for the isotopic labeling nitrate reduction experiments to clarify the source of ammonia. Specifically, the electrolyte of 0.5 M $Na_2SO_4$ (pH 11.5) and 0.1 M $K^{15}NO_3$ was added into the cathode compartment as the reactant. After electro-reduction, the obtained electrolyte containing $^{15}NH_4^+$—$^{15}N$ was taken out and adjusted to weak acid by 4 M $H_2SO_4$, followed by extracting 10 mL solution and mixing with 4 mg maleic acid. Consequently, 0.5 mL above solution and 50 μL ($D_2O$) were injected into a nuclear magnetic tube to ready for the NMR detection. The calibration curve was created using a series of $^{15}NH_4^+$—$^{15}N$ solutions (($^{15}NH_4)_2SO_4$) with known concentrations. Since the $^{15}NH_4^+$—$^{15}N$ concentration and the area ratio in the NMR spectra were positively correlated, the calibration was achieved using the peak area ratio between $^{15}NH_4^+$—$^{15}N$ and maleic acid. Similarly, the amount of $^{14}NH_4^+$—$^{14}N$ was quantified by the same method as above, where $^{14}KNO_3$ was used as the feeding N-source.

Calculation of the Faradaic Efficiency and Yield Rate $NH_3$ yield rate was calculated by the following equation:

$$\text{NH}_3 \text{ yield rate } (\text{mg } h^{-1} \text{mg}_{cat.}^{-1}) = \frac{C_{NH_3} \times V}{t \times m_{cat.}} \quad (2)$$

Faradaic efficiency of $NH_3$ and $NO_2$ were calculated by the following equation:

$$FE_{NH_3}(\%) = \frac{8F \times C_{NH_3} \times V}{17 \times Q} \quad (3)$$

$$FE_{NO_2}(\%) = \frac{2F \times C_{NO_2} \times V}{46 \times Q} \quad (4)$$

where $C_{NH3}$ (mg $mL^{-1}$) and $C_{NO2}$ (mg $mL^{-1}$) are the measured concentration of $NH_3$ and $NO_2^-$, respectively. V (mL) is the volume of the cathodic electrolyte, t (h) is the reduction time, $m_{cat.}$(mg) is the mass loading of the catalyst on CC, F (96485 C $mol^{-1}$) is the Faraday constant and Q (C) is the total charge passing the electrode.

Computational Details

All the computations were performed on the basis of the density functional theory using the Cambridge sequential total energy package (CASTEP). The generalized gradient approximation (GGA) with projector augmented-wave (PAW) potentials were implemented to describe electron-ion interactions and exchange-correlation energies. A typical $SnS_2$ structure and SnS structure were used for our simulations. 3×3×1 bilayer-SnS supercell with two Sn atoms substituted by Ce atoms was used to simulate the Ce-doping. A single Pt atom was intercalated into interlamination to simulate the Pt intercalation. In addition, a vacuum spacing of ~20 Å was used to prevent spurious interaction between periodic images. For geometry optimization of $SnS_2$ and SnS, the Grimme method was applied to consider van der Waals interaction. The kinetic-energy cutoff was set as 571 eV, and the convergence criterion of the energy was set to be within 1.0×10−5 eV with forces on each atom less than 0.03 eV/Å and a maximum displacement of 0.001 Å. The Brillouin zone was sampled by a k-point mesh of 1×1×1.

The $NO_3^-$ reduction reaction on the surfaces of the catalysts was stimulated by two possible pathways. One is:

$$* + NO_3(aq) \rightarrow {}^*NO_3 + e^-$$

$${}^*NO_3 + H_2O + 2e^- \rightarrow {}^*NO_2 + 2OH^-$$

$${}^*NO_2 + H_2O + 2e^- \rightarrow {}^*NO + 2OH^-$$

$${}^*NO + H_2O + 2e^- \rightarrow {}^*NO_2 + 2OH^-$$

$${}^*NO + H_2O + e^- \rightarrow {}^*NOH + OH^-$$

$${}^*NOH + H_2O + e^- \rightarrow {}^*NHOH + OH^-$$

$${}^*NHOH_3 + H_2O + e^- \rightarrow {}^*NH_2OH + OH^-$$

$${}^*NH_2OH + e^- \rightarrow {}^*NH_2 + OH^-$$

-continued $${}^*NH_2 + H_2O + e^- \rightarrow {}^*NH_3 + OH^-$$

$${}^*NH_3 \rightarrow * + NH_3(g)$$

and the other one is:

$$* + NO_3(aq) \rightarrow {}^*NO_3 + e^-$$

$${}^*NO_3 + H_2O + 2e^- \rightarrow {}^*NO_2 + 2OH^-$$

$${}^*NO_2 + H_2O + 2e^- \rightarrow {}^*NO + 2OH^-$$

$${}^*NO + H_2O + 2e^- \rightarrow {}^*NO_2 + 2OH^-$$

$${}^*NO + H_2O + e^- \rightarrow {}^*NOH + OH^-$$

$${}^*NOH + H_2O + e^- \rightarrow {}^*NHOH + OH^-$$

$${}^*NOH + e^- \rightarrow {}^*N + OH^-$$

$${}^*N + H_2O + e^- \rightarrow {}^*NH + OH^-$$

$${}^*NH + H_2O + e^- \rightarrow {}^*NH_2 + OH^-$$

$${}^*NH_2 + H_2O + e^- \rightarrow {}^*NH_3 + OH^-$$

$${}^*NH_3 \rightarrow * + NH_3(g)$$

For each electrochemical step, the Gibbs free energy changes (ΔG) for the $NO_3$RR procedures were estimated according to the following equation:

$$\Delta G = \Delta E + \Delta ZPE - T\Delta S + \Delta G_U + \Delta G_{pH} \quad (5)$$

where ΔE is the energy change between the reactant and product obtained from DFT calculations, ΔZPE is the change of zero-point energies, which could be evaluated by:

$$ZPE = N_a \sum_i \frac{hv_i}{2}$$

where Na is the Avogadro number, h is the Planck constant and $v_i$ represents the frequency. T is the room temperature (298.15 K) and ΔS is the change of entropy obtained from the following equation:

$$S = R \sum_i \left\{ \frac{\left(\frac{hv_i}{k_B T}\right) \exp\left(-\frac{hv_i}{k_B T}\right)}{\left[1 - \exp\left(-\frac{hv_i}{k_B T}\right)\right]} - \ln\left[1 - \exp\left(-\frac{hv_i}{k_B T}\right)\right] \right\}$$

where R and $k_B$ are the universal gas constant and the Boltzmann constant, respectively.

ΔGu is the contribution of electrode potential, which can be calculated by ΔGu=−eU, where e is the number of electrons transferred, U is the applied potential measured against the standard hydrogen electrode, and U=0 V is considered. $\Delta G_{pH}$ is the free energy correction of pH, which can be calculated by $\Delta G_{pH}$=−kBT×pH×ln 10, and pH is set to be 1.

Example 1

Synthesis of $SnS_2$ Nanosheets ($SS_2$ NS) and Ce-Doped $SnS_2$ Nanosheet ($Ce_x$—$SS_2$ NS, x Represents the Atomic Percent of Ce)

The $SS_2$ NS were prepared via a facile hydrothermal method. Typically, 525 mg $SnCl_4 \cdot 5H_2O$ and 600 mg $C_2H_5NS$ were added to 60 mL of ethanol under vigorous magnetic stirring. Afterward, the solution was poured into a 100 mL sealed Teflon-lined autoclave and then transferred to an oven set at 160° C. for 12 h. Carbon cloth (CC, 3.0 cm×2.0 cm), pretreated with nitric acid ($HNO_3$) for 30 min, was placed in the autoclave to serve as the growth substrates. The CC covered by $SS_2$ NS were collected and washed with deionized water and ethanol several times, followed by vacuum drying at 60° C. overnight. For $Ce_x$—$SS_2$ NS, a certain amount of $Ce(NO_3)_3 \cdot 6H_2O$ (dependent on the expected Ce-doping proportion, 0~1%) was dissolved in ethanol first, then mixed with the precursor solution of $SS_2$ NS. The subsequent procedures are the same as preparing $SS_2$ NS. The loading of $SS_2$ and $Ce_x$—$SS_2$ on CC was determined to be about 2.0 mg $cm^{-2}$. The detailed composition contents of the samples were shown in FIG. 3A. According to the atomic percent of Ce, the abbreviations for the samples are $Ce_{0.1}$—$SS_2$, $Ce_{0.5}$—$SS_2$ and $Ce_{1.0}$—$SS_2$.

Example 2

Synthesis of SnS Nanosheets (SS NS) and Ce-Doped SnS Nanosheets ($Ce_x$—SS NS)

The SS and $Ce_x$—SS NS were prepared using a standard three-electrode system through in-situ electrochemical reduction. The $SS_2$ and $Ce_x$—$SS_2$ grown on CC (1.0 cm×1.0 cm) were set as working electrodes, and graphite rod and Ag/AgCl (Saturated KCl electrolyte) were the counter and reference electrodes, respectively. The in-situ electroreduction was performed based on the CV process in 1.0 M $H_2SO_4$ solution with the voltage from −0.4 V to 0 V vs. RHE at a scan rate of 100 mV $s^{-1}$. The reduced electrode was collected after washing with deionized water and ethanol several times and vacuum dried at 60° C. overnight.

Example 3

Synthesis of Pt Intercalated $Ce_x$—SS Nanosheets ($Pt_y/Ce_x$—SS NS, y Represents the Atomic Percent of Pt) and Pt Intercalated SS Nanosheets ($Pt_y$—SS NS)

The $Pt_y/Ce_x$—SS and $Pt_y$—SS NS were synthesized by electrochemical intercalation of Pt based on the CV process in a 1.0 M $H_2SO_4$ solution using a standard three-electrode system. Actually, because the electrochemical intercalation of Pt and the electrochemical reduction of $SS_2$ NS were under the same experimental environment, such two processes could happen simultaneously. Therefore, the $SS_2$ and $Ce_x$—$SS_2$ grown on CC (1.0 cm×1.0 cm) were set as working electrodes, and Pt foil and Ag/AgCl (Saturated KCl electrolyte) were the counter and reference electrodes, respectively. During the CV process, Pt foil at the anode will be slightly dissolved and redeposited onto the $SS_2$ and $Ce_x$—$SS_2$, accompanied by the phase transformation from $SnS_2$ to SnS. The detailed composition contents of the samples were shown in FIG. 3B. According to the atomic percent of Pt, the abbreviations for the samples are $Pt_{0.3}/Ce_{0.5}$—SS, $Pt_{0.6}/Ce_{0.5}$—SS, $Pt_{0.9}/Ce_{0.5}$—SS and $Pt_{1.2}/Ce_{0.5}$—SS. The content of Pt could be controlled by the cycle numbers of CV process, in which the cycle numbers for 350, 700, 1000 and 1500 were determined to be about 0.3 at. %, 0.6 at. %, 0.9 at. % and 1.2 at. % of Pt in $Pt_y/Ce_x$—SS, and that for 450 was determined to be about 1.2 at. % of Pt in $Pt_y$—SS. The as-obtained $Pt_y/Ce_x$—SS and $Pt_y$—SS were washed with deionized water and ethanol several times and then vacuum dried at 60° C. overnight.

Example 4

Catalyst Characterization

Figure 4:
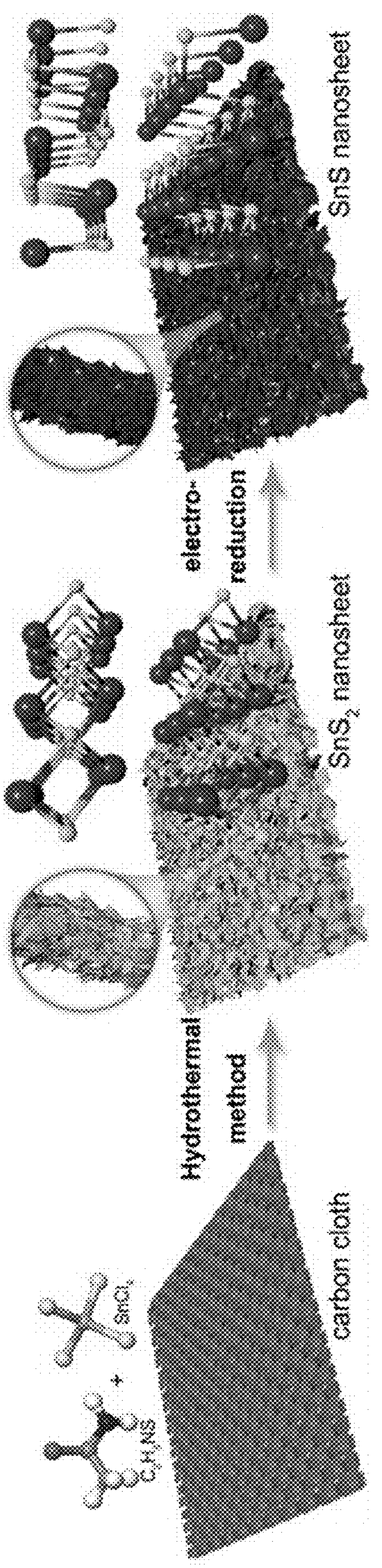
FIG. 4 is a schematic diagram illustrating the synthetic procedure of SnS NS.

It is believed that SnS is poor for HER process compared to $SnS_2$ owing to the puckered structure of SnS (FIG. 4), and therefore the Gibbs free energy of hydrogen adsorption at all edges is disadvantageous for HER. Accordingly, SnS was chosen for studying its $eNO_3RR$ activity in this work.

The SnS nanosheets (SS NS) synthesis is schematically illustrated in FIG. 4A. $SnS_2$ nanosheets ($SS_2$ NS) were firstly grown on carbon cloth by facile hydrothermal method, and then electrochemically reduced into SS NS after cyclic voltammetry (CV) process in 1.0 M $H_2SO_4$ depicted as following equation (6):

$$SnS_2 + H_2O + 2e^- \rightarrow SnS + HS^- + OH \quad (6)$$

Figure 5:
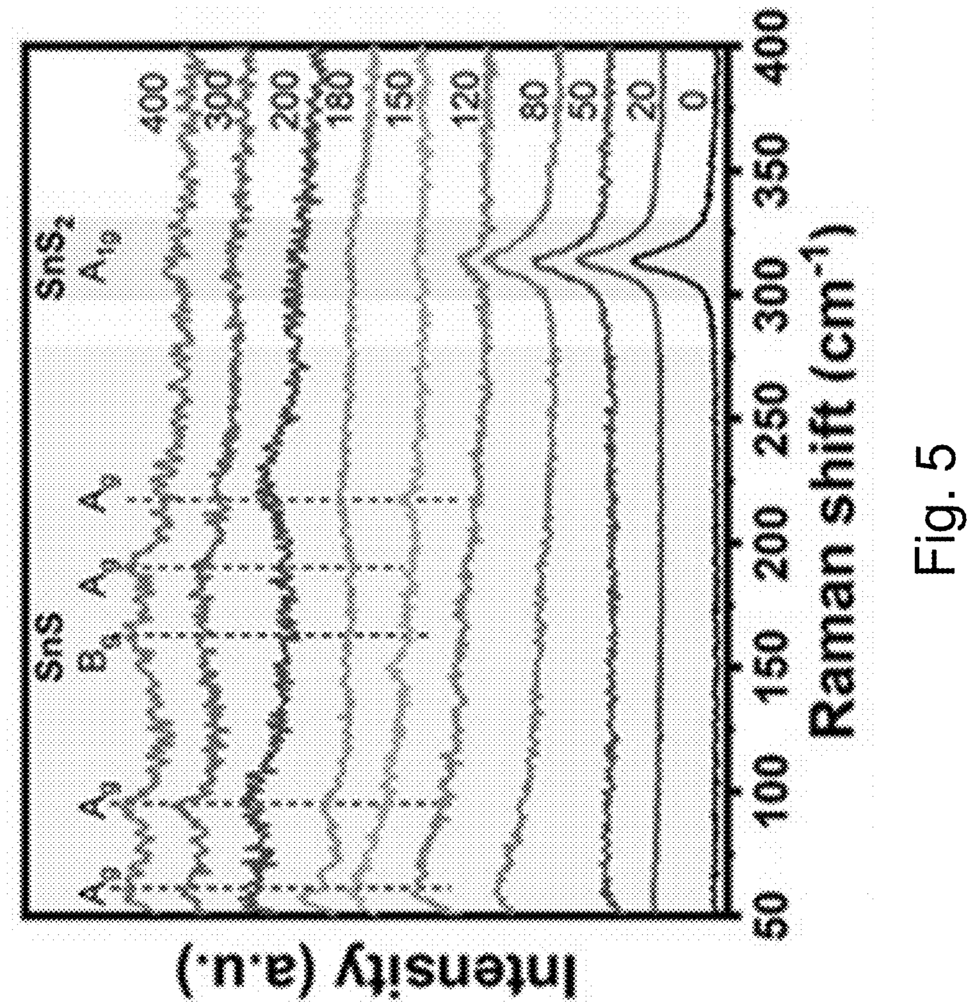
FIG. 5 is an in situ Raman spectra upon the electrochemical conversion process from $SnS_2$ to SnS.
Figure 6B:
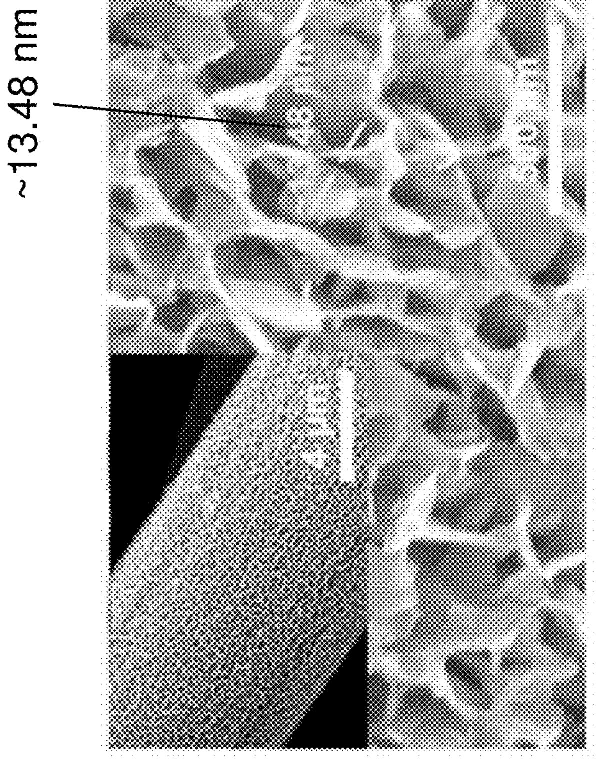
FIG. 6B is a SEM image of SnS (magnification scale=500 nm), with the insert figure being the SEM image at a lower magnification (magnification scale=4 μm)
Figure 6A:
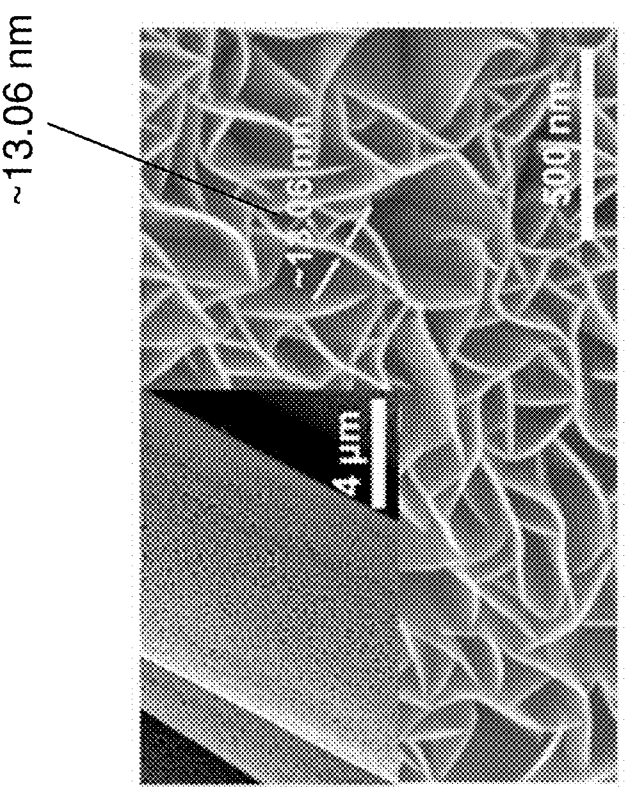
FIG. 6A is a SEM image of $SnS_2$ (magnification scale=500 nm), with the insert figure being the SEM image at a lower magnification (magnification scale=4 μm)
Figure 6D:
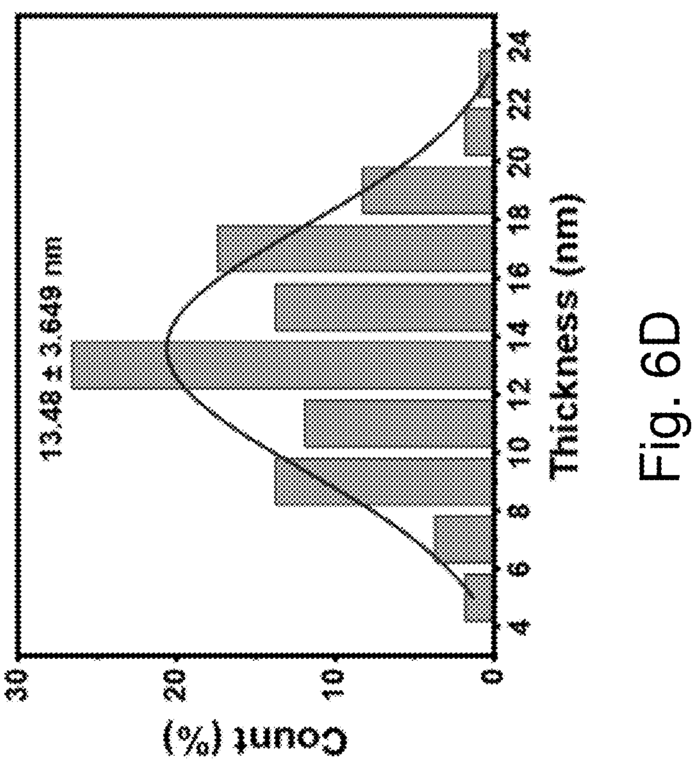
FIG. 6D shows the thickness statistics of $SS_2$ corresponding to the SEM image of FIG. 6B.
Figure 6C:
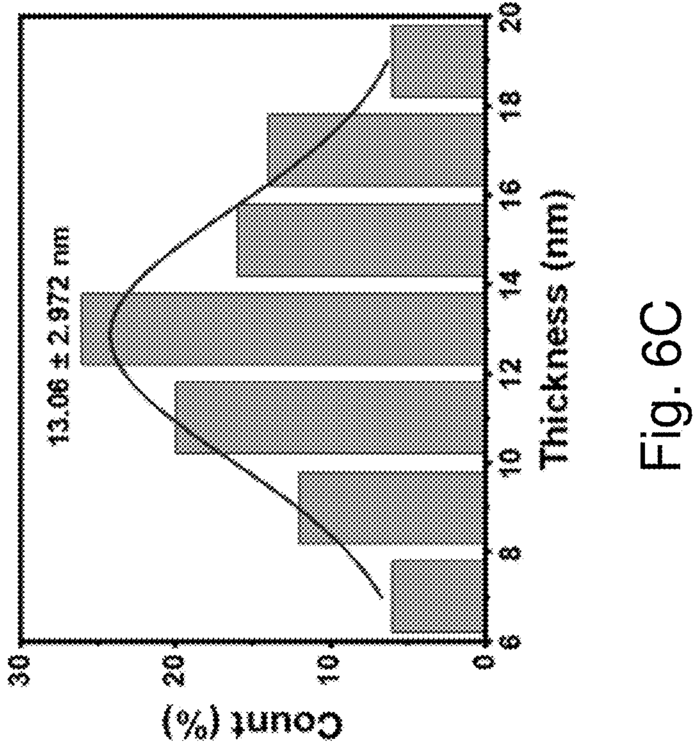
FIG. 6C shows the thickness statistics of $SS_2$ corresponding to the SEM image of FIG. 6A.

FIG. 5 shows the in situ Raman spectra during the conversion. Along with the increase of CV cycles, the Raman peaks associated with $SnS_2$ at around 313.4 $cm^{-1}$ gradually become weak, replaced by the progressively reinforced $A_g$ peaks located at 61.7, 95.8, 190.7 and 217.3 $cm^{-1}$, and $B_g$ peak at 163.8 $cm^{-1}$, which all index to SnS structure. The morphology of SS maintains the typical nanosheet of $SS_2$, other than a little more deformation and a slightly increased thickness of the NS. (FIGS. 6A-6D).

Figure 7B:
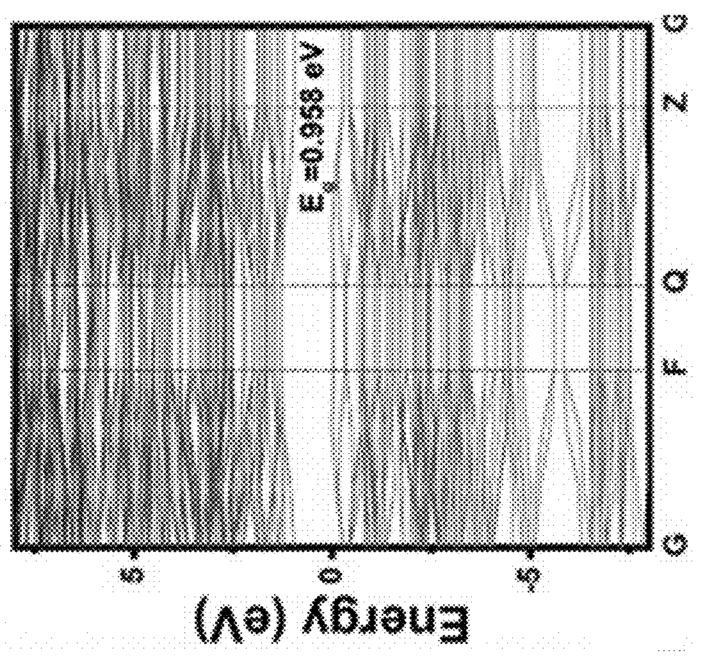
FIG. 7B shows calculated band structures of SnS, where $E_g$ represents the bandgap.
Figure 7A:
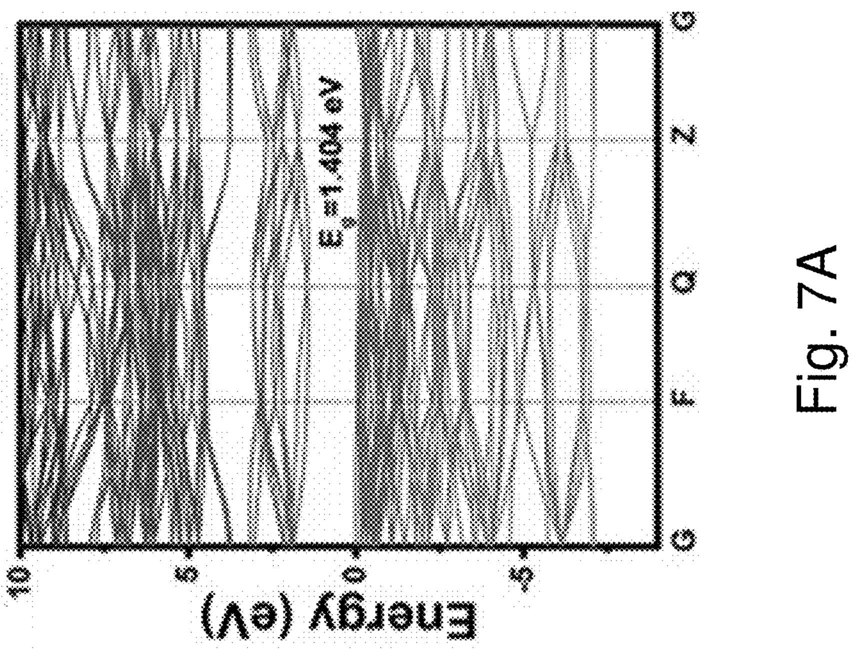
FIG. 7A shows calculated band structures of $SnS_2$, where $E_g$ represents the bandgap.
Figure 8:
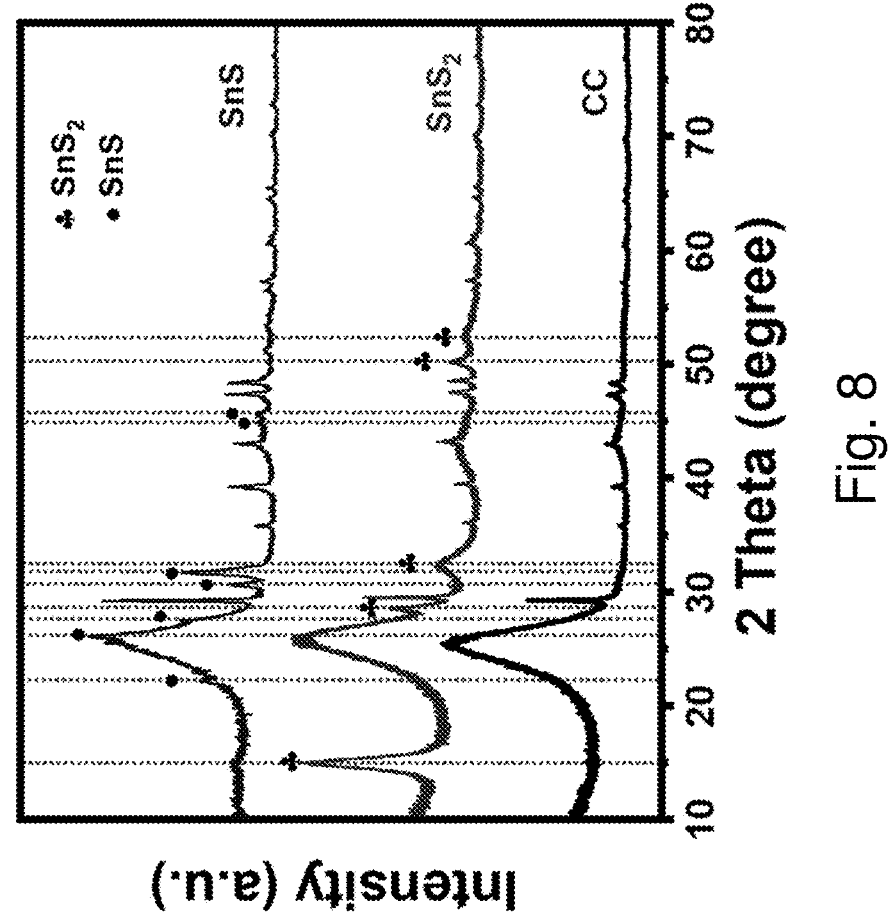
FIG. 8 shows the XRD patterns of carbon cloth, $SnS_2$ and SnS.

Through DFT calculation, the smaller bandgap of SS NS (0.958 eV) compared to $SS_2$ NS (1.404 eV) suggests a relatively high intrinsic conductivity. (FIGS. 7A and 7B) Based on the X-ray diffraction (XRD) results in FIG. 8, after CV cycles, the hexagonal $SnS_2$ phase with cell parameters of 3.6486 Å×5.8992 Å (JCPDS card No. 23-0677) converts into the orthorhombic SnS phase with cell parameters of 11.2 Å×3.99 Å×4.34 Å (JCPDS card No. 65-3812).

Figure 9B:
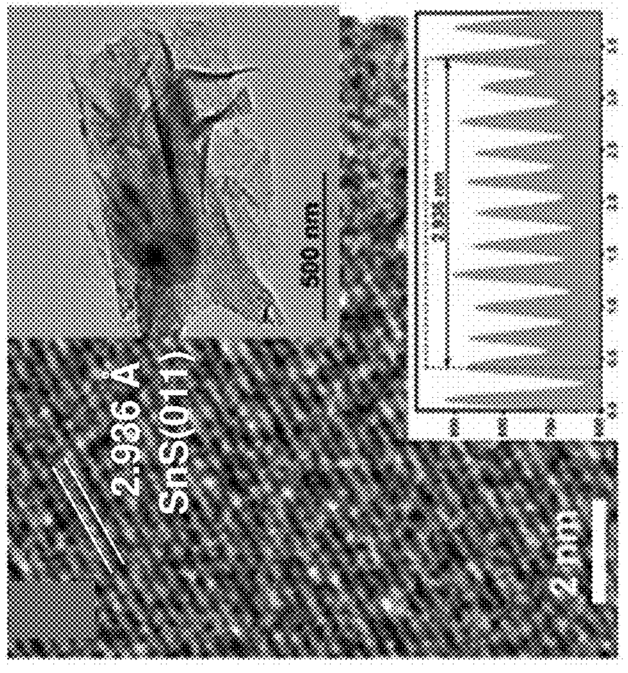
FIG. 9B is a HRTEM image of SnS, with the upper and lower insert figures being the TEM image and intensity profile showing corresponding lattice fringes, respectively.
Figure 9A:
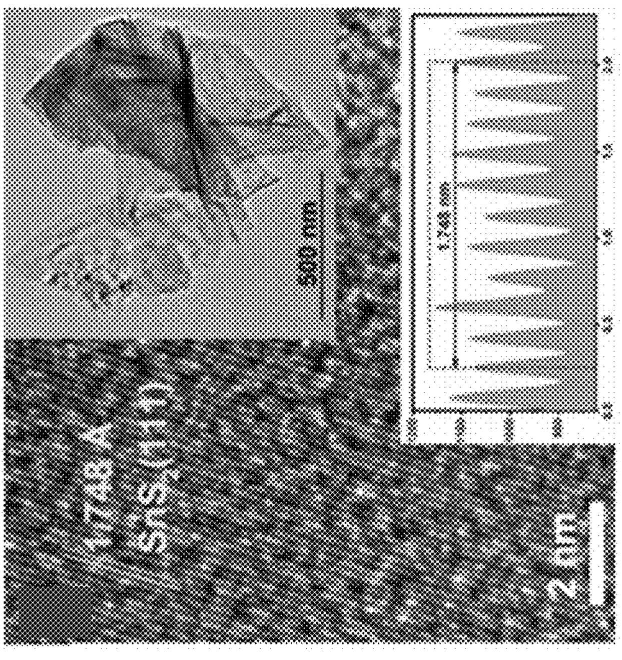
FIG. 9A is a HRTEM image of $SnS_2$, with the upper and lower insert figures being the TEM image and intensity profile showing corresponding lattice fringes, respectively.

In the high-resolution transmission electron microscopy (HRTEM) images (FIGS. 9A and 9B), the characteristic lattice fringes of 1.748 Å corresponding to hexagonal $SnS_2$ (111) are observed, which is well differentiated from the typical lattice spacing of 2.936 Å assigned to orthorhombic SnS (011). These results prove the successful conversion from $SnS_2$ to SnS by in situ electrochemical reduction while keeping the flake structure and good crystallinity. Whereafter, active diatomic Pt—Ce pairs were used to regulate the interlayer spacing to study the influence on $eNO_3RR$.

Figure 10:
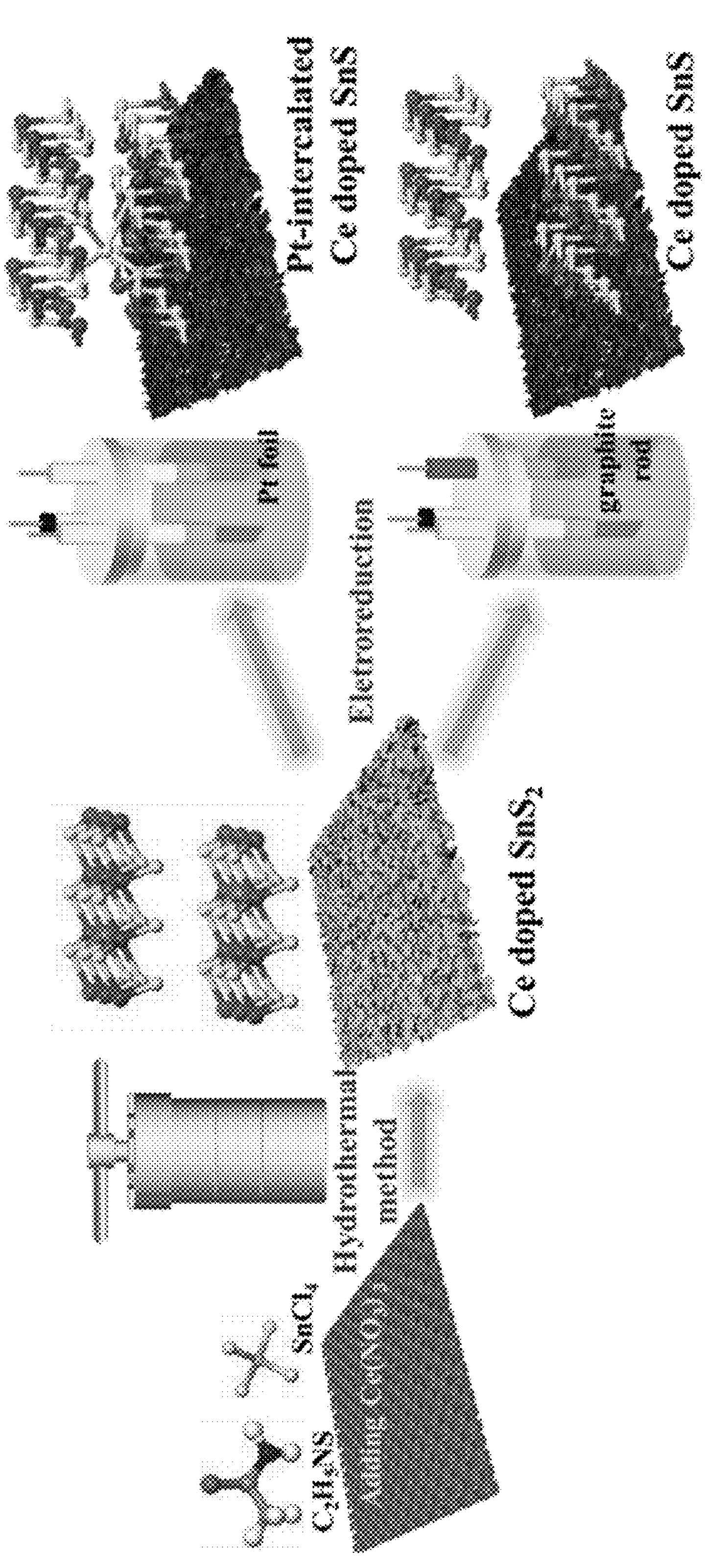
FIG. 10 is a schematic diagram illustrating the synthetic procedures of $Ce_x$—$SS_2$, $Ce_x$—SS, and $Pt_y/Ce_x$—SS.
Figure 11:
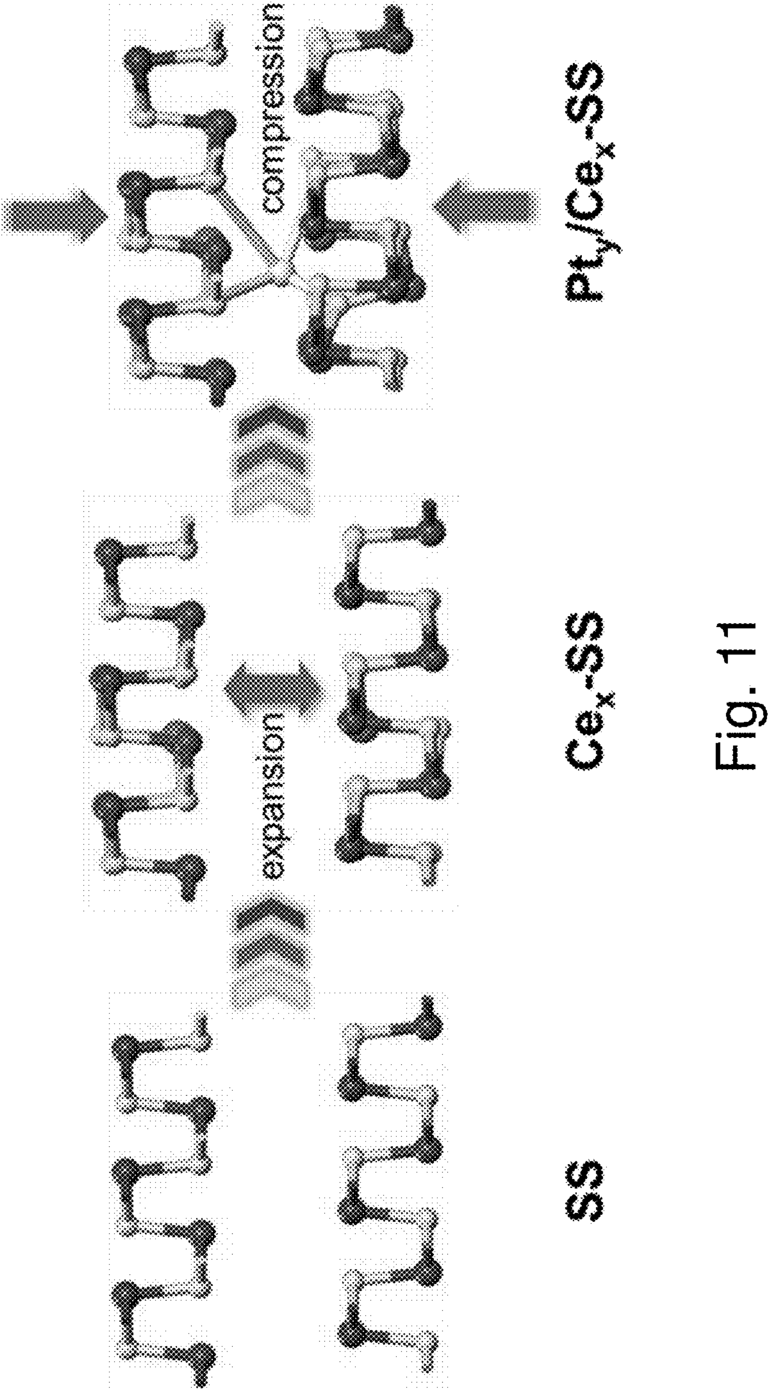
FIG. 11 is a schematic representation illustrating the interlayer spacing regulation of SnS, $Ce_x$—SS, and $Pt_y/Ce_x$—SS, in which Ce atom doping and Pt atom insertion achieve expansion and compression of the interlayer spacing of SnS, respectively.

Ce atoms with different concentrations were first introduced into parallel $SS_2$ NS, which also offer the active sites for stabilizing monodispersed Pt atoms that profited from their strong interaction. Pt atoms were then inserted by the CV process; in the meantime, $SS_2$ NS experience phase conversion and changes into SS NS (FIGS. 10 and 11).

The interlayer spacing information of layer structure of SS, Ce doped SS ($Ce_x$—SS, x represents the atomic percent of Ce elements), and Pt-intercalated Ce doped SS ($Pt_y/Ce_x$—SS, y represents the atomic percent of Pt elements) are illustrated in the HRTEM images (FIGS. 12A-12C), whereas the detailed ratios of Ce and Pt are summarized in FIGS. 3A and 3B. It confirms that the fringes are about 5.672 Å by measuring the distance of adjacent SS NS. After Ce doping, the interlayer spacings expand from 5.858 Å of $SS_2$ NS to 6.030 Å of $Ce_{0.5}$—$SS_2$ due to the electron transfer from Ce to the anti-bonding of $SnS_2$ that increases the repulsive force between adjacent layers (FIGS. 13A and 13B). Further evidence will be provided in the later part of the present disclosure.

Figure 12B:
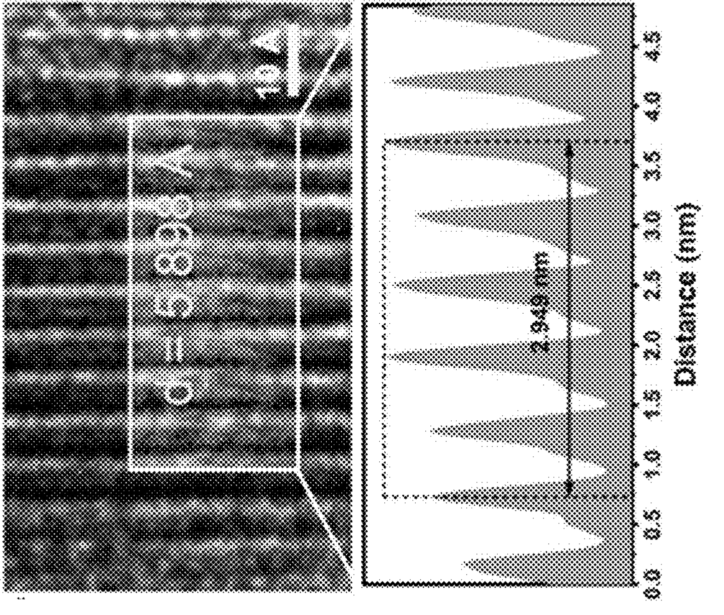
FIG. 12B is a HRTEM image of the layered edges of $Ce_{0.5}$—SS, with the bottom panel being the intensity profiles corresponding to the areas marked by the rectangle in the HRTEM image.
Figure 12A:
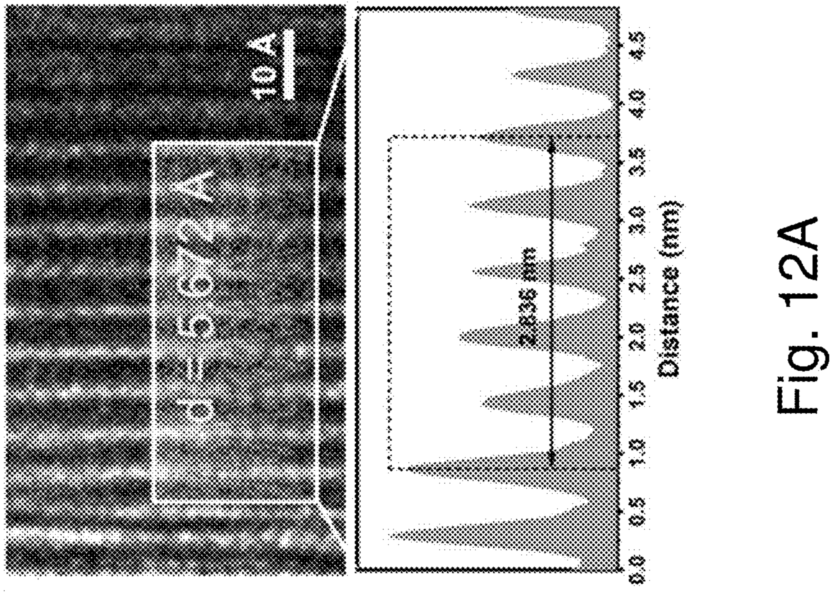
FIG. 12A is a HRTEM image of the layered edges of SS, with the bottom panel being the intensity profiles corresponding to the areas marked by the rectangle in the HRTEM image.
Figure 12C:
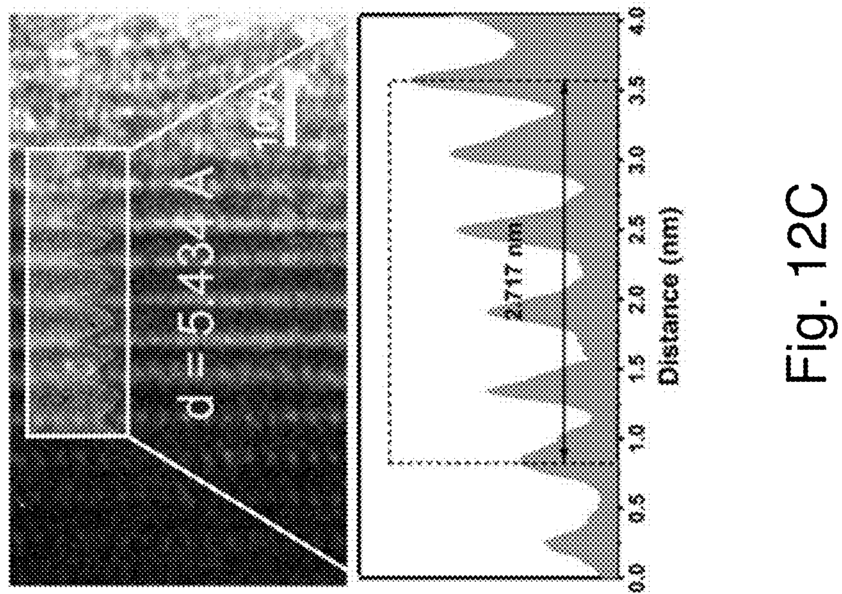
FIG. 12C is a HRTEM image of the layered edges of $Pt_{0.9}/Ce_{0.5}$—SS, with the bottom panel being the intensity profiles corresponding to the areas marked by the rectangle in the HRTEM image.
Figures 13A, 13B:
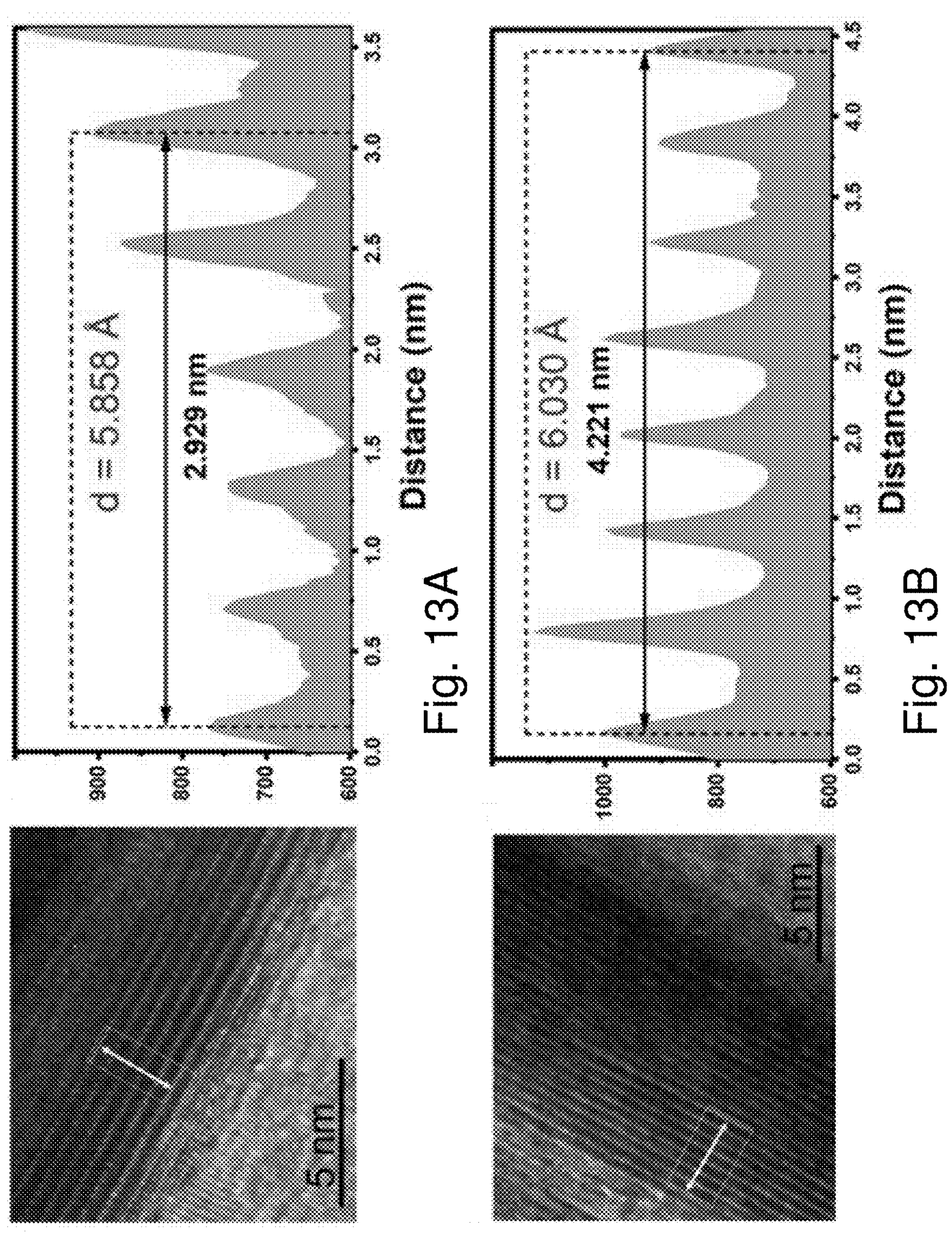
FIG. 13A shows the HRTEM image of the layered edges of $SS_2$ NS (left panel) and the intensity profiles (right panel) in the selected region marked by the dashed box in the HRTEM image.
FIG. 13B shows the HRTEM image of the layered edges of $Ce_{0.5}$—$SS_2$ NS (left panel) and the intensity profiles (right panel) in the selected region marked by the dashed box in the HRTEM image.
Figure 14A:
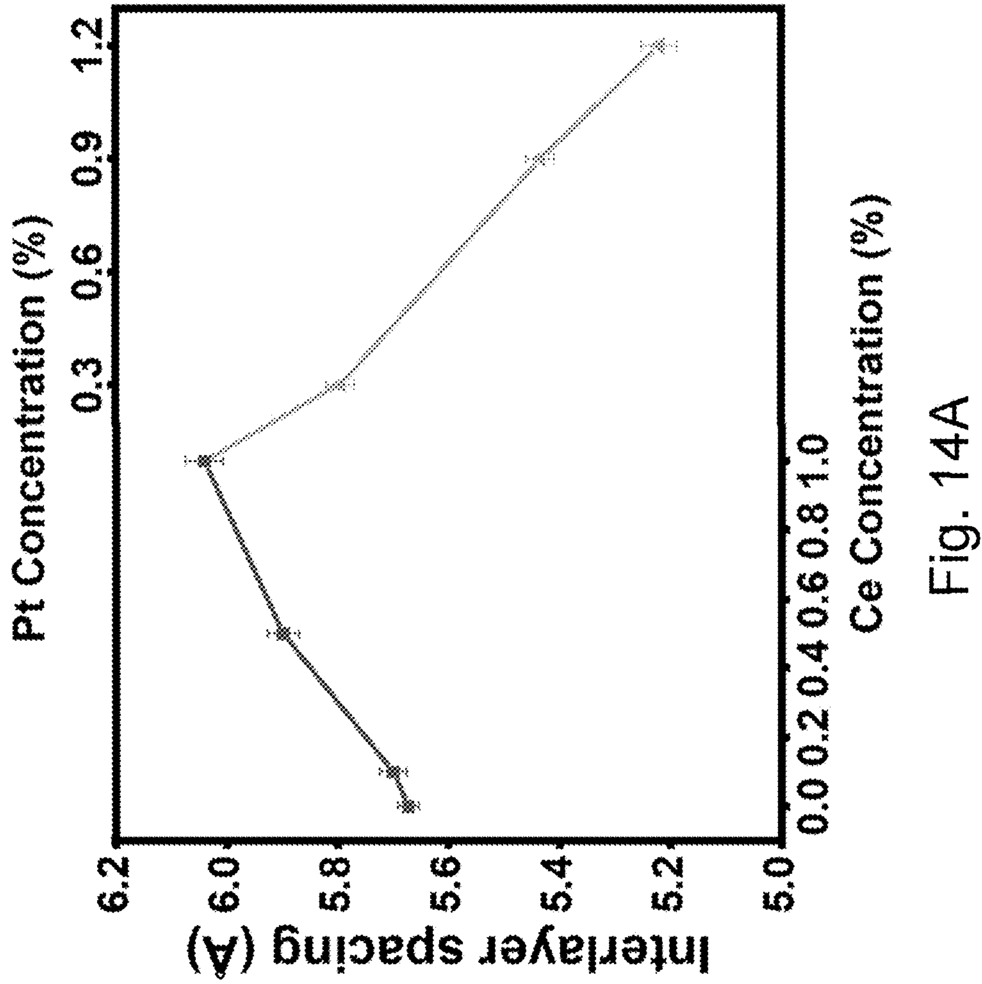
FIG. 14A shows the relationship between the interlayer spacing of SS NS with Ce doping and Pt intercalating. Error bars represent standard deviation over 10 independent replicates at least.
Figure 15A:
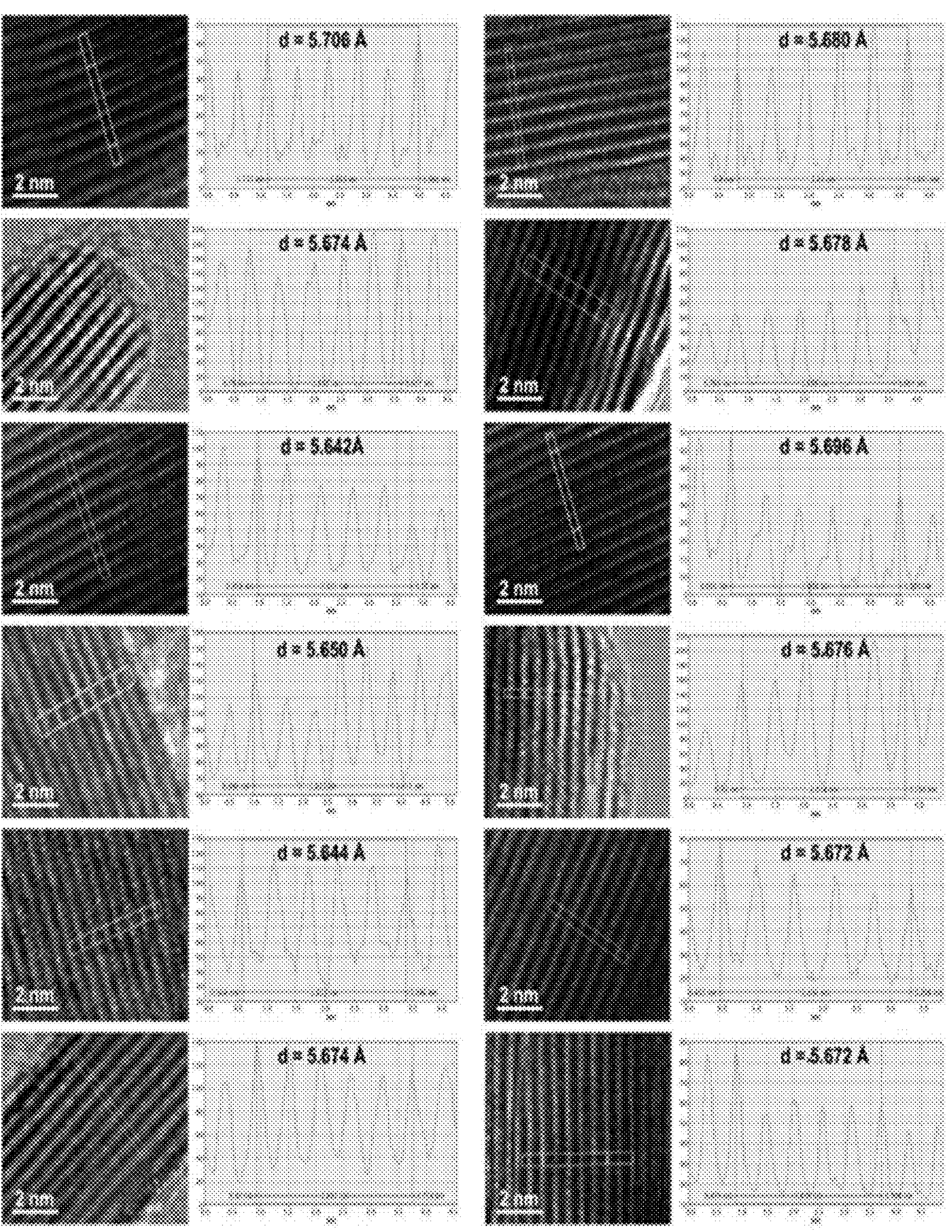
FIG. 15A shows the HRTEM images of the layered edges of SS NS and the corresponding intensity profiles in the selected regions.
Figure 15B:
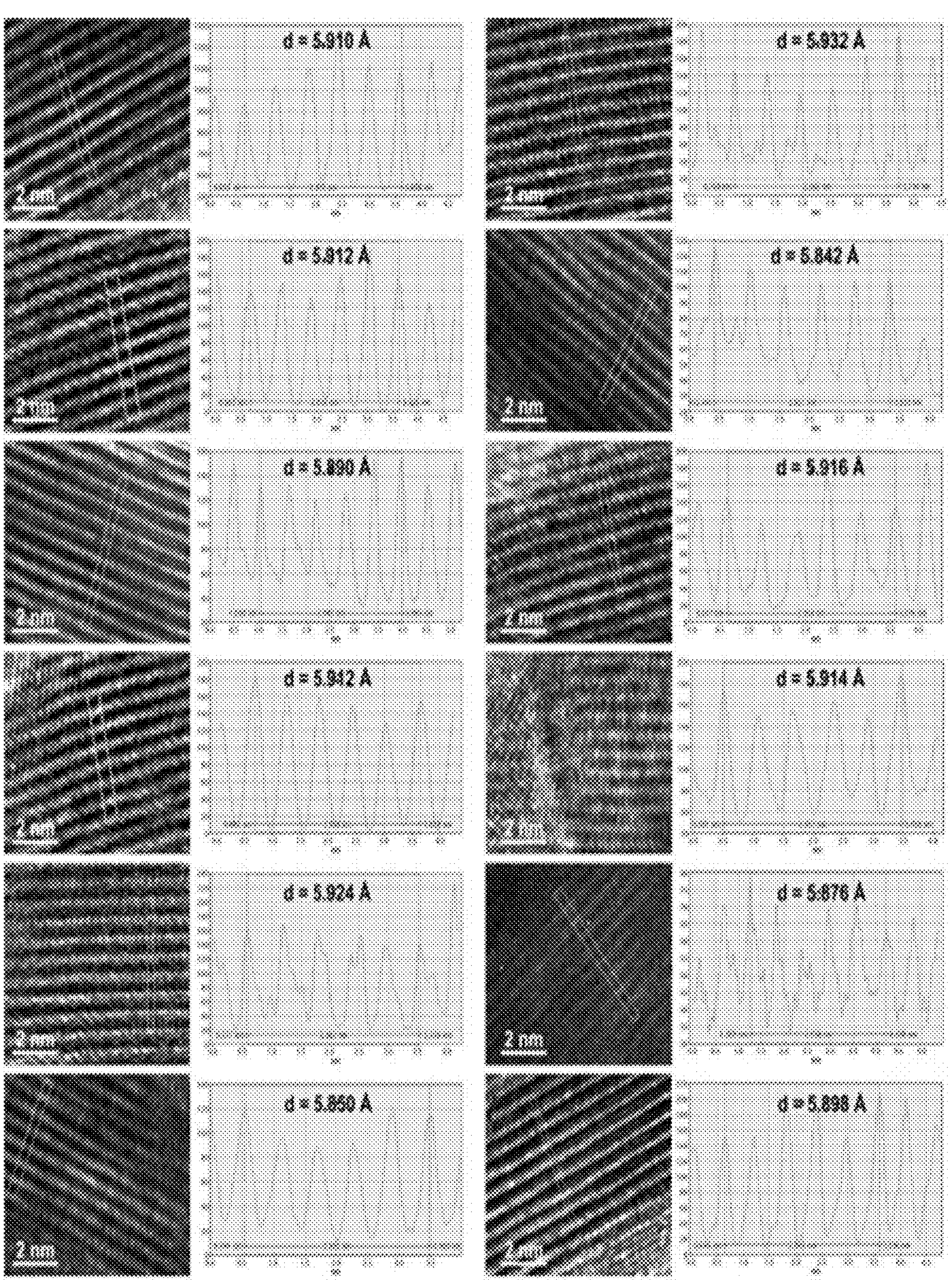
FIG. 15B shows the HRTEM images of the layered edges of $Ce_{0.5}$—SS and the corresponding intensity profiles in the selected regions.
Figure 15C:
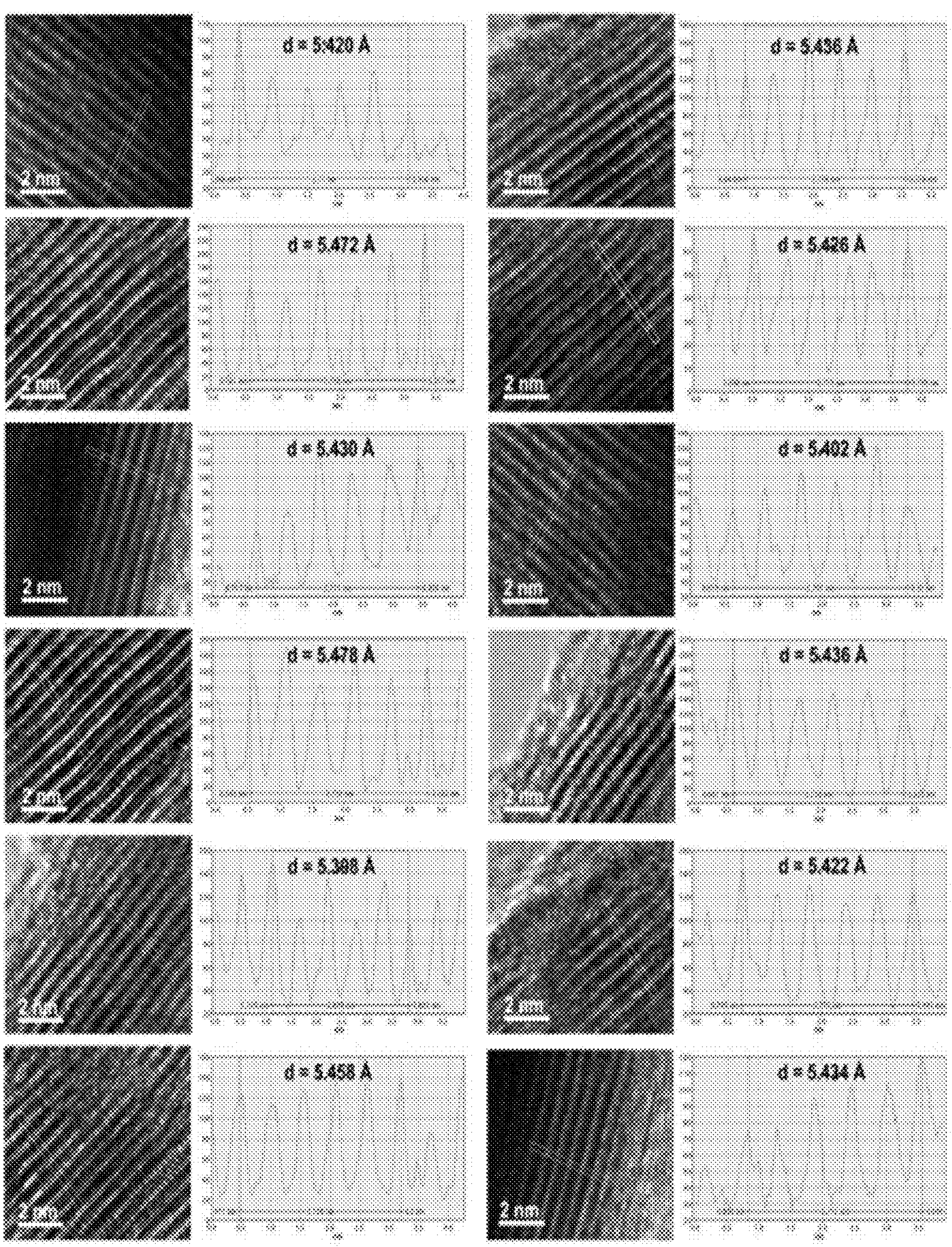
FIG. 15C shows the HRTEM images of the layered edges of $Pt_{0.9}/Ce_{0.5}$—SS and the corresponding intensity profiles in the selected regions.

Such expansion behavior decreases slightly after the phase conversion from $SS_2$ NS to SS NS but remains larger than the un-doped SS NS (FIG. 12B). The single Pt atoms were then intercalated into the interlayer of $Ce_{0.5}$—$SS_2$ by the CV process. The inventors unexpected found that the embeddedness of metal atoms in this work leads to the compression of interlayer spacing rather than an expansion that is typically observed in other reported 2D materials. This may be attributed to the strong interaction of active diatomic Pt—Ce pairs, which could enhance the forces of adjacent layers, thus closing the distance between SS layers. The compressed interlayer spacing of $Pt_{0.9}$/$Ce_{0.5}$—SS is determined to be about 5.434 Å (FIG. 12C). The average interlayer spacing values collected from over ten different locations in each sample are shown in FIGS. 14A and 14B. The detailed statistical process of SS, $Ce_{0.5}$—SS and $Pt_{0.9}$/$Ce_{0.5}$—SS, the main discussion objects, are shown in FIGS. 15A-15C.

Along with the increased concentration of Ce and Pt elements, it exhibits an excellent linear relationship. That said, when the Ce concentration elevates from 0% to 1.0%, the interlayer spacing in SS NS achieves an increase from 5.672±0.019 Å to 6.040±0.034 Å. As for Pt intercalation, the interlayer spacing could be gradually reduced to 5.220±0.031 Å with the increasing CV cycles, even below the value of intrinsic SS NS.

In summary, it is believed that the interlayer coupling of 2D SS NS is tunable by the active diatomic Pt—Ce pairs, which changes the interlayer spacing from 5.220±0.031 Å to 6.040±0.034 Å, or in other words a linear expansion and compression range from 6.49% to 7.97% compared to the intrinsic value of SS NS.

Figure 16:
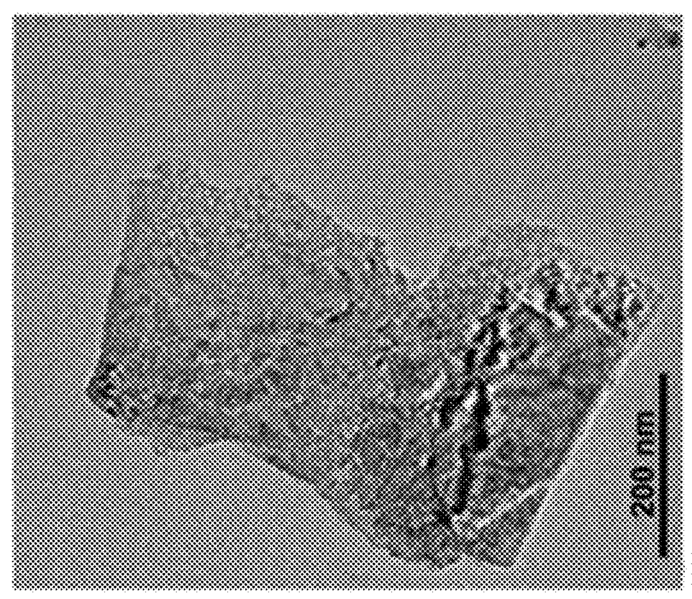
FIG. 16 is a TEM image of $Pt_{0.9}/Ce_{0.5}$—SS.
Figure 18B:
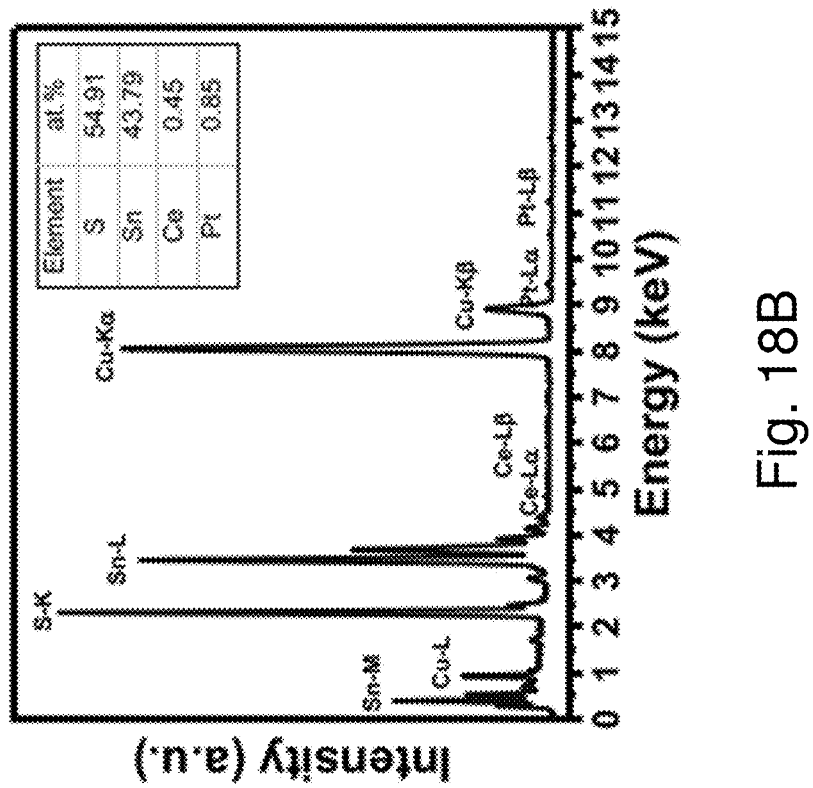
FIG. 18B shows the elemental distribution determined by TEM-EDX for $Pt_{0.9}/Ce_{0.5}$—SS. The signal of Cu results from the Cu TEM grid.
Figure 18A:
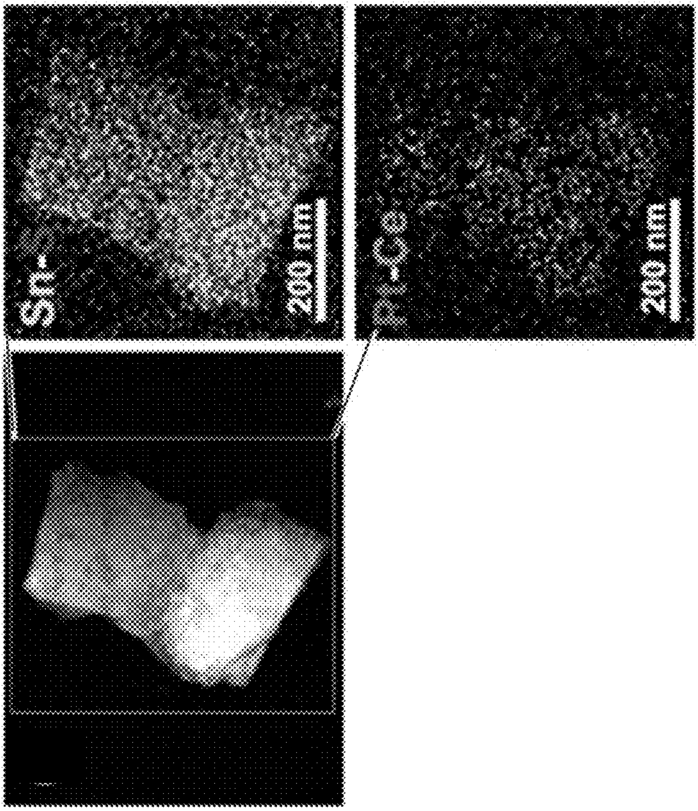
FIG. 18A shows the STEM image of $Pt_{0.9}/Ce_{0.5}$—SS and the corresponding EDX mappings.

The TEM image of $Pt_{0.9}$/$Ce_{0.5}$—SS (FIG. 16) and SEM images of the catalysts with different Pt concentrations (FIGS. 17A-17D) illustrate the flake structure similar to the initial SS NS. This observation suggests that Ce doping and Pt insertion process have no significant effect on the NS morphology. The corresponding STEM, EDX mapping and EDX spectra reveal strong Sn and S signals well-distributed in the entire nanosheet and a weak signal of Pt and Ce, which indicates the successful introduction of Pt—Ce atoms (FIGS. 18A and 18B).

Figure 19A:
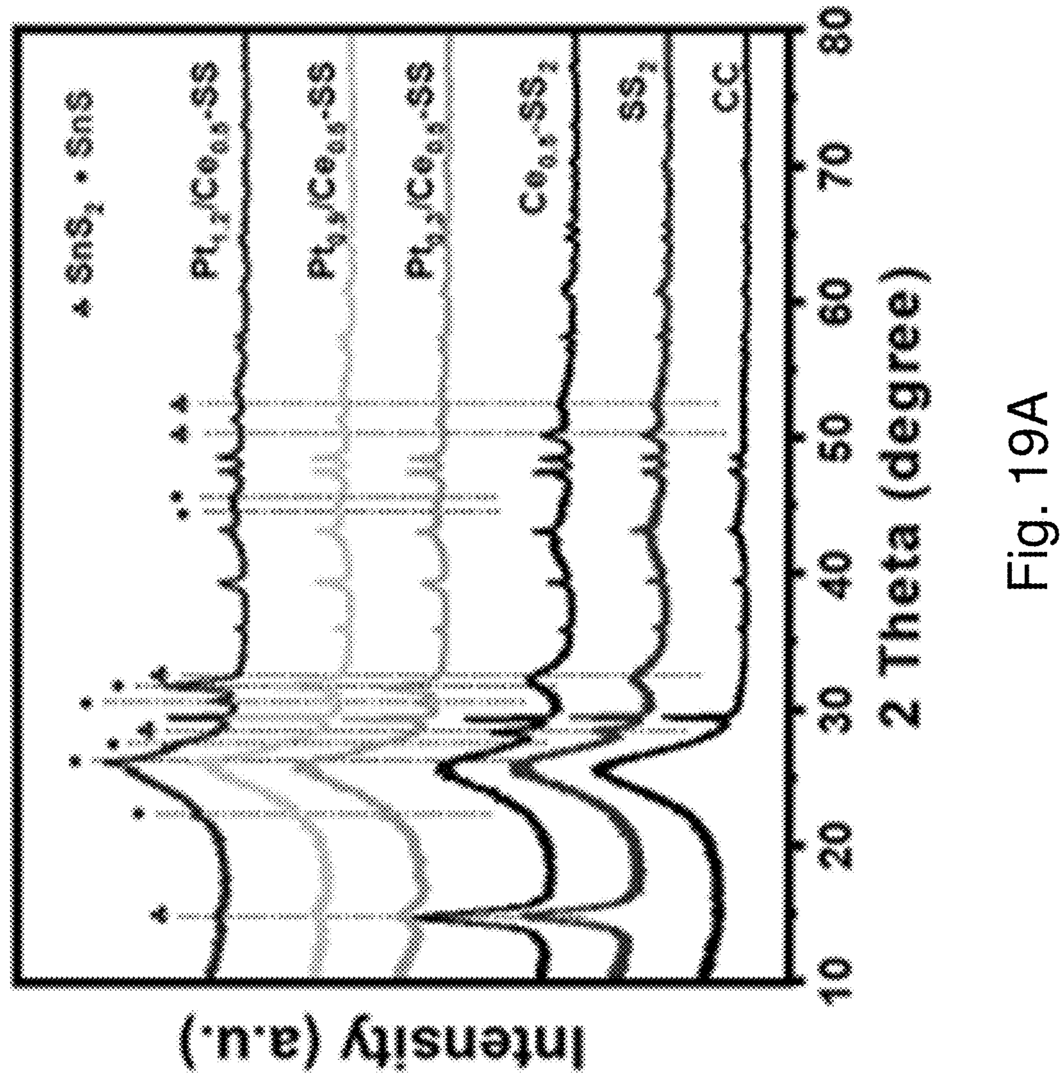
FIG. 19A shows the XRD patterns of carbon cloth, $SS_2$, $Ce_{0.5}$—$SS_2$, $Pt_{0.3}/Ce_{0.5}$—SS, $Pt_{0.9}/Ce_{0.5}$—SS, and $Pt_{1.2}/Ce_{0.5}$—SS.
Figure 19B:
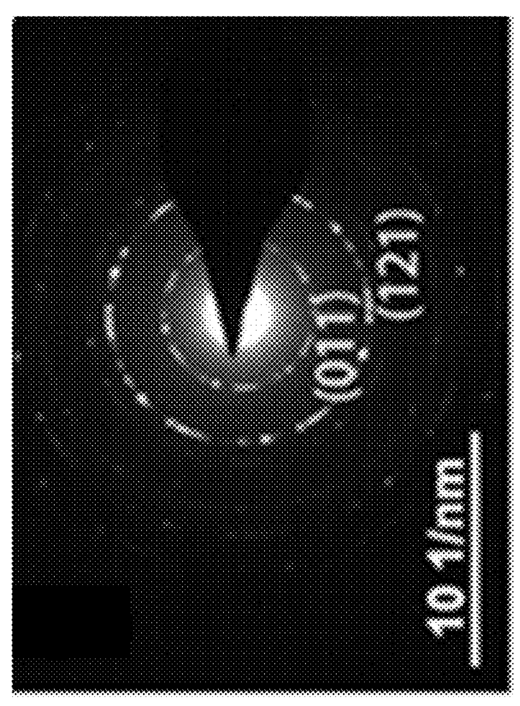
FIG. 19B shows the SAED pattern of $Pt_{0.9}/Ce_{0.5}$—SS.

Similar to the phase transition from pure $SnS_2$ to SnS, for $Ce_{0.5}$—$SS_2$, the hexagonal $SnS_2$ phase also gradually converts into the orthorhombic SnS phase, but no signal peaks of Pt- or Ce-based compounds are observed in the XRD patterns (FIG. 19A). Moreover, the selected area electron diffraction (SAED) of $Pt_{0.9}$/$Ce_{0.5}$—SS in FIG. 19B also has only the typical annulus pattern indexed to polycrystalline SnS with (011) and (121) diffraction planes.

Figure 20:
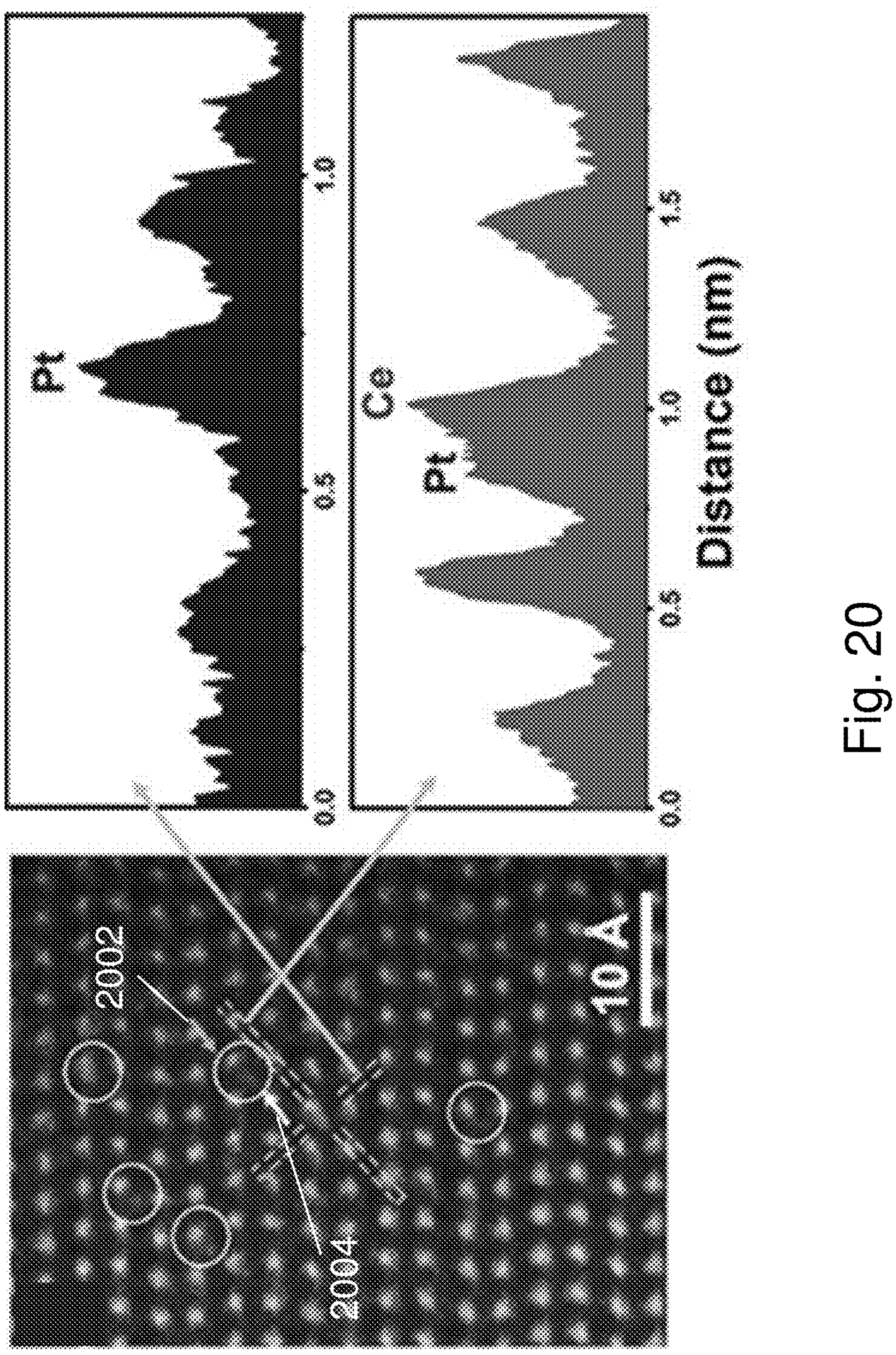
FIG. 20 shows atomic-resolution HAADF-STEM image of $Pt_{0.9}/Ce_{0.5}$—SS and the corresponding line intensity profiles in the selected regions marked by the dashed lines. The arrows 2002 and 2004 point to the Ce and Pt atom, respectively.
Figure 21:
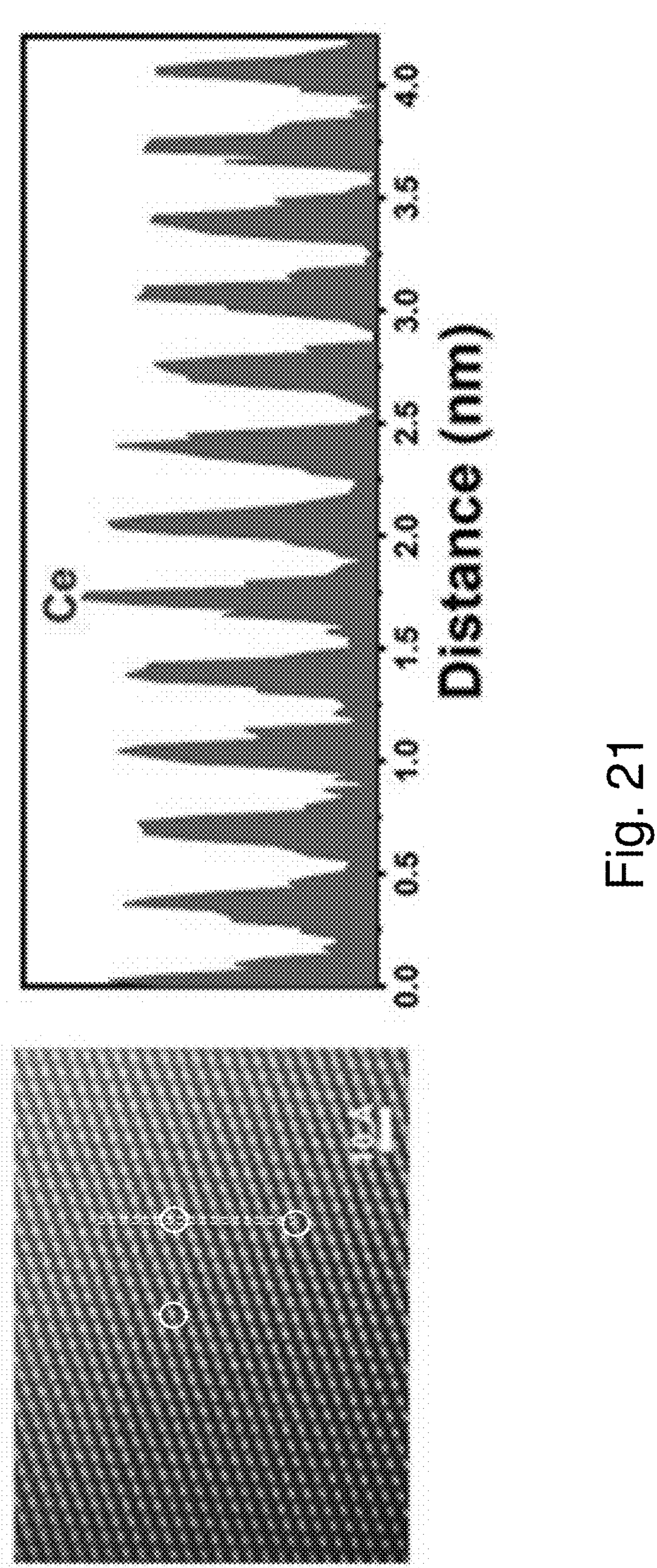
FIG. 21 shows the atomic-resolution HAADF-STEM image of $Ce_{0.5}$—SS (left panel) and the corresponding intensity profiles in the selected regions of the atomic-resolution HAADF-STEM image marked by the dashed lines. Ce atoms are marked by circles.

The atomic-resolution HAADF-STEM image of $Pt_{0.9}$/$Ce_{0.5}$—SS is shown in FIG. 20, which illuminates the effect of active diatomic Pt—Ce pairs exerted on SnS NS. It is noteworthy that some interstitial atoms appear in pair with the atoms in the lattice, which are believed to be Pt and Ce. Since no extra atoms exist in the interplanar in $Ce_{0.5}$—SS (FIG. 21) and only atoms with a relatively higher intensity profile occur in the lattice, the circled atoms occupied the Sn site in SnS could be assigned to Ce (pointed by the arrow 2002). Therefore, regarding $Pt_{0.9}$/$Ce_{0.5}$—SS, the interstitial atoms pointed by the arrow 2004 could be Pt atoms. The different brightness of these interstitial atoms may be ascribed to various heights compared to the measured surface. As a result, in diatomic Pt—Ce affected SS NS, Ce atoms are doped by substituting Sn on Sn sites, while Pt single atoms are intercalated into SS NS and stabilized by Ce. This conclusion may be supported by the following measurements.

Figures 22A, 22B:
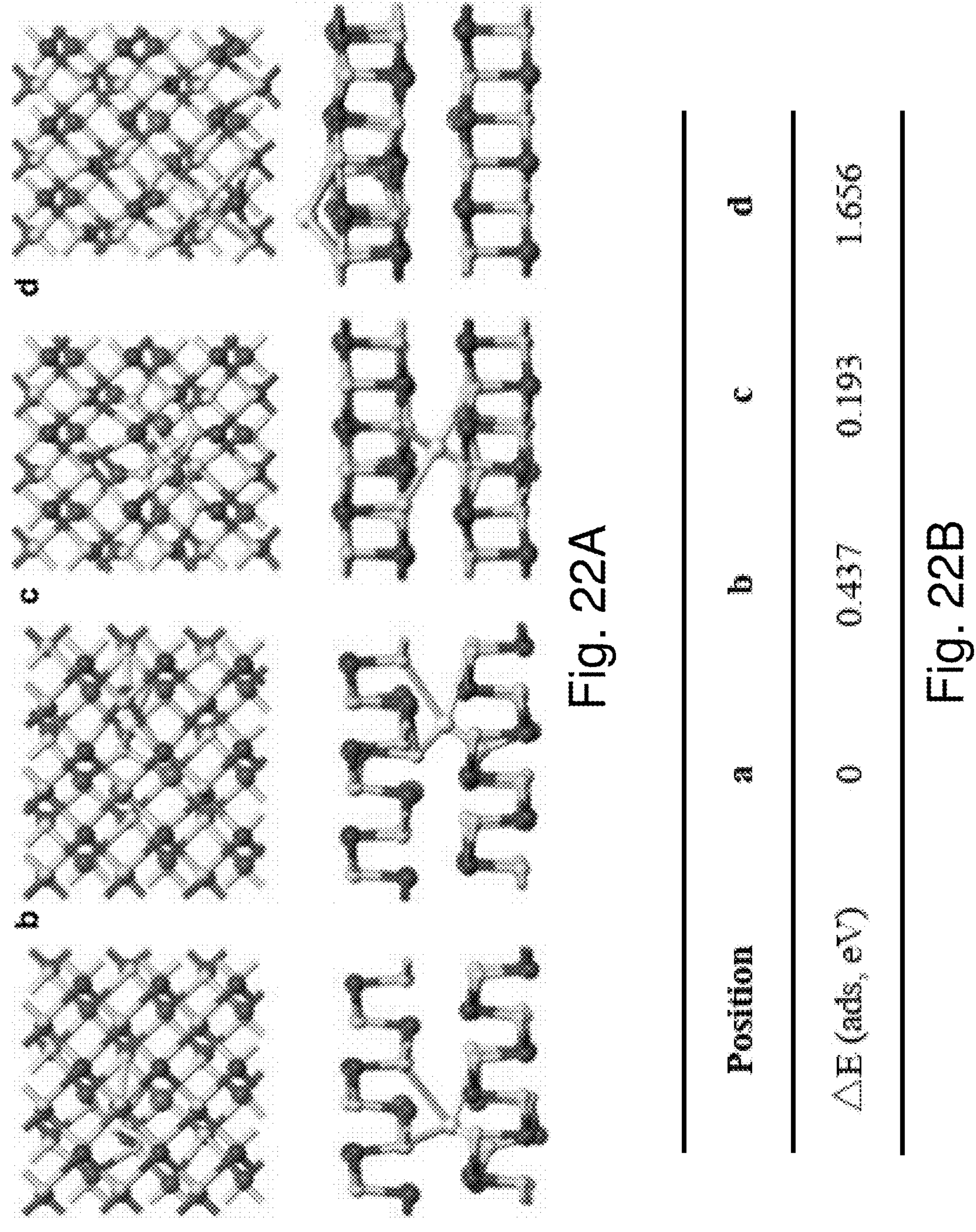
FIG. 22A shows the adsorption of Pt single atom on $Ce_x$—SS at different positions. Top panel, top view; bottom panel, side view.
FIG. 22B is a table showing the adsorption energies of Pt single atom on $Ce_x$—SS at different positions shown in FIG. 22A. Position "a" is set as reference energy.
Figure 23B:
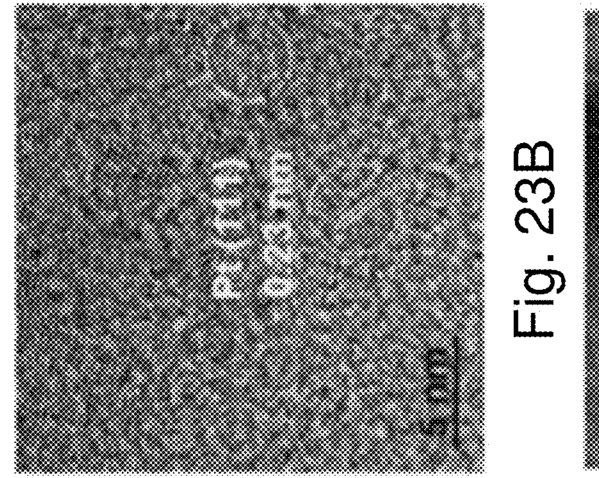
FIG. 23B is a HRTEM image of the layered edges of $Pt_{1.2}$—SS.
Figure 23D:
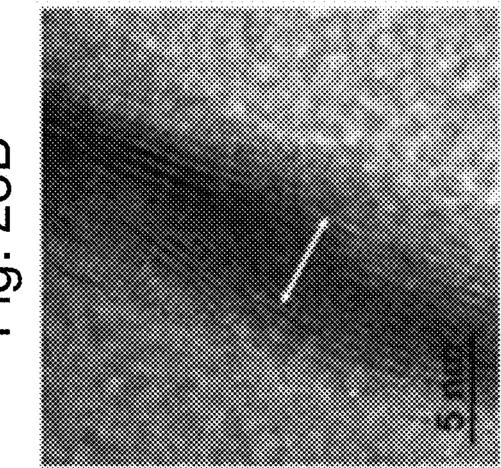
FIG. 23D is a HRTEM image of the layered edges of $Pt_{1.2}$—SS.
Figure 23A:
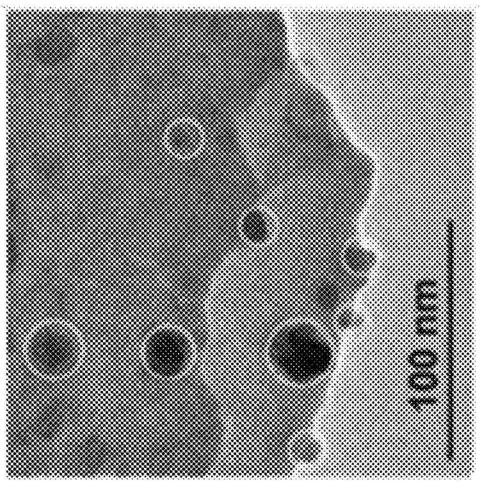
FIG. 23A is a TEM image of the layered edges of $Pt_{1.2}$—SS.
Figure 23C:
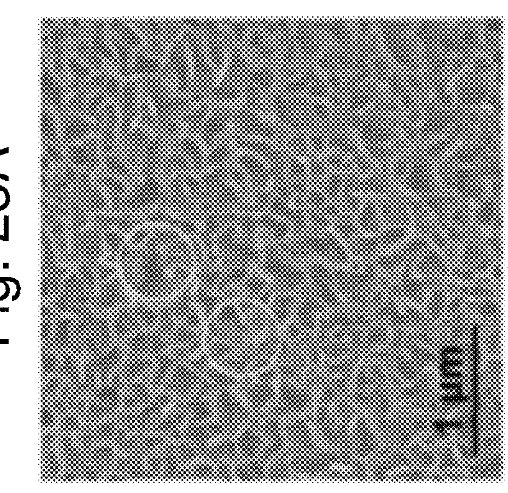
FIG. 23C is a SEM image of the layered edges of $Pt_{1.2}$—SS.
Figure 23E:
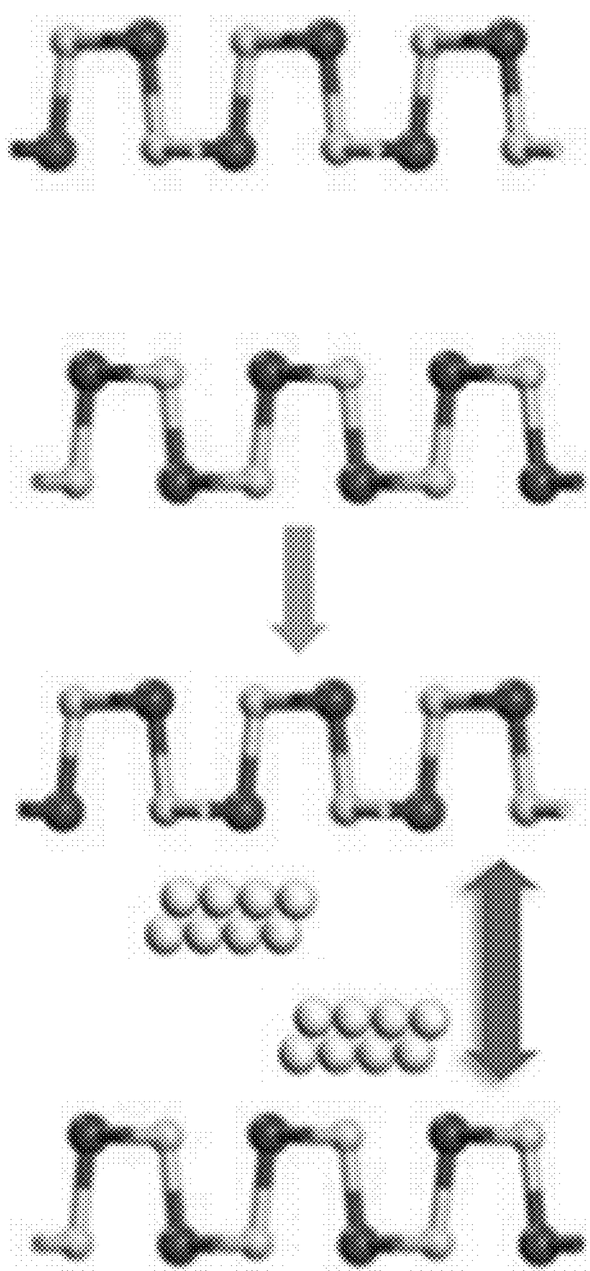
FIG. 23E is a schematic diagram illustrating the interlayer spacing regulation of $Pt_{1.2}$—SS.

Considering that the intercalated Pt atoms may probably lie on both surface or interplanar of the $Ce_x$—SS, the absorption energy of Pt single atom on $Ce_x$—SS at different positions is calculated and the results are shown in FIGS. 22A and 22B. Among the four situations, position "a" has the smallest absorption energy, which therefore being selected as the model for following DFT calculations. Meanwhile, in order to evaluate the role of Ce toward Pt, a comparison NS, $Pt_{1.2}$—SS without Ce doping was synthesized. It is evident that Pt atoms tend to aggregate to form nanoparticles without stabilizing with Ce atoms (FIGS. 23A-23D). The lattice fringes of 0.23 nm correspond to the (111) plane of Pt nanoparticles. More importantly, the aggregated Pt nanoparticles lead to the expansion of interlayer spacing unavoidably due to the swell effect (FIGS. 23D and 23E), which is coincident with previous reports that the introduction of metal ions in 2D materials would cause the expansion of interlayer spacing and increase of Fermi energy levels and band gaps owing to the extra free electrons. As such, it is believed that Ce atoms play an essential role in stabilizing the Pt singles atoms in this system, and that only through the coexistence of Pt—Ce pairs can the compression of the interlayer spacing be realized.

Example 5

Chemical Environment Variation in the Interlayer Spacing Modulation

It is believed that catalytic behaviors of materials, to a great extent, are determined by the local electronic structure and chemical environment, thus X-ray photoelectron spectroscopy (XPS) was used to analyze the change of chemical states and local structures caused by Pt—Ce diatoms in adjusting the interlayer spacing, and the detailed values of binding energies of the catalysts are summarized in FIG. 24.

Figure 25:
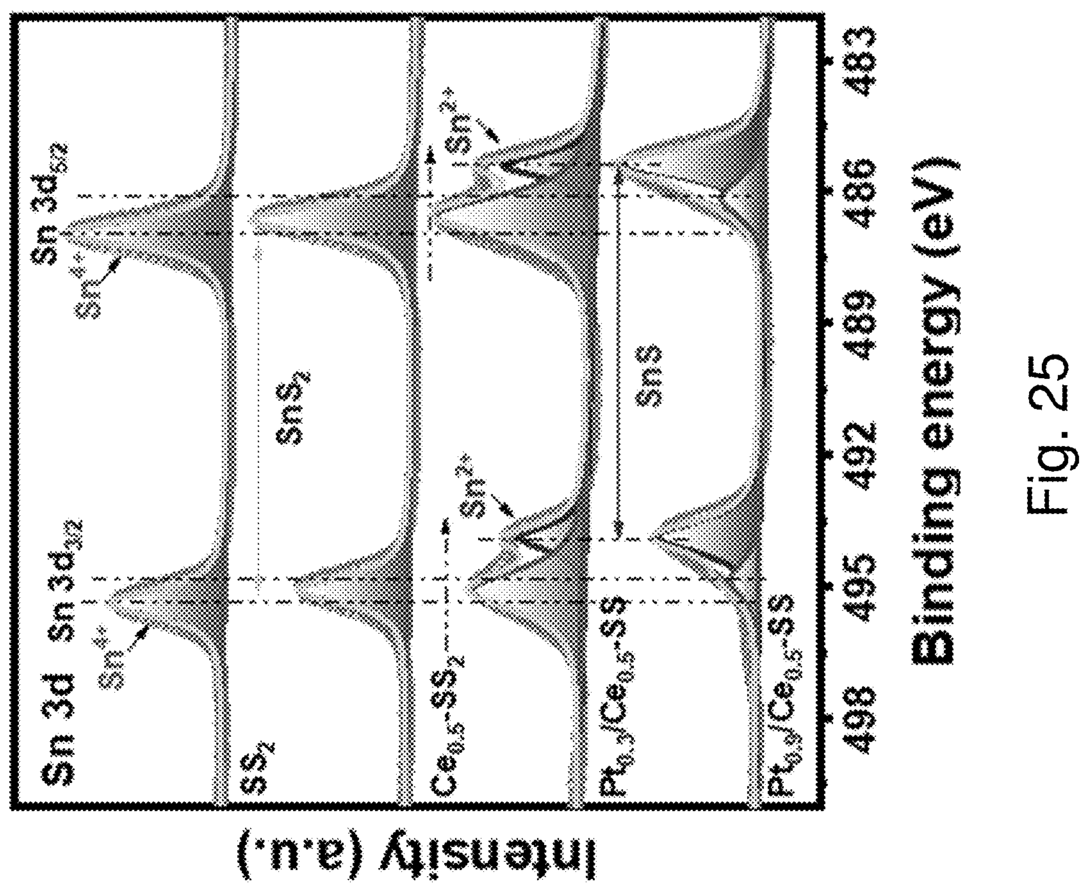
FIG. 25 is a XPS survey spectra of Sn 3d showing the local chemical environment of the interlayer-spacing-regulated samples.
Figure 26B:
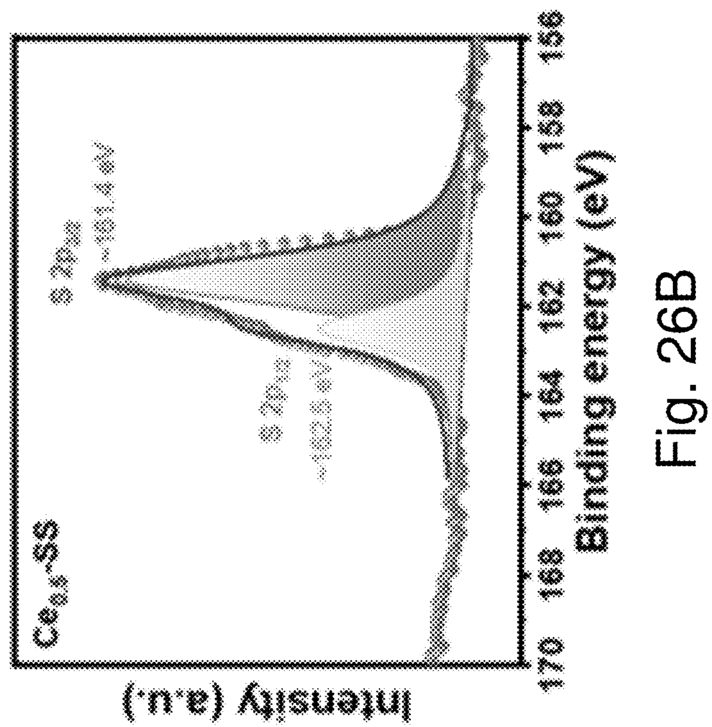
FIG. 26B is a XPS spectra of S 2p of $Ce_{0.5}$—SS.
Figure 26A:
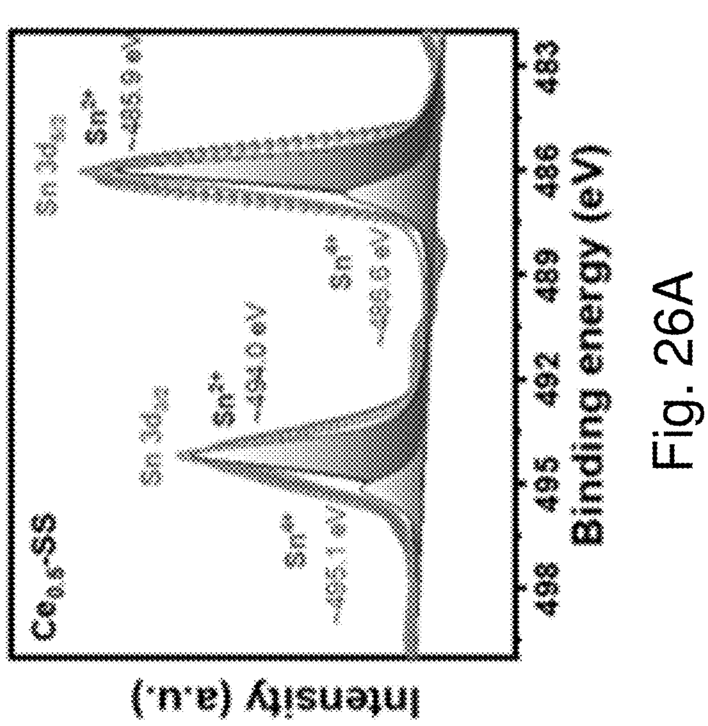
FIG. 26A is a XPS spectra of Sn 3d of $Ce_{0.5}$—SS.

As shown in FIG. 25, the binding energies of the characteristic peaks of $Sn^{4+}$ are downshifted after introducing Ce atoms, indicating that the in-plane doping of Ce does not change the chemical state of Sn but can cause the electron transfer to the host materials of $SnS_2$. Basically, such doping-induced electrons would make a repulsive force between adjacent anti-orbitals of Sn—S, resulting in a large distance between planes, as evident in the HRTEM results (FIGS. 12A-12C). The similar binding energy in $Ce_{0.5}$—SS with $Ce_{0.5}$—$SS_2$ illustrates that Ce doping has no significant role during the phase change (FIGS. 26A and 26B). With the intercalation of Pt single atoms, for one thing, $Sn^{2+}$ begins to appear and gradually increases as the Pt concentration goes up, proving the phase transformation from $SnS_2$ to SnS. For another thing, because Pt has a lower electronegativity than SnS owing to the large electronegativity of non-metallic element S, the binding energies of Sn 3d further shift to lower values after Pt intercalation.

Figure 27:
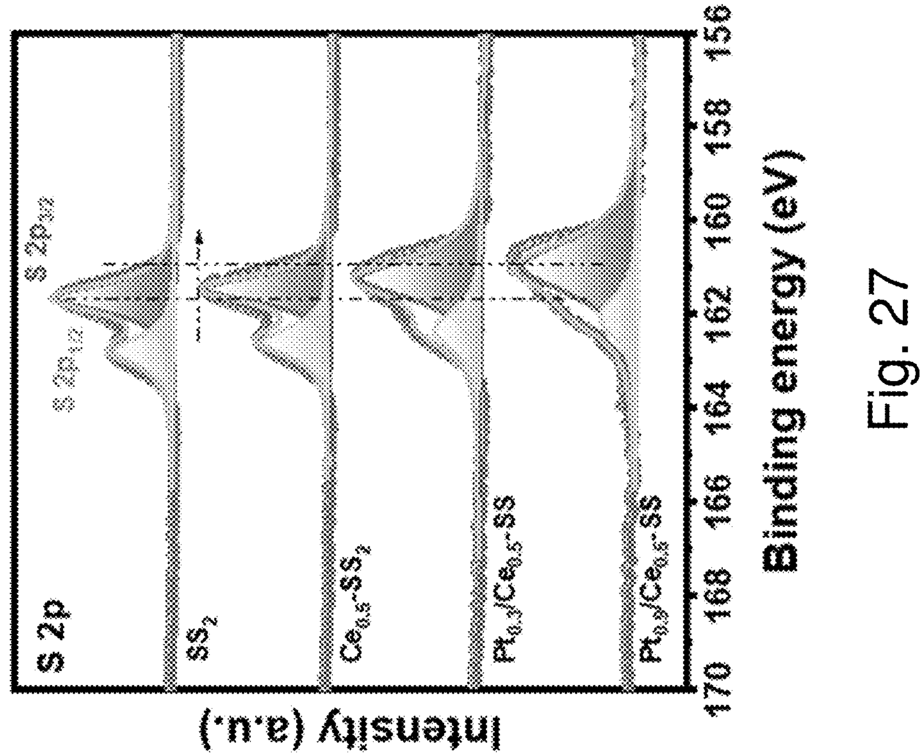
FIG. 27 is XPS survey spectra of S 2p showing the local chemical environment of the interlayer-spacing-regulated samples.
Figures 28A, 28B:
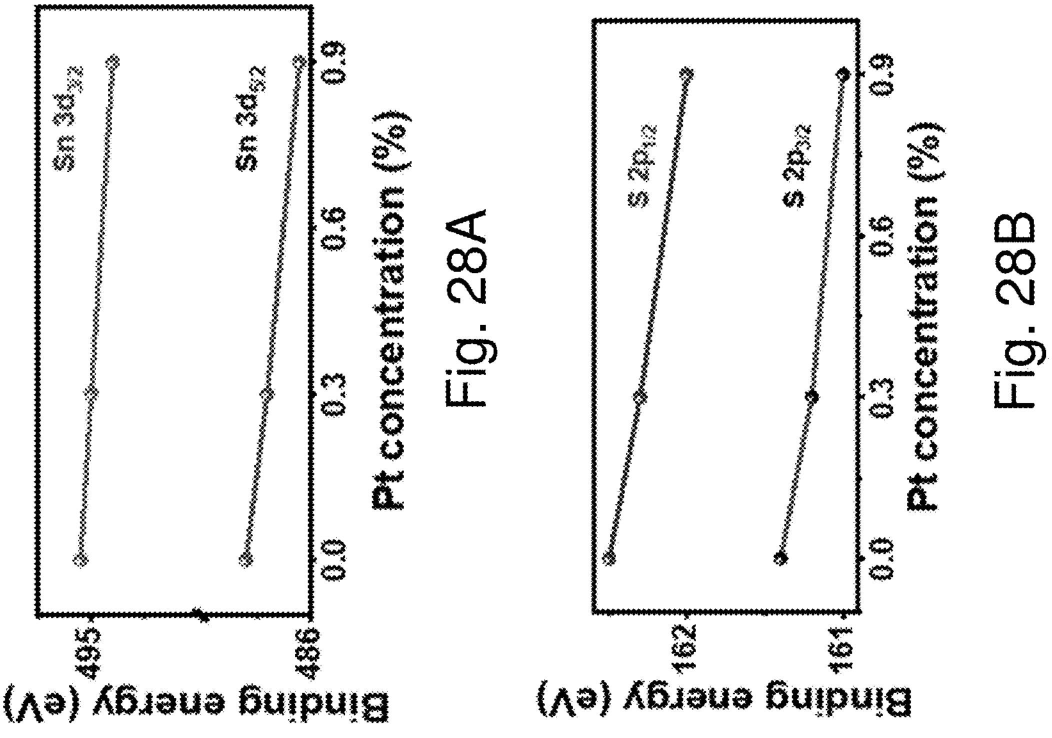
FIG. 28A shows the binding energy variation of Sn 3d with increasing Pt concentration.
FIG. 28B shows the binding energy variation of S 2p with increasing Pt concentration.

As shown in FIG. 27, XPS spectra of S 2p can be deconvoluted into peaks of S $2p_{1/2}$ and $2p_{3/2}$, corresponding to $S^{2-}$. For a clear comparison, the line graphs in FIGS. 28A and 28B show the binding energy variation of Sn 3d and S 2p. Both binding energies have a downward tendency with the increasing Pt concentration, confirming the electrons transfer from Pt to the host materials of SnS.

Figure 29:
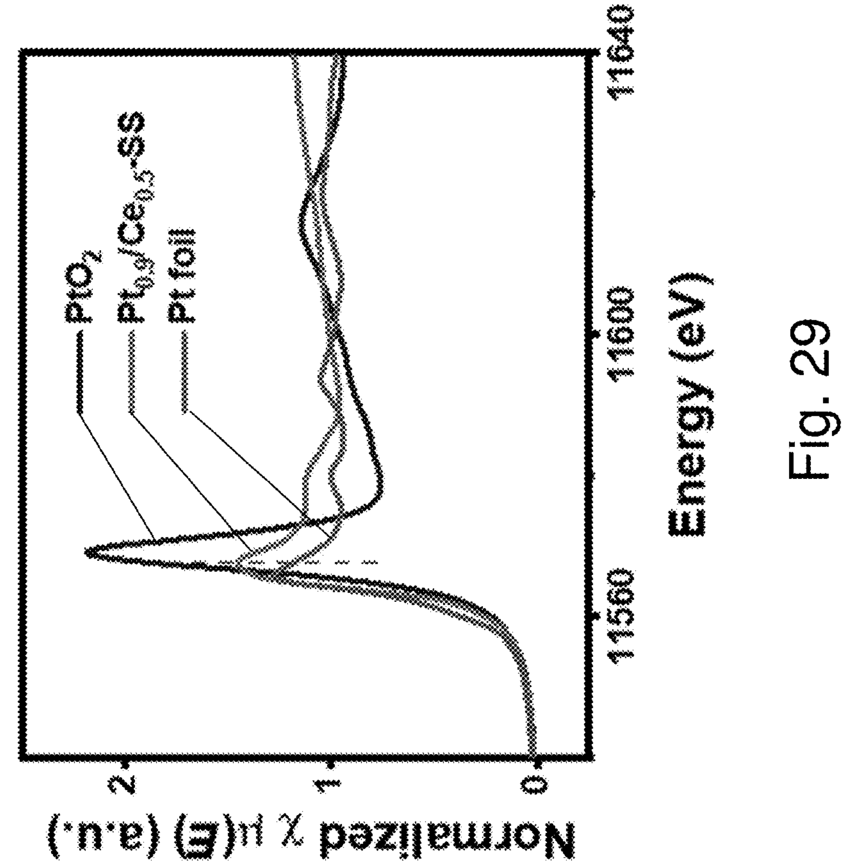
FIG. 29 shows the normalized XANES spectra at the Pt LIII-edge.
Figure 30:
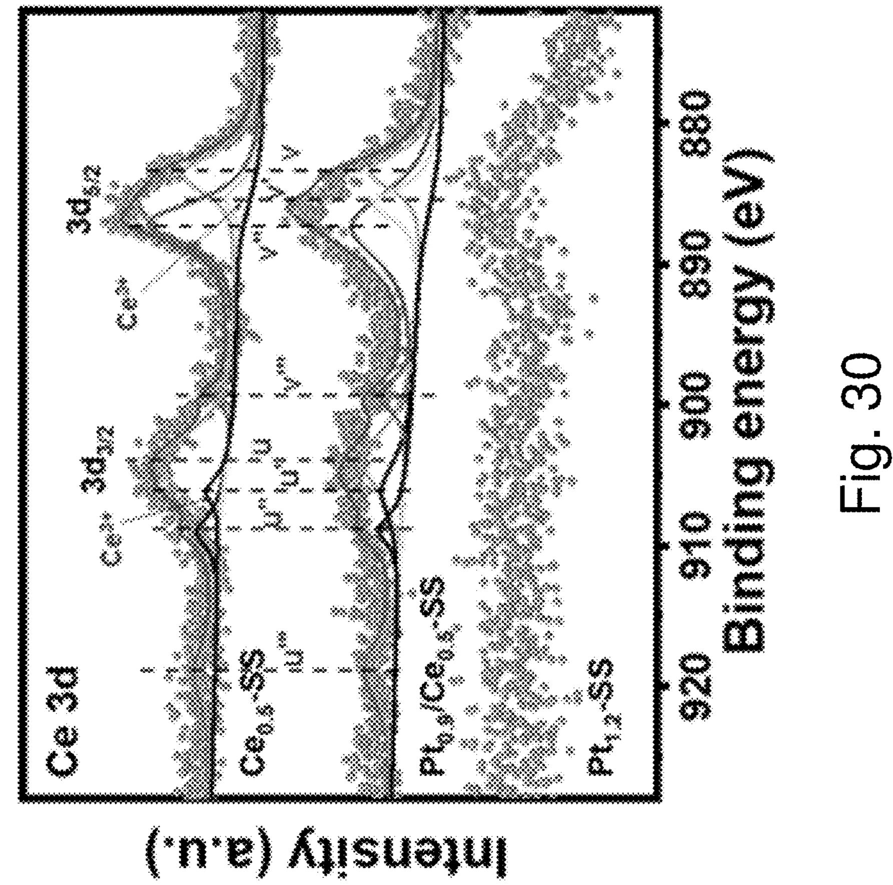
FIG. 30 shows the Ce 3d XPS spectra of $Ce_{0.5}$—SS, $Pt_{0.9}/Ce_{0.5}$—SS and $Pt_{1.2}$—SS.

X-ray absorption near-edge structures (XANES) of the Pt $L_{III}$-edge for $Pt_{0.9}/Ce_{0.5}$—SS and the reference sample Pt foil and $PtO_2$ are shown in FIG. 29. The energy of absorption edge and the height of white-line are higher than those of Pt foil but lower than $PtO_2$, which demonstrates the electrons flow from Pt atoms to SnS. Additionally, the electrons transfer also affects the valence states of Ce, as evidenced by the larger portion of v'+u' (~19.31%) that index to III valence to the area of all the peaks in $Pt_{0.9}/Ce_{0.5}$—SS than that for $Ce_{0.5}$—SS (~8.00%), while others index to IV valence (FIG. 30). These phenomena suggest that the incoming Ce and Pt in 2D SnS lead to the local chemical environment variation, more than adjusting the interlayer spacing, which is believed to influence the catalytic property in $eNO_3RR$.

Figure 33:
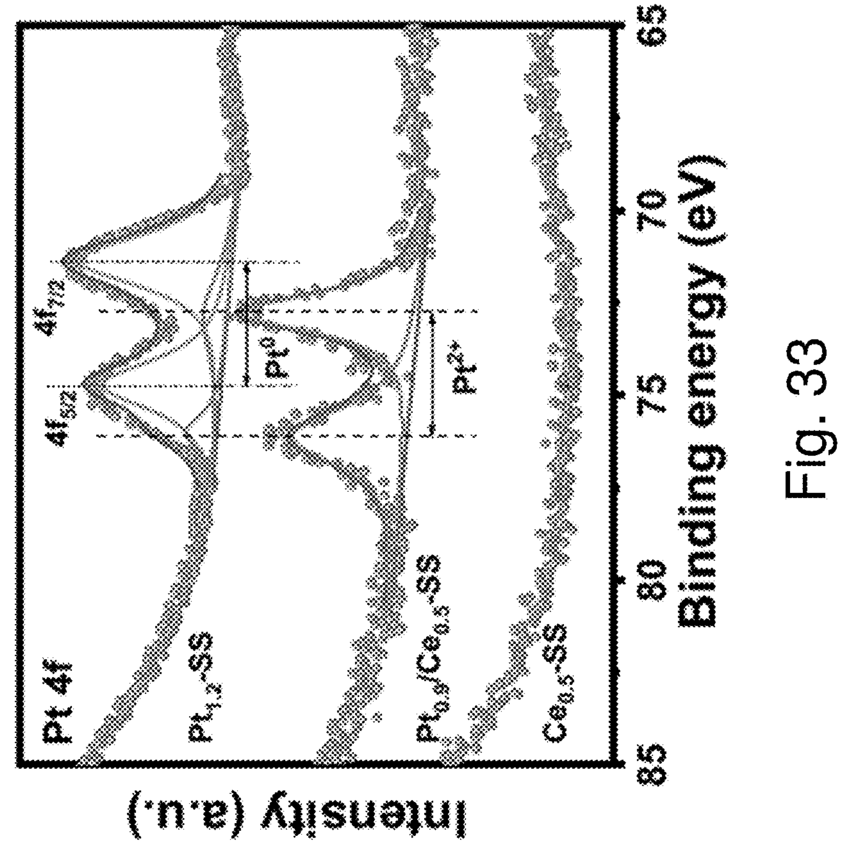
FIG. 33 shows the Pt 4f XPS spectra of $Ce_{0.5}$—SS, $Pt_{0.9}/Ce_{0.5}$—SS and $Pt_{1.2}$—SS.
Figure 34B:
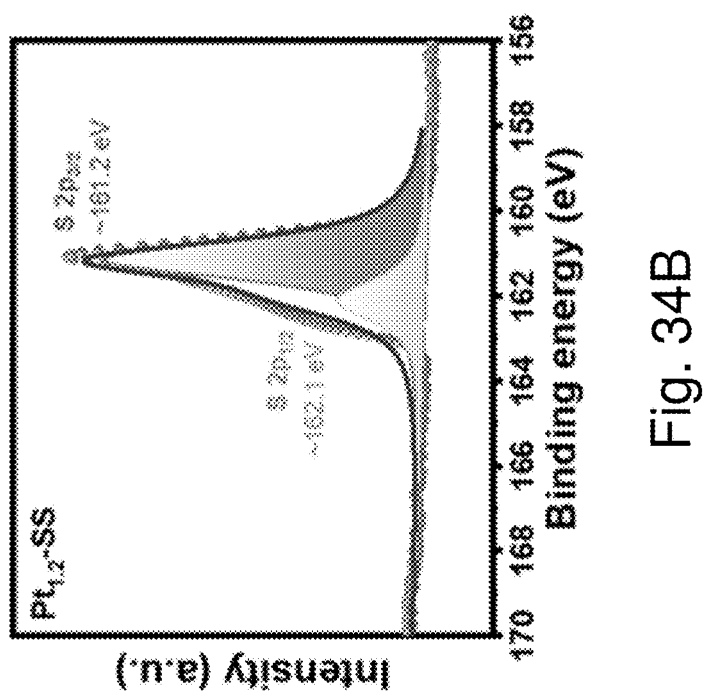
FIG. 34B shows the XPS spectra of S 2p of $Pt_{1.2}$—SS.
Figure 34A:
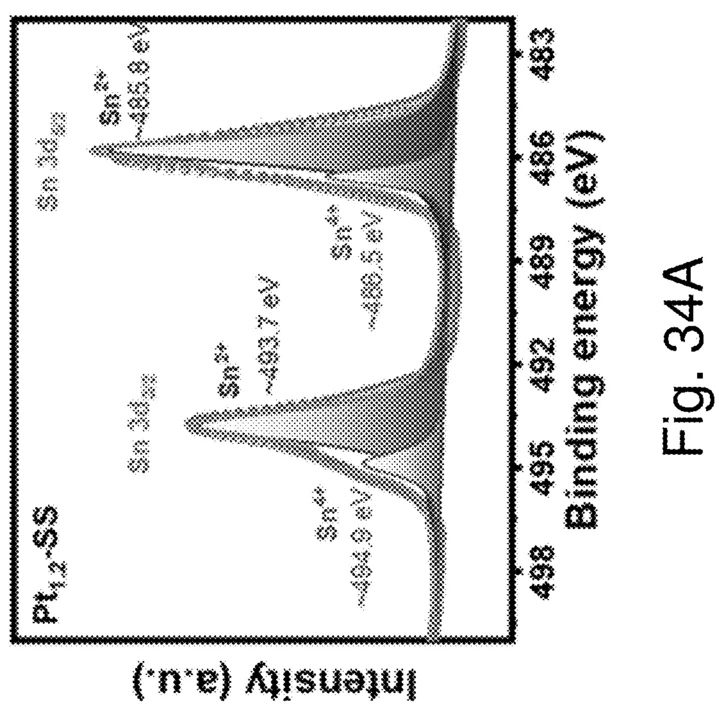
FIG. 34A shows the XPS spectra of Sn 3d of $Pt_{1.2}$—SS.

Furthermore, extended X-ray absorption fine structure (EXAFS) at Pt LIII-edge and the fitting results are shown in FIGS. 31A-31D and 32, which indicate the atomically dispersed Pt, with only Pt—S coordination structure in the first coordination shell and no evidence of a Pt—Pt scattering path in the spectra, which clearly prove that Pt is intercalated as a single atom into the SS. This result is consistent with the XPS spectra of Pt 4f, where the main peaks in $Pt_{0.9}/Ce_{0.5}$—SS at approximately 72.8 and 76.1 eV are assigned to $Pt^{2+}$, corresponding to the characteristic peak positions of Pt—S bonds (FIG. 33). This way, $Pt_{1.2}$—SS have a large percentage of $Pt^0$, emphasizing that Ce stabilizes Pt single atom to prevent Pt nanoparticles from evolving (FIGS. 33, 34A and 34B).

Figure 35:
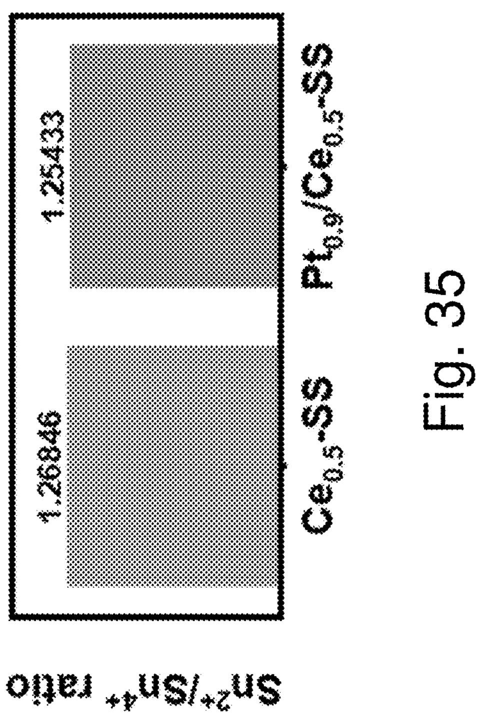
FIG. 35 shows the ratio of $Sn^{2+}/Sn^{4+}$ obtained from XPS results of $Ce_{0.5}$—SS and $Pt_{0.9}/Ce_{0.5}$—SS.
Figure 36:
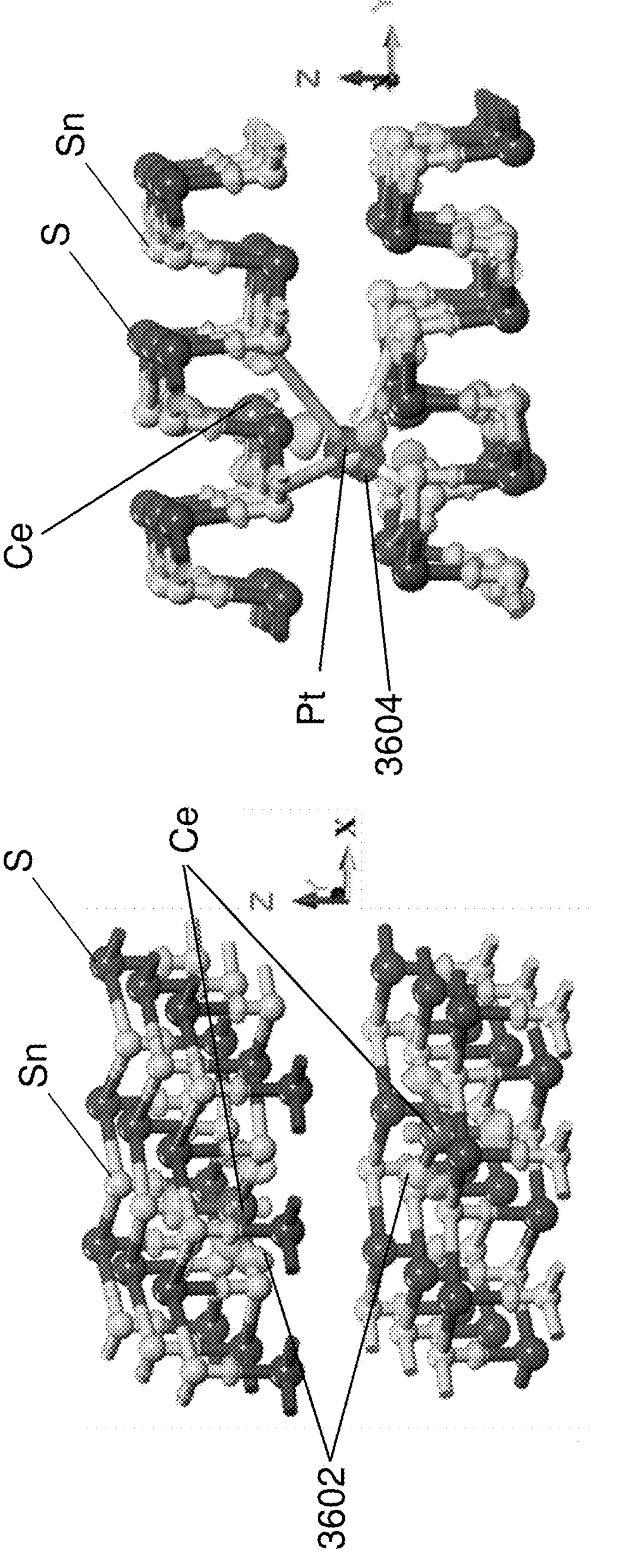
FIG. 36 is a schematic diagram illustrating the charge difference of $Ce_x$—SS (left) and $Pt_y/Ce_x$—SS (right). The isosurfaces 3602 and 3604 represent charge accumulation and depletion around Ce and Pt atoms, respectively.

The very close ratio of $Sn^{2+}/Sn^{4+}$ as shown in FIG. 35 means that Pt only exerts influence on electron transfer but not on the valence state components of Sn, further confirming that Pt single atoms are intercalated into 2D SS NS rather than doping. Therefore, although the intercalation of Pt also brings extra negative electrons, the strong diatomic Pt—Ce interaction promotes the formation of Pt—S bonds, enhancing the interlayer force and shortening the interlayer spacing. At the same time, DFT calculation was applied to study the interlayer spacing variation and electronic structure to gain further insights. To simulate the actual situation of the catalysts, the initial interlayer spacing of SS NS is set as 5.67 Å. The calculated models after geometrical optimization show the interlayer spacing of 5.67, 5.89, and 3.68 Å for SS, $Ce_x$—SS, and $Pt_y/Ce_x$—SS, respectively (FIG. 11), in accidence with the interlayer spacing variation in experimental results. Also, the charge density difference images (FIG. 36) further reveal a more robust charge redistribution around the Ce and Pt locations, which proves the electron transfer and the increase of internal electron concentration, thus enhancing the catalytic activity.

Figure 37:
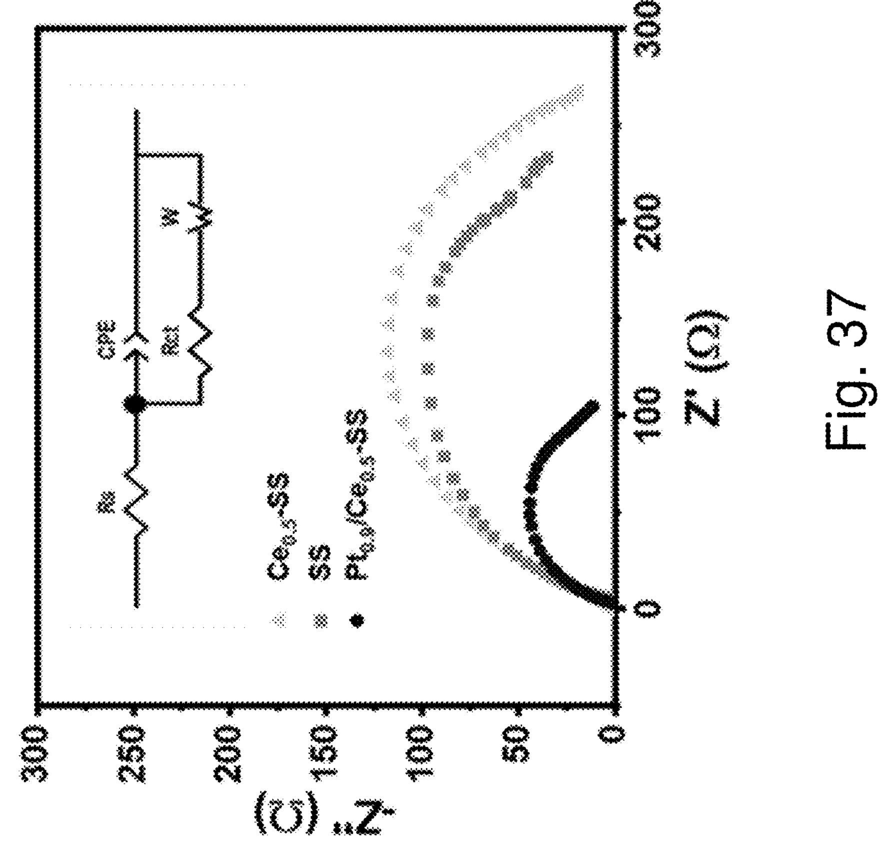
FIG. 37 shows the electrochemical impendence spectra of SS, $Ce_{0.5}$—SS, and $Pt_{0.9}/Ce_{0.5}$—SS, with the inset showing the equivalent circuit model.

The electrochemical impedance spectroscopy (EIS) result shows that $Pt_{0.9}/Ce_{0.5}$—SS exhibit a considerably smaller charge transfer resistance of 119.6Ω as compared to SS (253.1Ω) and $Ce_{0.5}$—SS (293.5Ω), indicating the obviously improved reaction kinetics of the electrodes with smaller interlayer spacing (FIG. 37).

Example 6

Electrocatalytic $eNO_3RR$ Performance

The electrocatalytic performance for $NO_3^-$-to-$NH_3$ conversion of the 2D SS NS materials with adjustable interlayer spacings is evaluated. The $eNO_3RR$ performance was performed in an H-type cell under ambient conditions in 0.5 M $Na_2SO_4$ (pH adjusted to 11.5) with 0.1 M $KNO_3$ as a nitrate source. In particular, it is believed that the pH adjustment of the $Na_2SO_4$ solution would be advantageous to the $eNO_3RR$ performance. On the one hand, the pH of the initial unbuffered electrolyte would change from neutral to about 11 owing to the gradually consumed $H^+$ along with $eNO_3RR$ and competitive HER. On the other hand, the alkaline media prevents the further reduction of SnS under negative potential according to equation (6), inhibiting the component variation. Therefore, adjusting the pH of the $Na_2SO_4$ solution would maintain the stability of both pH and catalyst composition.

Figure 38:
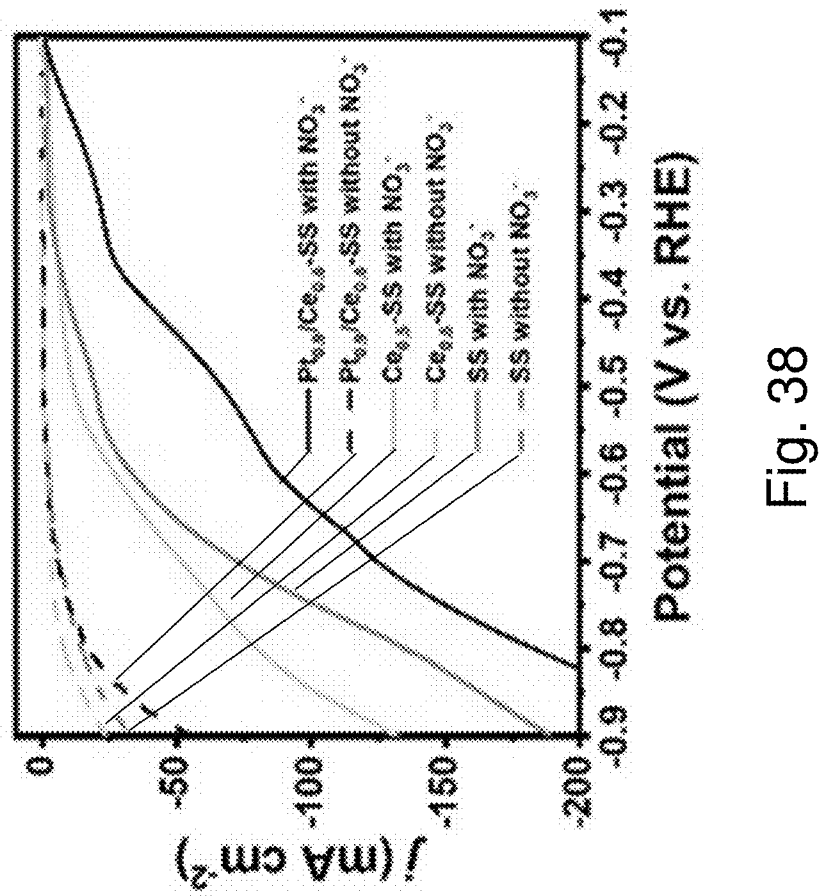
FIG. 38 shows the LSV curves of SS, $Ce_{0.5}$—SS, and $Pt_{0.9}/Ce_{0.5}$—SS at a scan rate of 5 mV $s^{-1}$ with and without $NO_3^-$ upon the electrocatalytic $NO_3^-$-to-$NH_3$ conversion.
Figure 39B:
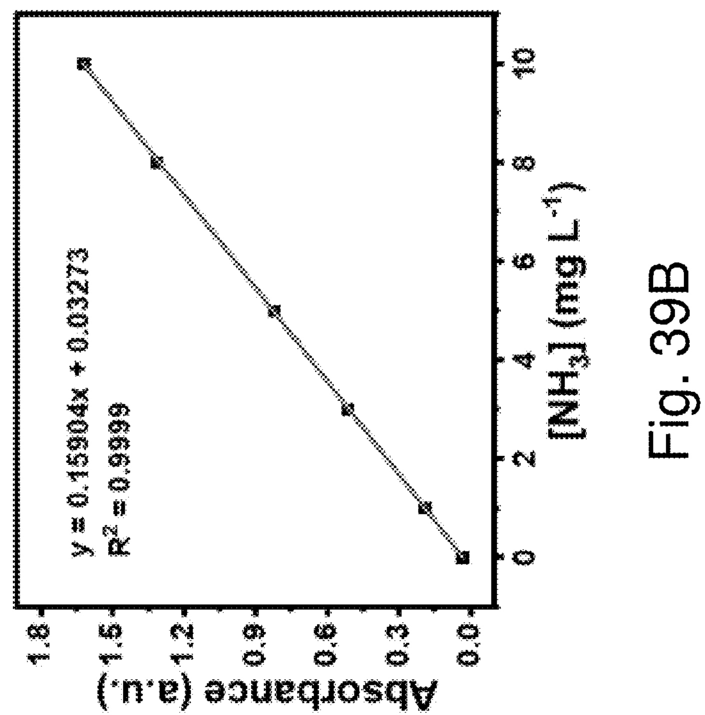
FIG. 39B shows the fitted absorbance-concentration curve corresponding to FIG. 39A. The absorbance values are determined at 655 nm.
Figure 39A:
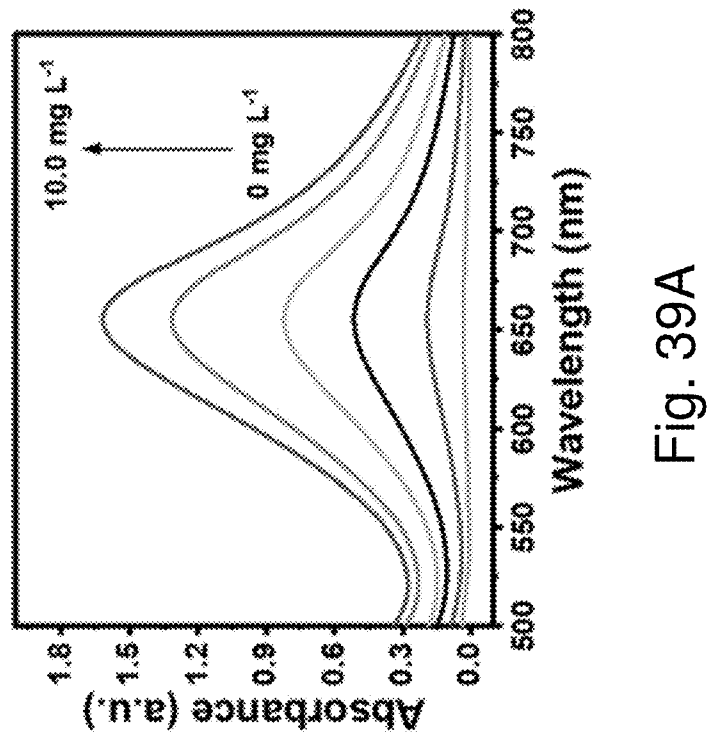
FIG. 39A shows the UV-vis absorbance of $(NH_4)_2SO_4$ solution with different concentrations upon $NH_3$ detection through the indophenol blue method.
Figure 40B:
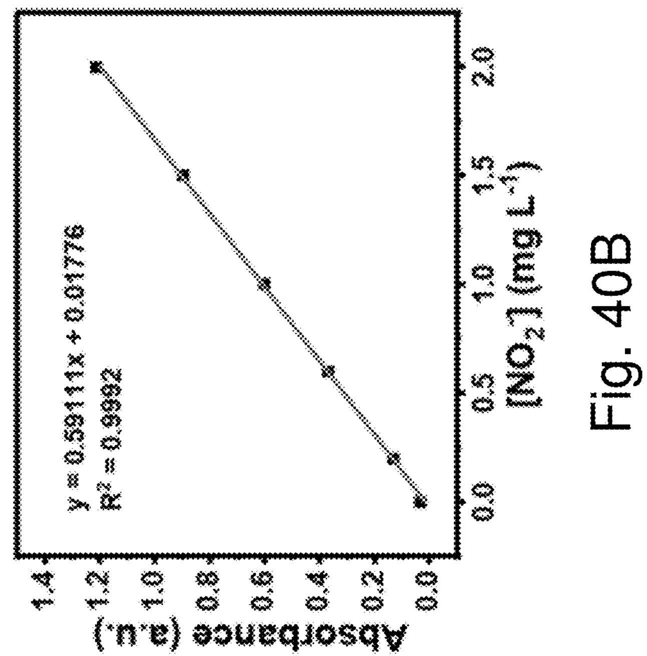
FIG. 40B shows the fitted absorbance-concentration curve corresponding to FIG. 40A. The absorbance values are determined at 540 nm.
Figure 40A:
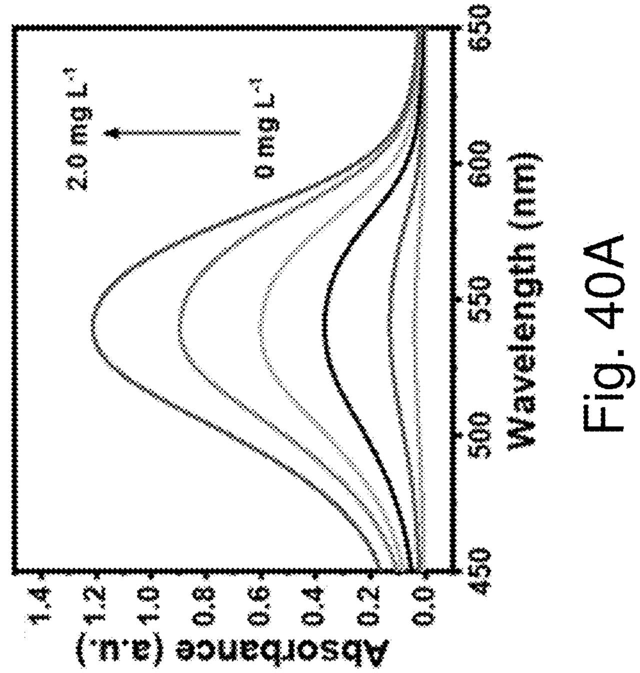
FIG. 40A shows the UV-vis absorbance of $KNO_2$ solution with different concentrations upon $NO_2^-$ detection through the Griess method.
Figure 41B:
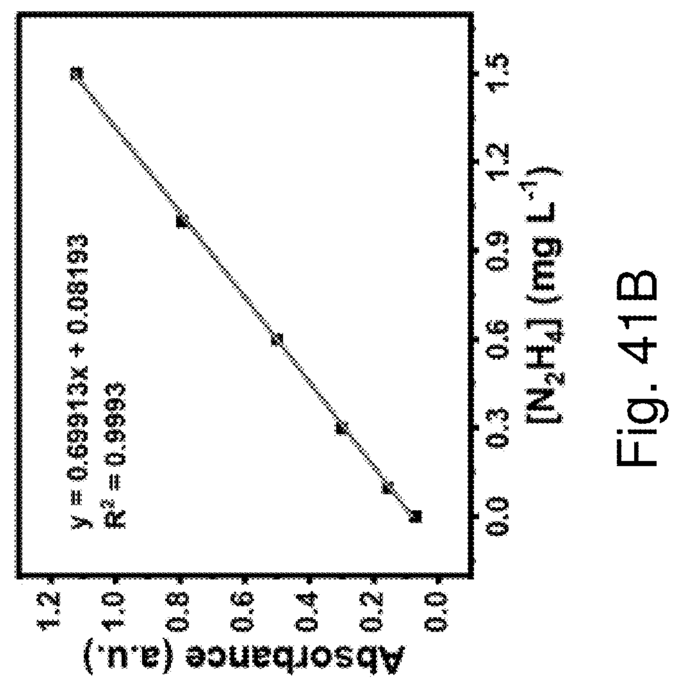
FIG. 41B shows the fitted absorbance-concentration curve corresponding to FIG. 41A. The absorbance values are determined at 460 nm.
Figure 41A:
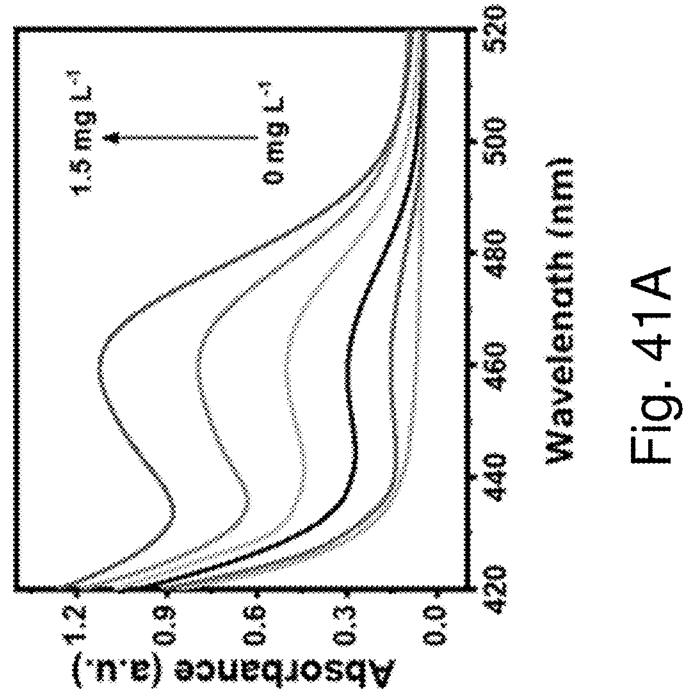
FIG. 41A shows the UV-vis absorbance of $N_2H_4$ solution with different concentrations upon $N_2H_4$ detection through the Watt and Chrisp method.

The current density of SS, $Ce_{0.5}$—SS, and $Pt_{0.9}/Ce_{0.5}$—SS with and without $NO_3^-$ is illustrated in the linear sweep voltammetry (LSV) curves of FIG. 38, in which the low current response of catalysts without the existence of $NO_3^-$ indicates the intrinsic poor hydrogen evolution, resulting from the limited surface electron accessibility of Sn. As shown, the current density of catalysts shows a negative correlation with the gap of interlayer spacings. $Pt_{0.9}/Ce_{0.5}$—SS with the smaller interlayer spacing have a higher current density over a wide range of negative potentials and more positive onset potential, indicating more readily the reduction of $NO_3^-$. Furthermore, there are apparent reduction peaks within the presence of $NO_3^-$. The drastic increase in the current density indicates the fast nitrate reduction rate. With the potential becoming more negative, competitive hydrogen evolution gradually occurs but is still weaker than $eNO_3RR$, which leads to a gentler increased rate and forms the plateaus and inflection points. Until HER dominates, the current densities rapidly rise again, especially when the potential is more than −0.7 V vs. RHE.

The possible products, including $NH_3$, $NO_2^-$, and $N_2H_4$, are determined using the colorimetric method (FIGS. 39A and 39B, 40A and 40B, 41A and 41B), which illustrates that $NH_3$ and $NO_2^-$ are the main products during $eNO_3RR$ in this system, and the yield of $N_2H_4$ is negligible.

Figure 42B:
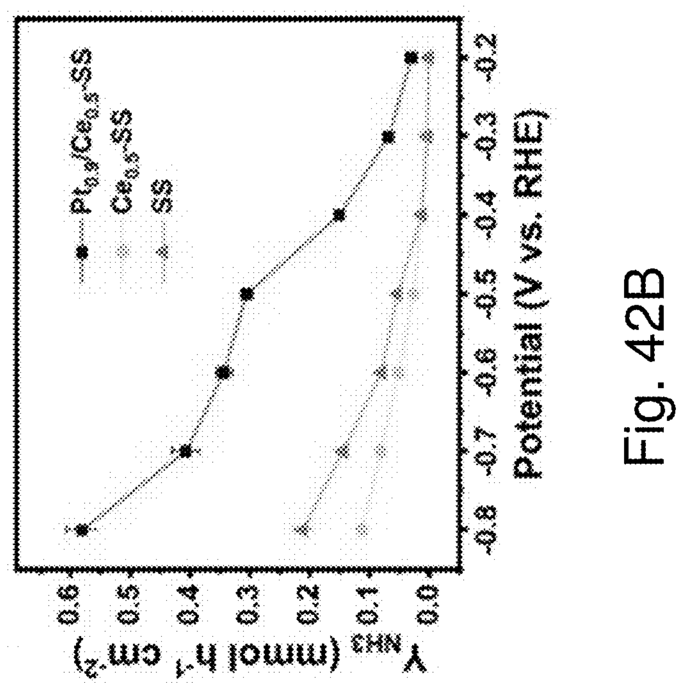
FIG. 42B shows the yield rate for $NH_3$ ($Y_{NH3}$) upon the electrocatalytic $NO_3^-$-to-$NH_3$ conversion.
Figure 42A:
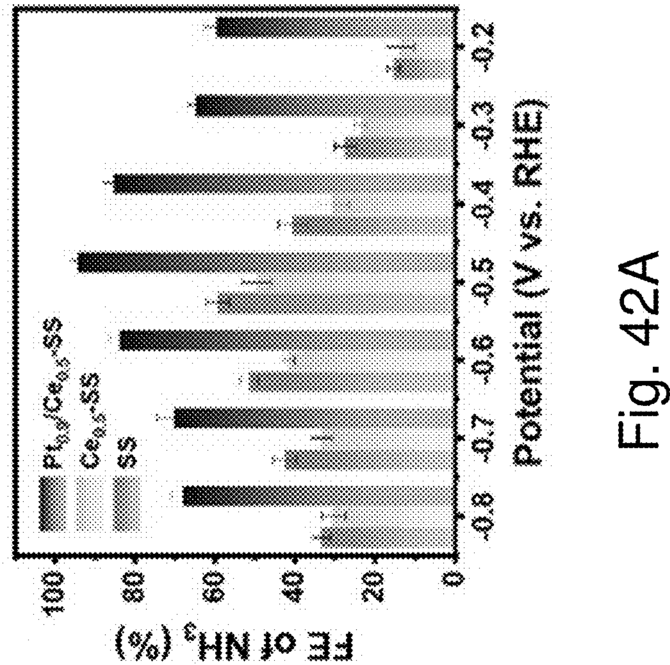
FIG. 42A shows Faradaic efficiencies (FE) for $NH_3$ upon the electrocatalytic $NO_3^-$-to-$NH_3$ conversion.
Figure 43:
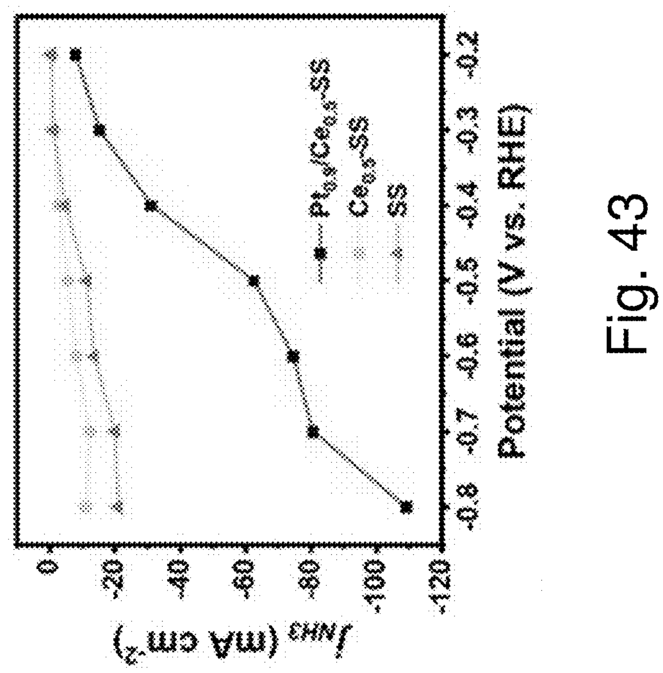
FIG. 43 shows the partial current densities of $NH_3$ ($j_{NH3}$) upon the electrocatalytic $NO_3^-$-to-$NH_3$ conversion.

As depicted in FIG. 42A, the steady increase of Faradaic efficiency (FE) of ammonia up to −0.5 V vs. RHE, and the deterioration at more negative potential may result from the enhanced competing HER. It can be seen that $Pt_{0.9}/Ce_{0.5}$—SS offer a FE of $NH_3$ of 94.12%, with a yield rate for $NH_3$ ($Y_{NH3}$) of 0.3056 mmol $cm^{-2}$ $h^{-1}$ at −0.5 V vs. RHE (FIGS. 42A and 42B), which is 1.89- and 1.58-fold of $Ce_{0.5}$—SS (49.67%) and SS (59.35%), respectively. In particular, such multiple of FE increment is more evident in the potential range of about-0.2 V to about-0.5 V, indicating the small energy consumption and the spontaneousness of $Pt_{0.9}/Ce_{0.5}$—SS for $NO_3^-$-to-$NH_3$ conversion, which is believed to be promising for industrial-scale applications. Furthermore, benefiting from the great FE of $NH_3$ of $Pt_{0.9}/Ce_{0.5}$—SS, it could reach a partial current density of $NH_3$ of 109 mA $cm^{-2}$ at −0.8 V vs. RHE, which is much higher than that of $Ce_{0.5}$—SS and SS NS (FIG. 43).

Figure 44B:
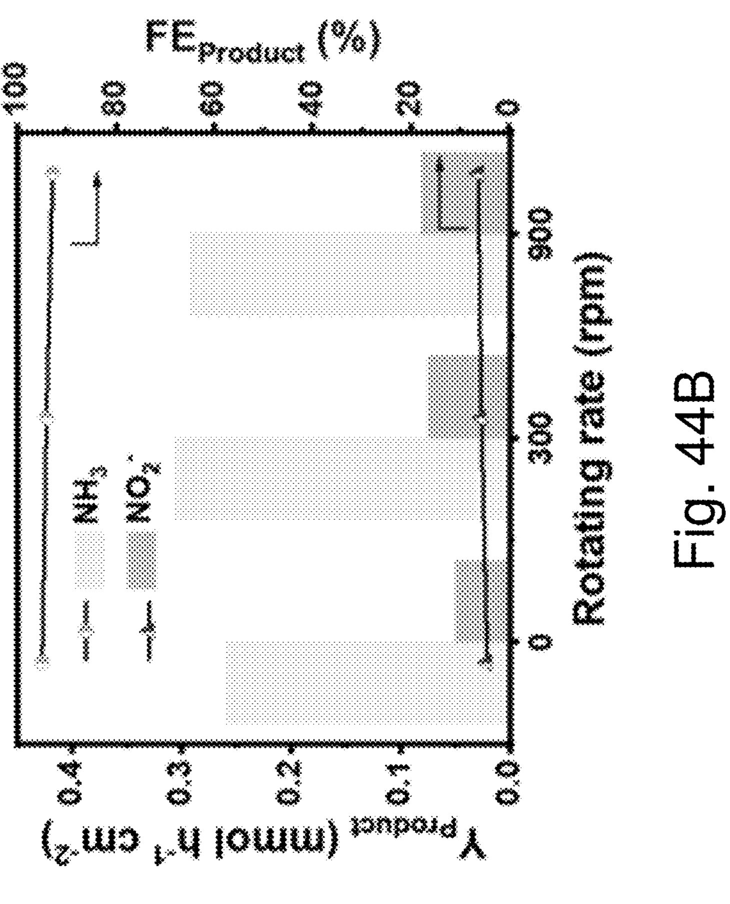
FIG. 44B shows the determined generation rates and Fes of $NH_3$ and $NO_2^-$ products at −0.5 V vs. RHE, showing the influence of mass transfer on catalytic activity.
Figure 44A:
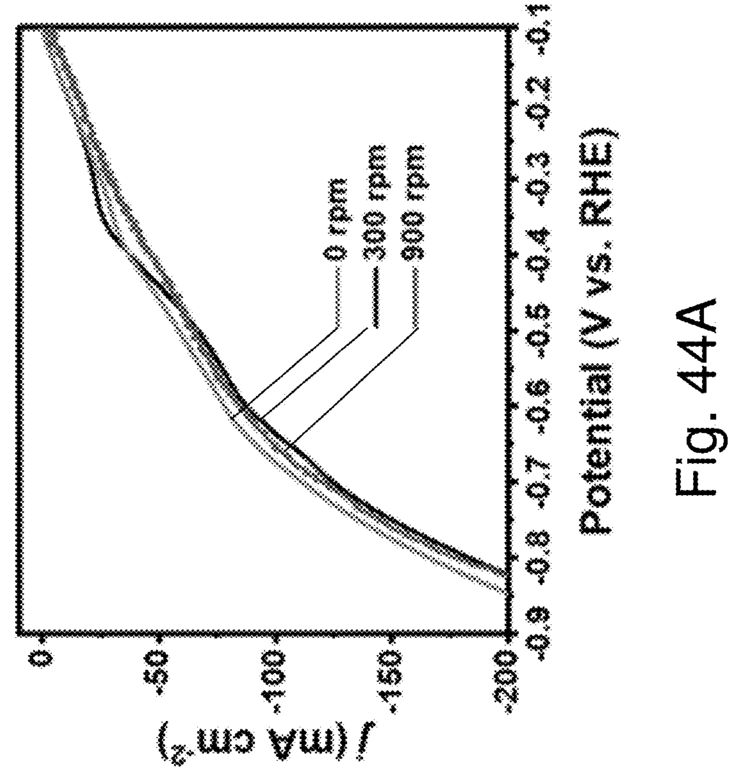
FIG. 44A shows LSV curves of $Pt_{0.9}/Ce_{0.5}$—SS under different stir rates, showing the influence of mass transfer on catalytic activity.
Figure 45B:
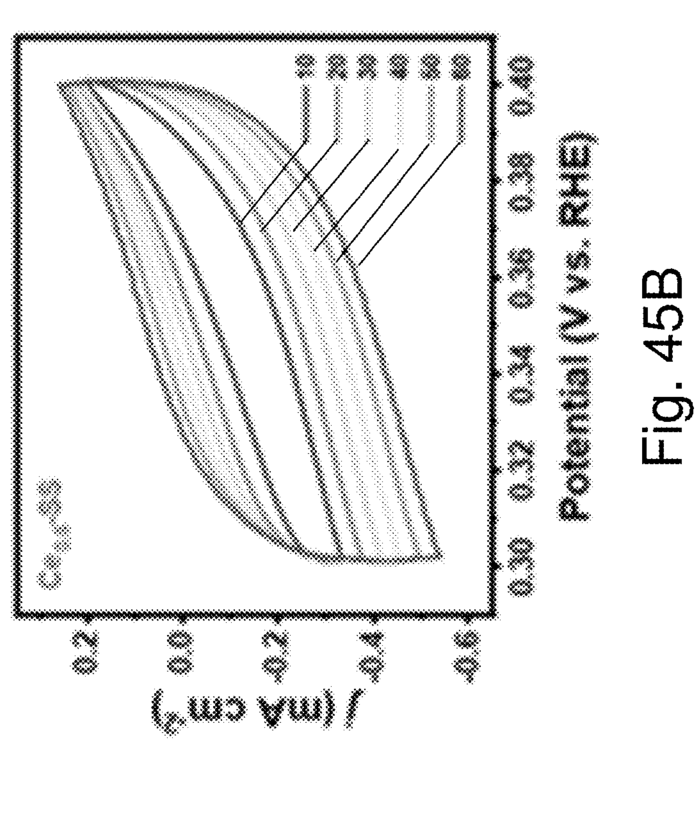
FIG. 45B shows the cyclic voltammetry (CV) cycles at different scan rates from 10 to 60 mV $s^{-1}$ of $Ce_{0.5}$—SS.
Figure 45A:
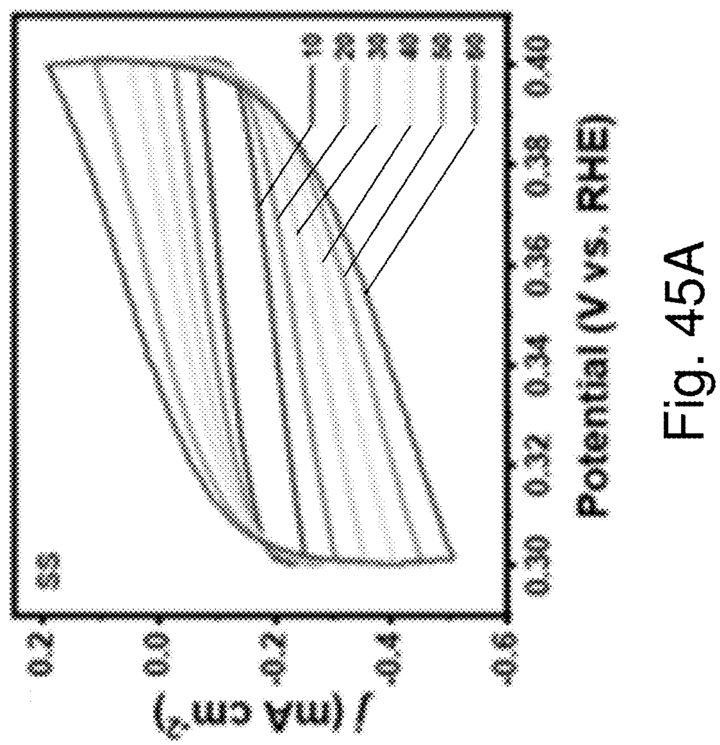
FIG. 45A shows the cyclic voltammetry (CV) cycles at different scan rates from 10 to 60 mV $s^{-1}$ of SS.
Figure 45C:
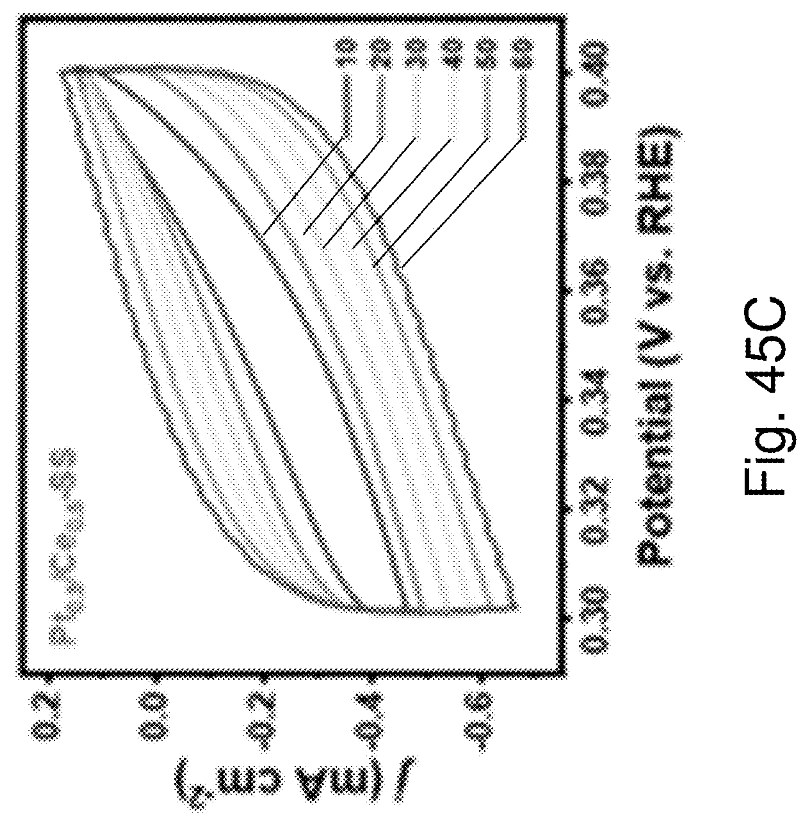
FIG. 45C shows the cyclic voltammetry (CV) cycles at different scan rates from 10 to 60 mV $s^{-1}$ of $Pt_{0.9}/Ce_{0.5}$—SS.
Figures 45D, 45E:
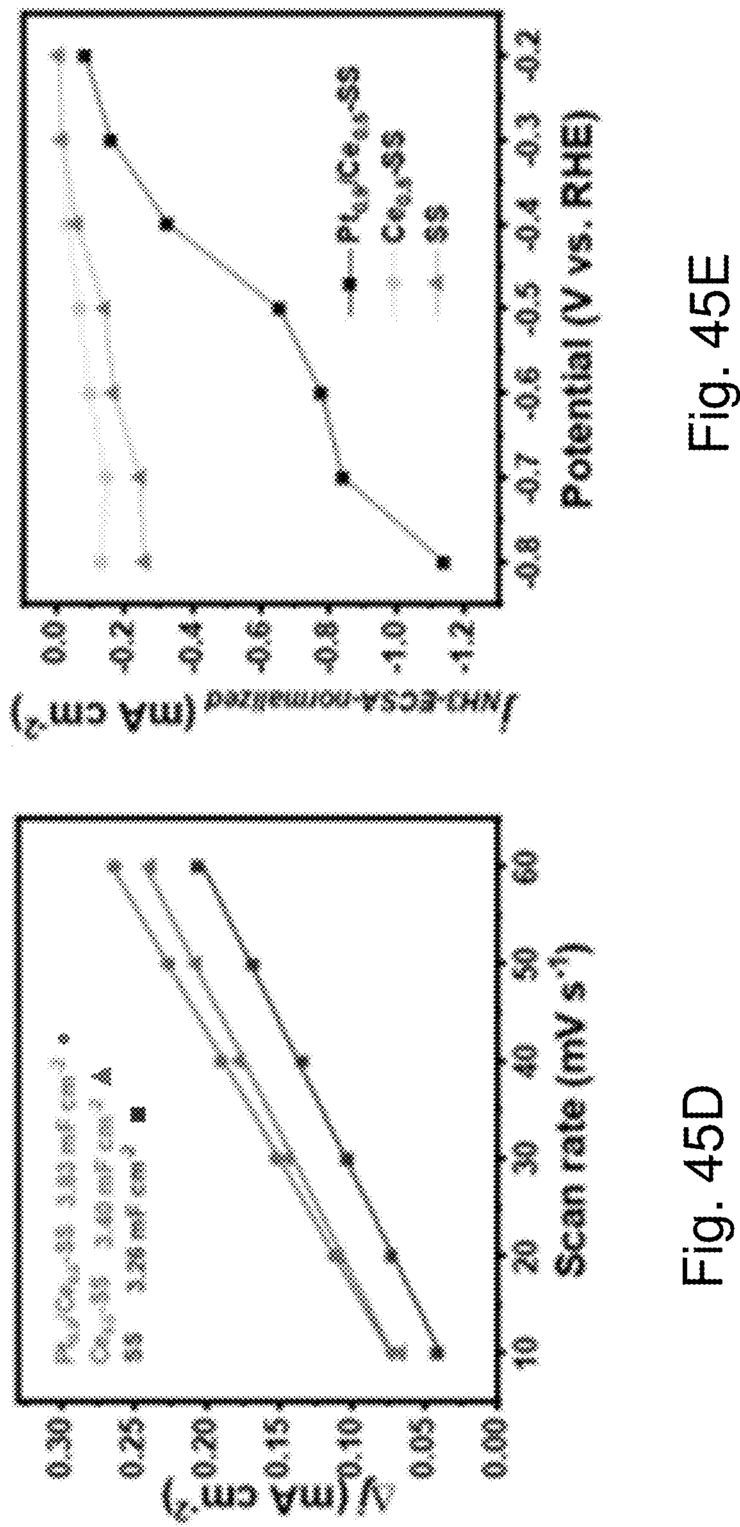
FIG. 45D shows the corresponding current density differences vs. scan rates of the samples in FIGS. 45A-45C to calculate electrochemical double-layer capacitance ($C_{dl}$). The $C_{dl}$ is proportional to electrochemical surface area (ECSA)
FIG. 45E shows the ECSA normalized partial current densities of $NH_3$ ($j_{NH3}$) of SS, $Ce_{0.5}$—SS and $Pt_{0.9}/Ce_{0.5}$—SS.

The above results suggest the critical role of interlayer spacing regulation in modulating the $eNO_3RR$ performance, of which the compression of interlayer spacing under the assistance of active diatomic Pt—Ce pairs drastically promotes the FE and generation rate of $NH_3$. Specifically, the improvement of $eNO_3RR$ performance is derived from the chemical reaction kinetic equilibrium rather than mass transfer, as evidenced by the substantially unchanged LSV curves and FE of $NH_3$ and $NO_2^-$ products under different stir rates (FIGS. 44A and 44B).

To derive the intrinsic activities of the catalysts, the performance is normalized by the electrochemical active surface area (ECSA) (correlated with the double-layer capacity ($C_{dl}$), assuming 40 μF $cm^{-2}$ as a moderate value for specific capacitance of a flat surface) as shown in FIGS. 45A-45E. The normalized partial current density of $NH_3$ suggest the high intrinsic $eNO_3RR$ performance of $Pt_{0.9}$/$Ce_{0.5}$—SS. Furthermore, the Zeta potential of SS, $Ce_{0.5}$—SS, and $Pt_{0.9}$/$Ce_{0.5}$—SS at pH=10 is measured to detect the surface electronic state. It exhibits an average Zeta potential of −45.78 mV of $Pt_{0.9}$/$Ce_{0.5}$—SS, −55.26 mV of SS and −60.60 mV of $Ce_{0.5}$—SS. Although the samples all show the negative surface charge in an aqueous KCl solution (pH=10), the $Pt_{0.9}$/$Ce_{0.5}$—SS provides a much more favorable surface environment for nitrate adsorption.

Figure 46:
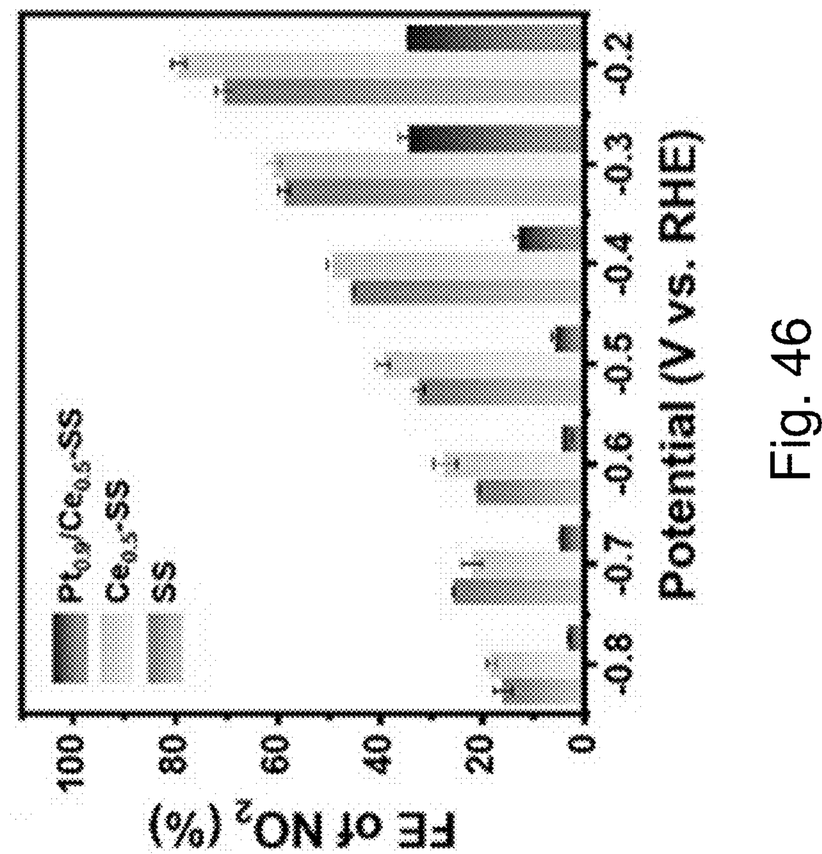
FIG. 46 shows the FE for $NO_2^-$ upon electrolytic $NO_3^-$-to-$NH_3$ conversion.
Figure 47:
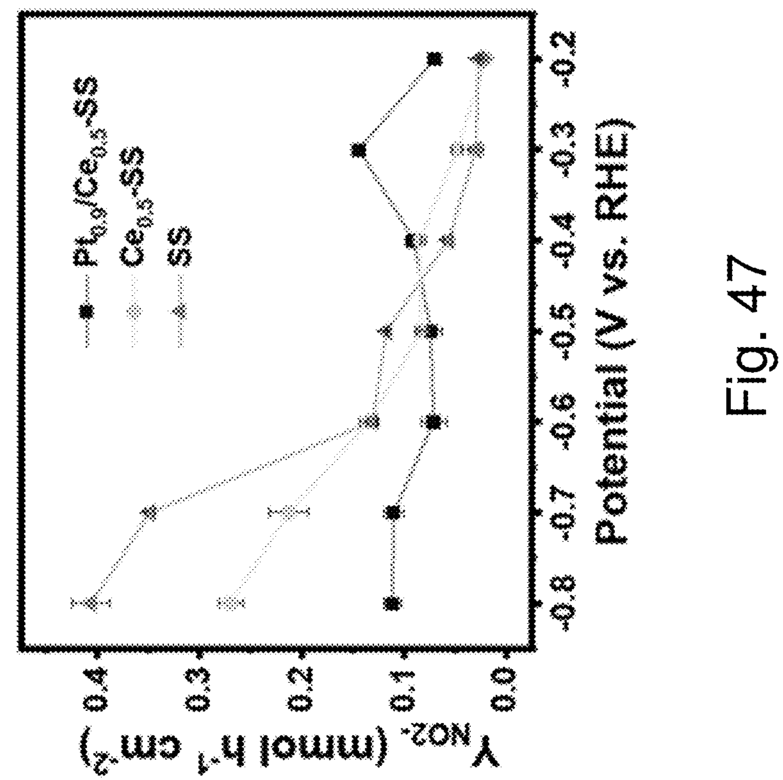
FIG. 47 shows the yield rate for $NO_2^-$ ($Y_{NO2-}$) of SS, $Ce_{0.5}$—SS, and $Pt_{0.9}/Ce_{0.5}$—SS.

Electrocatalytic $NO_3RR$ follows a consecutive eight-electron pathway, where $NO_2^-$ is an important by-product after a two-electron transfer process ($NO_3^-+2e^-+H_2O \rightarrow NO_2^-+2OH^-$). As such, the rapid successive conversion rates for $NO_3^-$-to-$NO_2^-$ and $NO_2^-$-to-$NH_3$ are critical for the efficiency of $eNO_3RR$. Accordingly, the production rate of $NO_2^-$ during $eNO_3RR$ is evaluated, of which the FE of $NO_2^-$ displays the opposite situation as $NH_3$ (FIGS. 42A, 46, and 47). $Ce_{0.5}$—SS with a bigger interlayer spacing show a higher FE of $NO_2^-$, while $Pt_{0.9}$/$Ce_{0.5}$—SS with compressed interlayer spacing exhibit unfavorable $NO_2^-$ generation. Also, the further increase of cathodic potential leads to a generally continuous decline of the nitrite FE but the increase of ammonia FE of $Pt_{0.9}$/$Ce_{0.5}$—SS especially when the potential is smaller than-0.5 V vs. RHE, indicating the possible fast reaction of $NO_2^-$-to-$NH_3$ conversion.

To validate it, LSV of $Ce_{0.5}$—SS and $Pt_{0.9}$/$Ce_{0.5}$—SS in the electrolyte with 0.1 M $NO_2^-$ and with 0.1 M $NO_3^-$, respectively are performed, and the FE of $NH_3$ during $NO_2^-$-reduction reaction ($NO_2RR$) and $NO_3RR$ are compared (FIGS. 48A-48D). The rapid increase of current density in $NO_2RR$ of both $Ce_{0.5}$—SS and $Pt_{0.9}$/$Ce_{0.5}$—SS indicates the fast electrocatalytic reduction of $NO_2^-$. The $Y_{NH3}$ value can reach 1.37 mmol $cm^{-2}$ $h^{-1}$ for $Pt_{0.9}$/$Ce_{0.5}$—SS and 0.57 mmol $cm^{-2}$ $h^{-1}$ for $Ce_{0.5}$—SS at −0.8 V vs. RHE. However, the difference between FE $NO_3RR$ and $NO_2RR$ in $Ce_{0.5}$—SS is huge, especially at the smaller potential. For $Pt_{0.9}$/$Ce_{0.5}$—SS, the FEs keep a much smaller difference (FIGS. 48C and 48D), which confirms the fast $NO_3^-$-to-$NO_2^-$ reduction but subsequent desorption of $NO_2^-$ to the electrolyte for $Ce_{0.5}$—SS, leading to the observed higher generation of $NO_2^-$ in FIG. 46. Furthermore, the high $NH_3$-to-$NO_2^-$ product ratio variation in FIG. 49A verifies the stronger desorption of $NO_2^-$ intermediates in $Ce_{0.5}$—SS and SS NS compared to $Pt_{0.9}$/$Ce_{0.5}$—SS. This finding reveals that the interlayer spacing regulation plays a vital role in chemical affinity towards $NO_2^-$ that affects the reduction from $NO_2^-$ to $NH_3$ and the entire activity and selectivity of $eNO_3RR$.

Figures 49A, 49B:
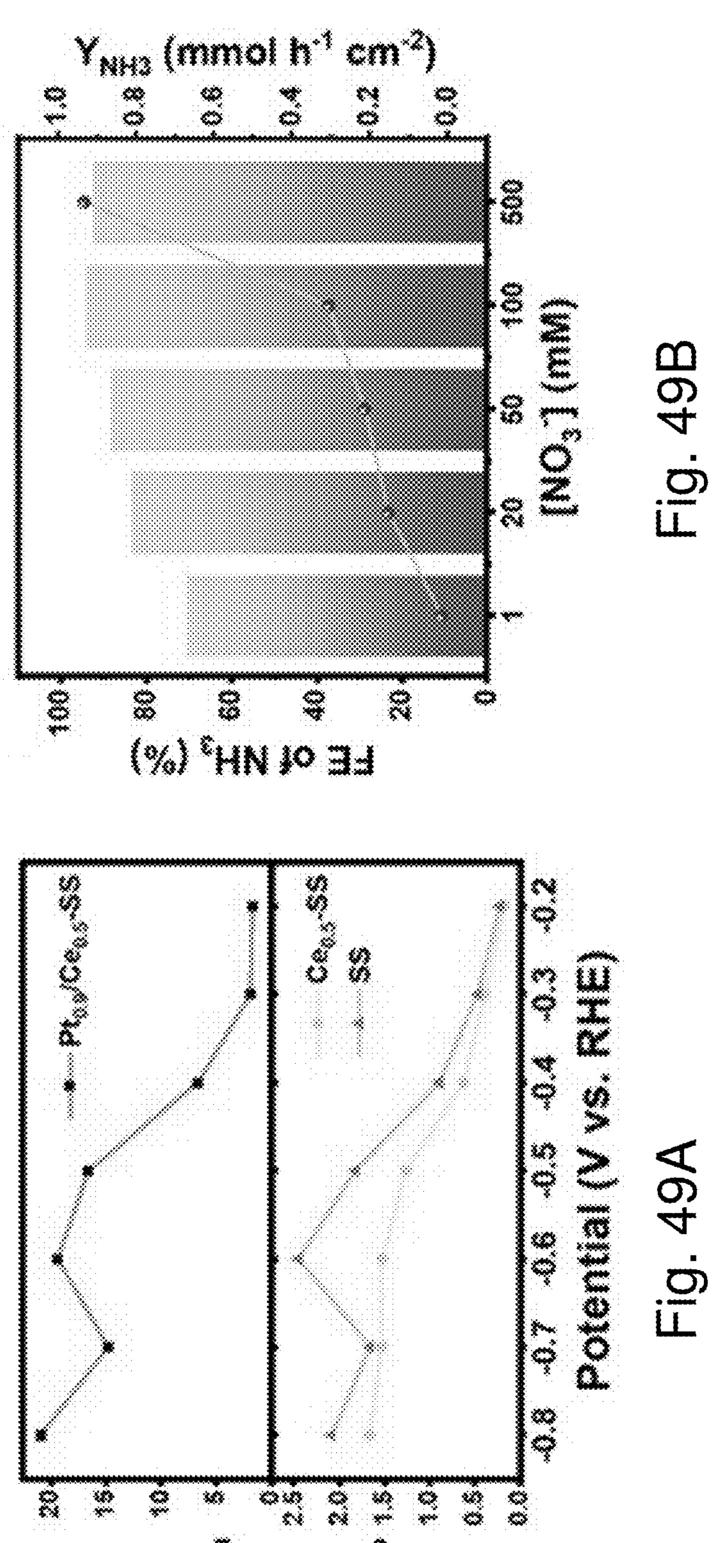
FIG. 49A shows the $NH_3$-to-$NO_2^-$ product ratios variation of SS, $Ce_{0.5}$—SS, and $Pt_{0.9}/Ce_{0.5}$—SS upon the electrocatalytic $NO_3^-$-to-$NH_3$ conversion.
FIG. 49B shows the FE and yield rate of $NH_3$ for $Pt_{0.9}/Ce_{0.5}$—SS in the electrolyte with different concentrations of $NO_3^-$ ($[NO_3^-]$) at −0.5 V vs. RHE upon the electrocatalytic $NO_3^-$-to-$NH_3$ conversion.
Figure 50B:
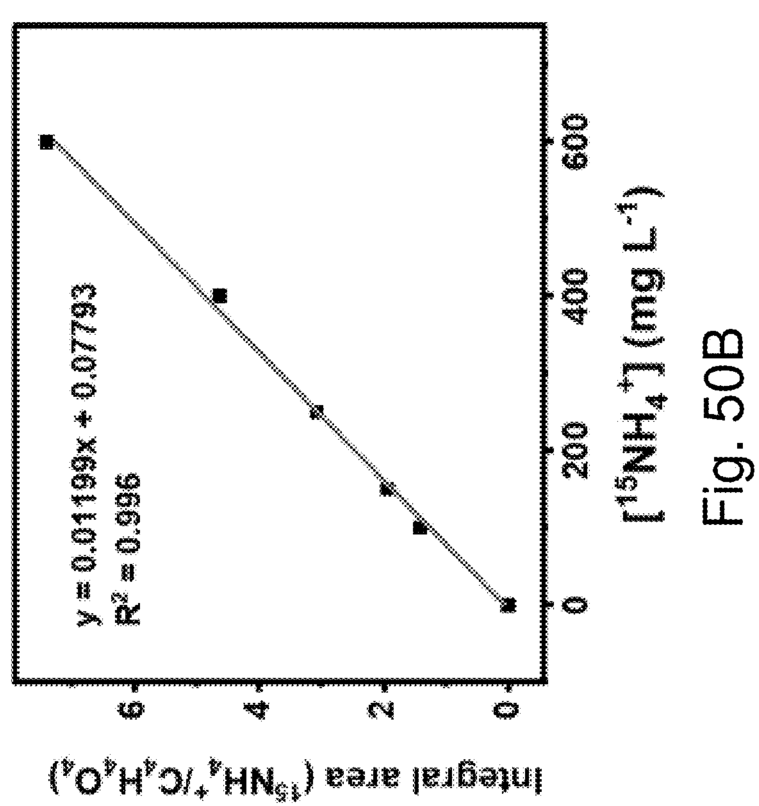
FIG. 50B shows the calibration curve of integral area $(^{15}NH_4)_2SO_4/C_4H_4O_4)$ against $(^{15}NH_4)_2SO_4$ concentration.
Figure 50A:
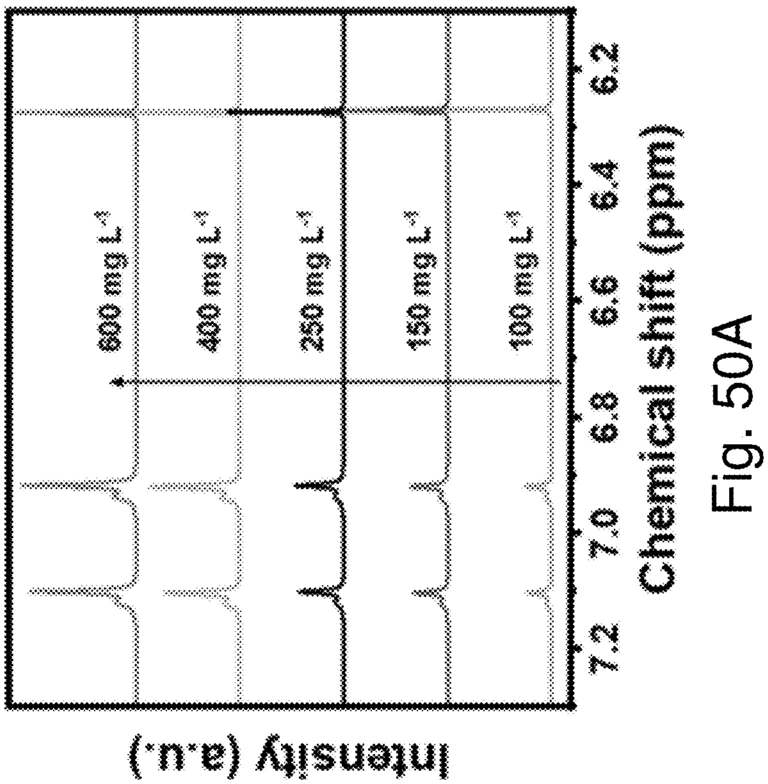
FIG. 50A shows the $^1H$ NMR spectra (400 MHZ) of $^{15}NH_4^+$ with different known $^{15}(NH_4)_2SO_4$ concentrations using $C_4H_4O_4$ as standards.

To further evaluate the $eNO_3RR$ performance of the catalysts, the influence of nitrate concentration ($[NO_3^-]$) on $Pt_{0.9}$/$Ce_{0.5}$—SS is studied, in which the ammonia FE maintains a high value of more than 70% from 1 mM to 500 mM and reaches to the peak at 100 mM (FIG. 49B). It is believed that the competing HER may be suppressed by increasing $[NO_3^-]$ and/or the pH value of electrolytes. Notably, the $Pt_{0.9}$/$Ce_{0.5}$—SS show a decreased ammonia FE along with a reduced $[NO_3^-]$, indicating that the $eNO_3RR$ on $Pt_{0.9}$/$Ce_{0.5}$—SS is challenged by the enhanced hydrogen evolution. Meanwhile, it is noted that there is a minor decline in ammonia FE when $[NO_3^-]>100$ mM. One explanation might be that a too high $[NO_3^-]$ is favorable for the desorption of $NO_2^-$ from active sites, resulting in the increased generation of $NO_2^-$. The other reason might be the deactivation of active sites due to the slow mass transfer of a large amount of produced ammonia.

Figures 51A, 51B:
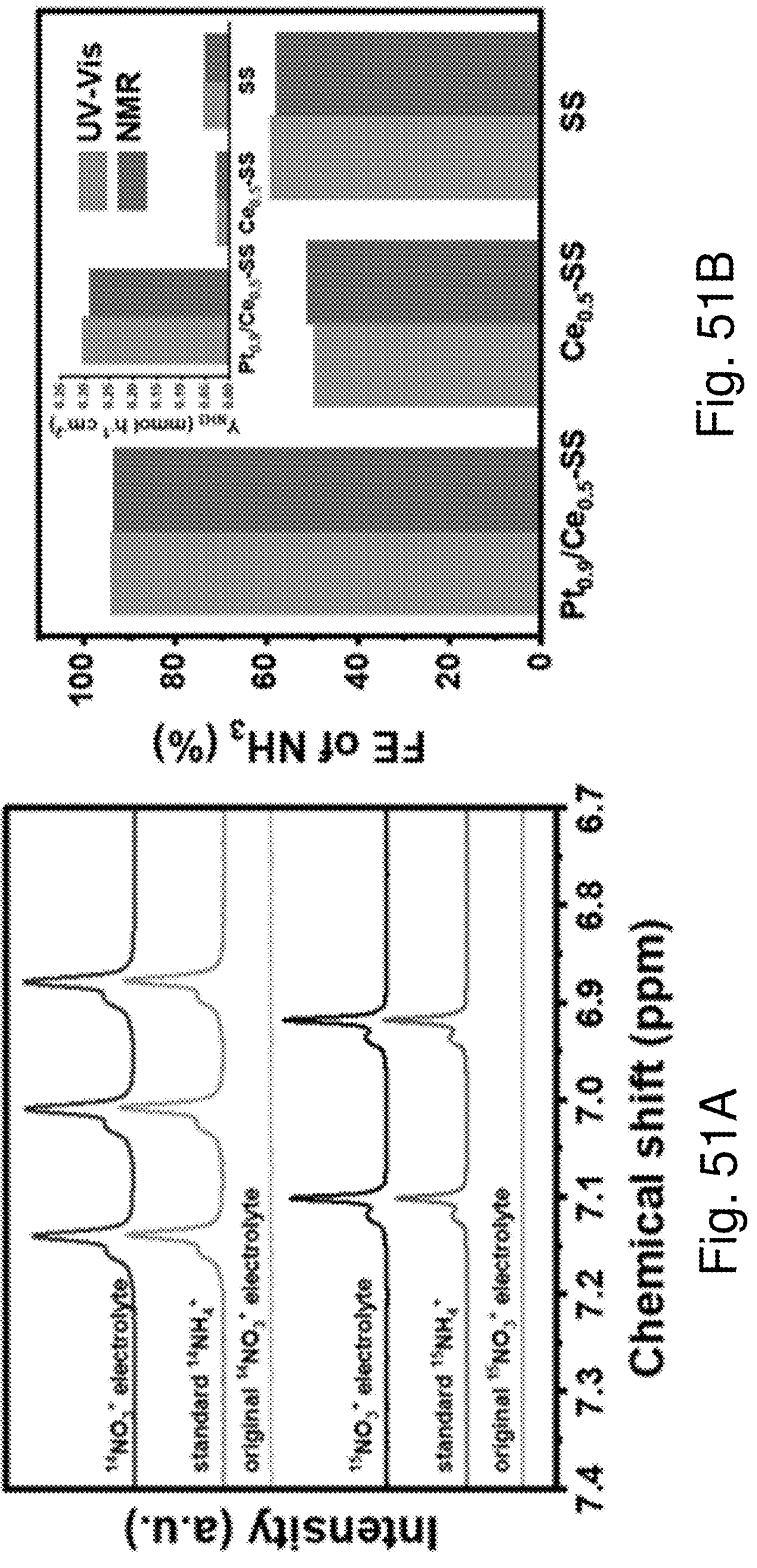
FIG. 51A shows the $^1H$ NMR spectra of the electrolyte after $NO_3RR$ electrolysis at −0.5 V vs. RHE using $^{14}NH_4^+$ and $^{15}NH_4^+$ as N sources, respectively, and $^1H$ NMR spectra of standard $(^{14}NH_4)_2SO_4$, $(^{15}NH_4)_2SO_4$ solution and original $^{14}NO_3^-$, $^{15}NO_3^-$ solution.
FIG. 51B shows the quantitative comparison of yield rate for $NH_3$ ($Y_{NH3}$) and FE of SS, $Ce_{0.5}$—SS and $Pt_{0.9}/Ce_{0.5}$—SS based on the $^1H$ NMR and UV-Vis methods.

To confirm the origin of the detected $NH_3$, isotope labeling experiments were conducted in the presence of $^{14}NO_3^-$ or $^{15}NO_3^-$ followed by product identification and quantification via $^1H$ NMR (FIGS. 50A and 50B, 51A and 51B). The standard $^{14}NH_4^+$ solution is split into three characteristic peaks, while that for $^{15}NH_4^+$ shows two peaks. That said, there is no signal of the original $^{14}NO_3^-$ or $^{15}NO_3^-$ electrolyte until they experience electrocatalytic nitrate reduction, and the signal peaks are basically the same as the standard $^{14}NH_4^+$ and $^{15}NH_4^+$. In addition, the FE of ammonia and $Y_{NH3}$ are quantitated by NMR using $^{15}N$ isotope labeled nitrate as the reactant. By comparing with the calibration curve, the results are very close to those determined by the UV-Vis method, as shown in FIG. 51B, thus excluding the possibility of environmental contaminants influencing the detection results.

Figures 52A, 52B, 52C:
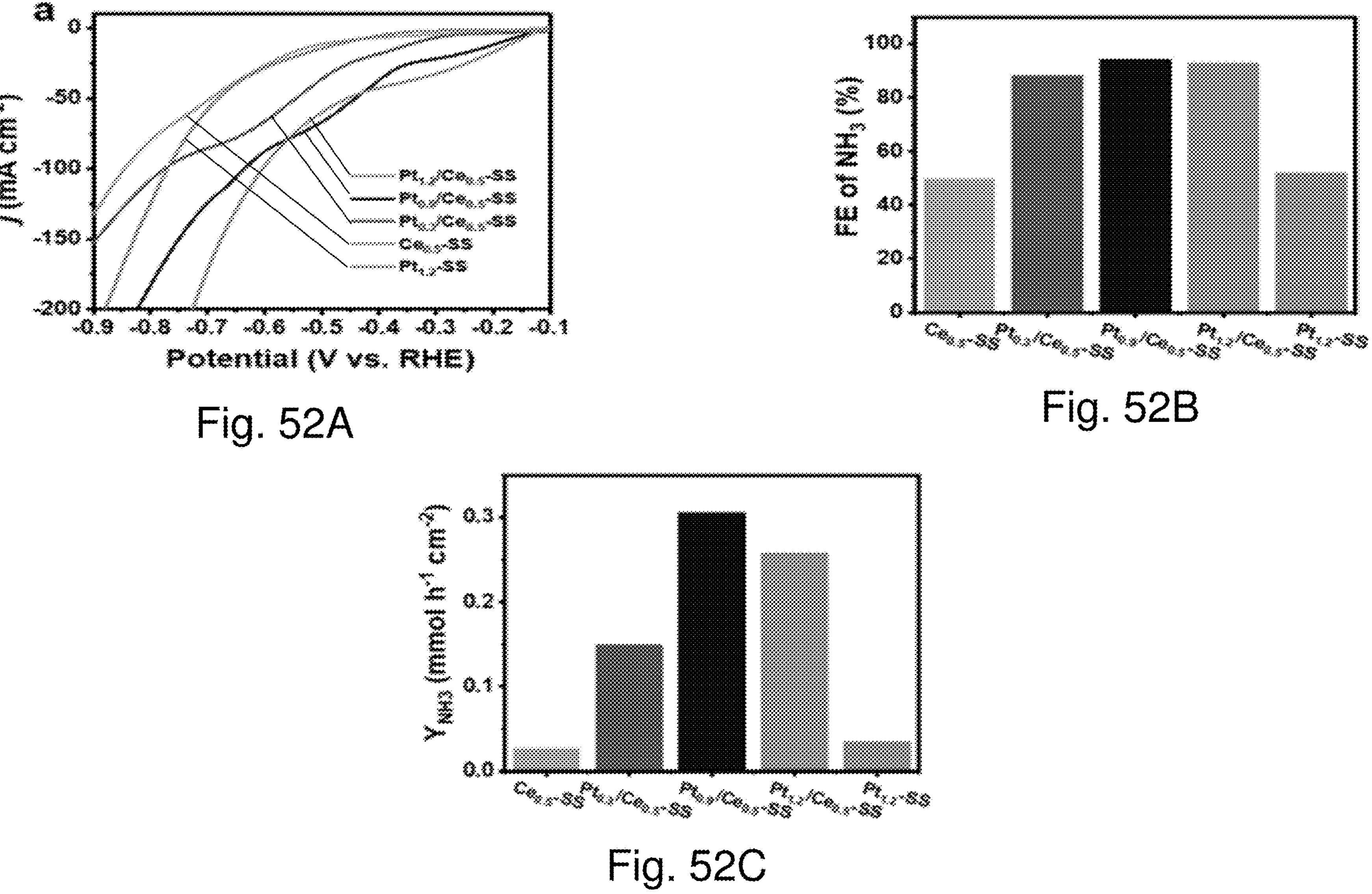
FIG. 52A shows the LSV curves of $Ce_{0.5}$—SS, $Pt_{0.3}/Ce_{0.5}$—SS, $Pt_{0.9}/Ce_{0.5}$—SS, $Pt_{1.2}/Ce_{0.5}$—SS, and $Pt_{1.2}$—SS.
FIG. 52B shows the FE of $NH_3$ of $Ce_{0.5}$—SS, $Pt_{0.3}/Ce_{0.5}$—SS, $Pt_{0.9}/Ce_{0.5}$—SS, $Pt_{1.2}/Ce_{0.5}$—SS, and $Pt_{1.2}$—SS.
FIG. 52C shows the $Y_{NH3}$ of $Ce_{0.5}$—SS, $Pt_{0.3}/Ce_{0.5}$—SS, $Pt_{0.9}/Ce_{0.5}$—SS, $Pt_{1.2}/Ce_{0.5}$—SS, and $Pt_{1.2}$—SS.
Figure 53A:
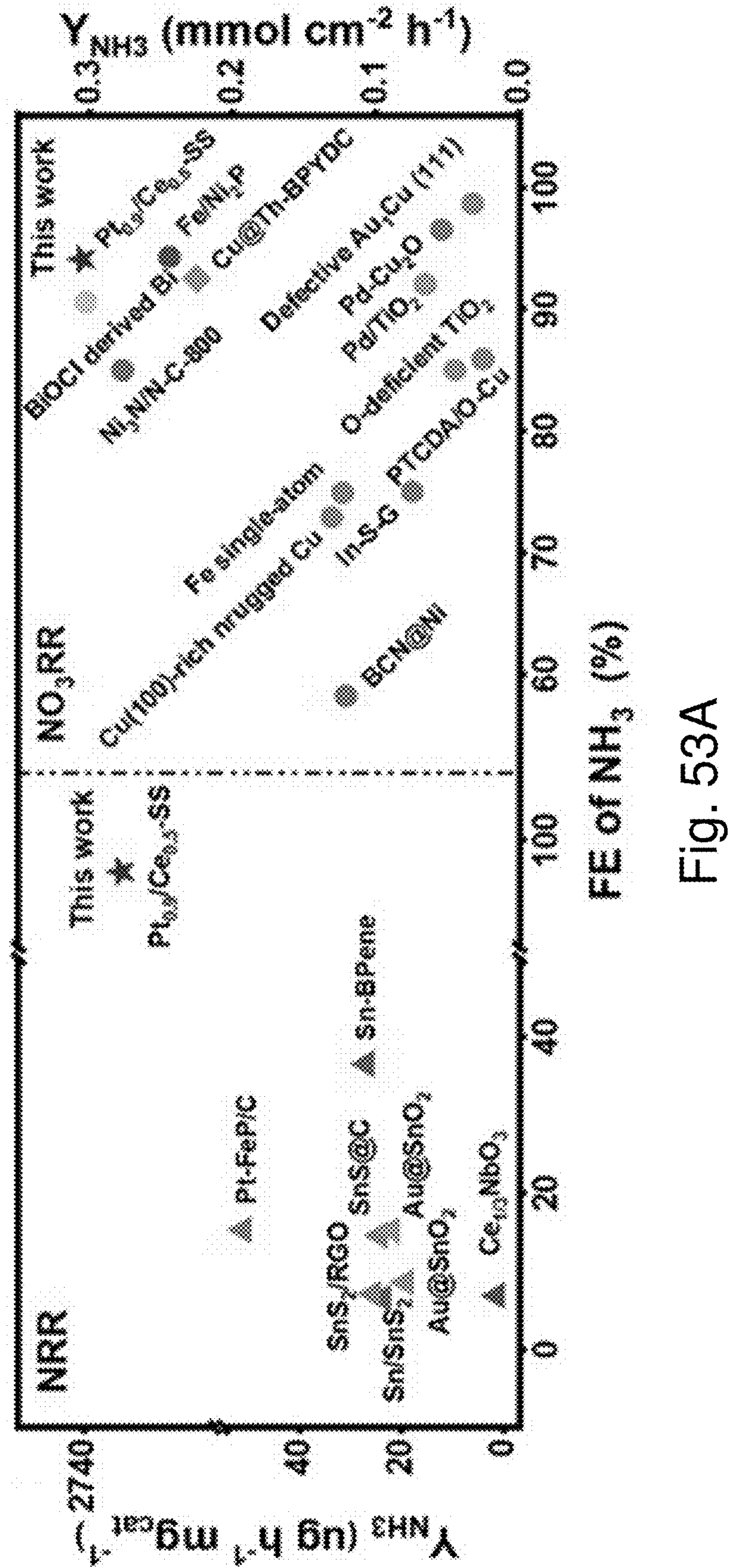
FIG. 53A shows the comparison of $Y_{NH3}$ and FE of $Pt_{0.9}/Ce_{0.5}$—SS with the reported representatives $eNO_3RR$ and eNRR electrocatalysts.

The gradually enhanced $eNO_3RR$ performance and the compressed interlayer spacing from $Ce_{0.5}$—SS to $Pt_{0.3}$/$Ce_{0.5}$—SS, and to $Pt_{0.9}$/$Ce_{0.5}$—SS directly suggest the catalytic role of interlayer spacing regulation toward nitrate reduction (FIGS. 52A-52C). However, the higher concentration of Pt may promote the competing HER activity that inhibits the ammonia selectivity, as it is believed that Pt may be an excellent active site for HER. Thereby, $Pt_{1.2}$/$Ce_{0.5}$—SS and $Pt_{1.2}$—SS exhibit decreased performance in $eNO_3RR$, even if the interlayer spacing of Pt 1.2/$Ce_{0.5}$—SS is very small. These results endow the proposed interlayer spacing engineering on 2D SnS nanosheets through adopting active diatomic Pt—Ce pairs, showing superior FE and yield rate of $NH_3$, and ranking among the most $NH_3$ synthesizing electrocatalysts (FIGS. 53A-53C). The several orders of magnitude higher in $NH_3$ production also confirm the practical potential of $NO_3^-$ reduction compared to $N_2$ reduction.

Example 7

Origin of the Enhanced $eNO_3RR$ Performance on $Pt_y$/$Ce_x$—SS NS

Figures 54A, 54B, 54C:
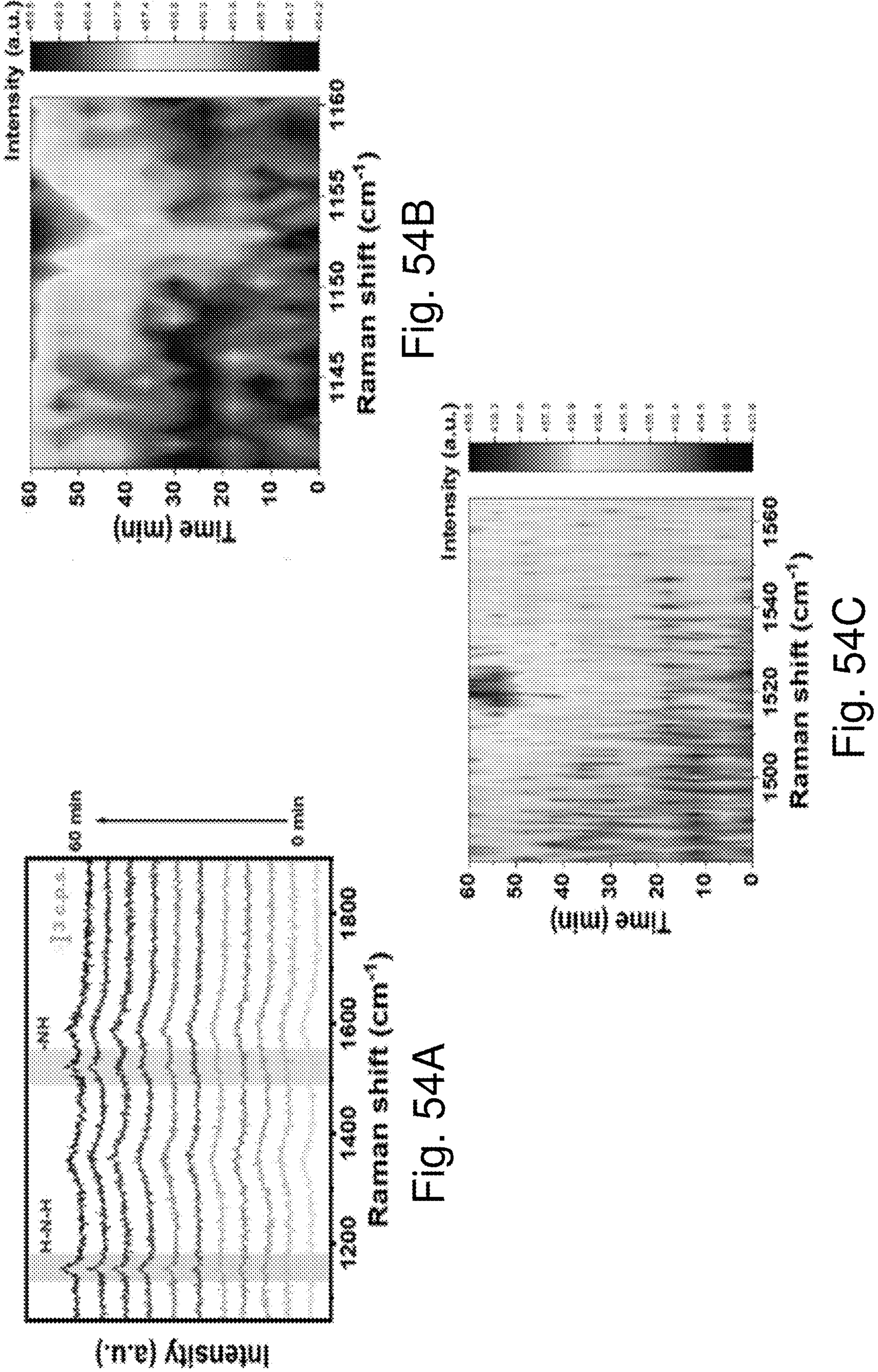
FIG. 54A shows the in situ Raman spectra of $Pt_{0.9}/Ce_{0.5}$—SS collected at −0.5 V vs. RHE in $NO_3^-$-contained solution.
FIG. 54B shows the corresponding contour plot of the shaded background area (H—N—H) in FIG. 54A.
FIG. 54C shows the corresponding contour plot of the shaded background area (—NH) in FIG. 54A.

The origin of the remarkable performance of $Pt_{0.9}$/$Ce_{0.5}$—SS for $eNO_3RR$ is investigated. Firstly, in-situ Raman spectroscopy was applied to monitor the possible reaction intermediates or products under potentiostatic operation for 1 h at −0.5 V vs. RHE (FIG. 54A). Except for the two peaks at about 1352.0 and 1590.5 $cm^{-1}$ assigned to the D-peak and G-peak of carbon cloth, the peaks at 1152.5 and 1521.4 $cm^{-1}$ that gradually appeared on $Pt_{0.9}$/$Ce_{0.5}$—SS as the reaction progressed may be attributed to the stretching of H—N—H and N—H bond, respectively. This indicates the efficient nitrate reduction to ammonia on the $Pt_{0.9}$/$Ce_{0.5}$—SS electrode. More directly, the gradually enhanced peak intensity of H—N—H and N—H peaks in contour plots (FIGS. 54B and 54C) provides strong evidence of increased intermediates.

Figure 55:
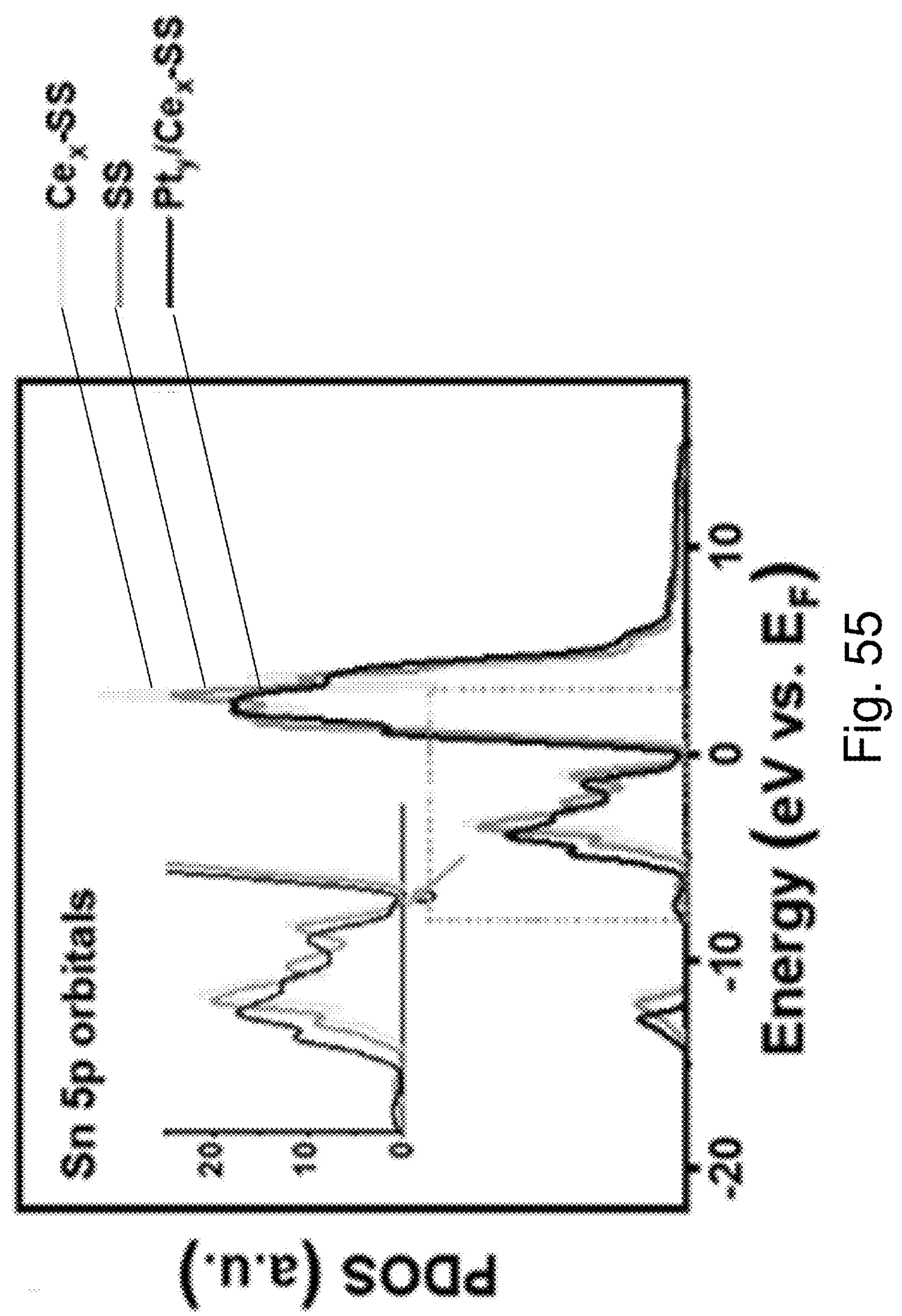
FIG. 55 shows the computed PDOS diagrams of Sn 5p orbitals in the SS, $Ce_x$—SS, and $Pt_y/Ce_x$—SS models.

It is believed that although main-group metals, such as Sn and Bi, do not show diversity in d-orbital as if transition metals, the main-group metals may have various localized p-orbital electron states that may have influence on the catalytic performance. In order to study the influence of electronic structures of the catalysts on their catalytic performance, the electronic structures of SS, $Ce_x$—SS, and $Pt_y$/$Ce_x$—SS models are computed by DFT calculation. As show in in FIG. 55, the computed PDOS diagrams of Sn 5p orbitals show an evident delocalization effect, especially for $Pt_y/Ce_x$—SS. Since $Ce_x$—SS, SS, and $Pt_y/Ce_x$—SS have an ordinal decreasing interlayer spacing after geometric optimization (FIG. 11), the degree of p-orbital electron delocalization is negatively correlated with the value of interlayer spacing.

Figure 56:
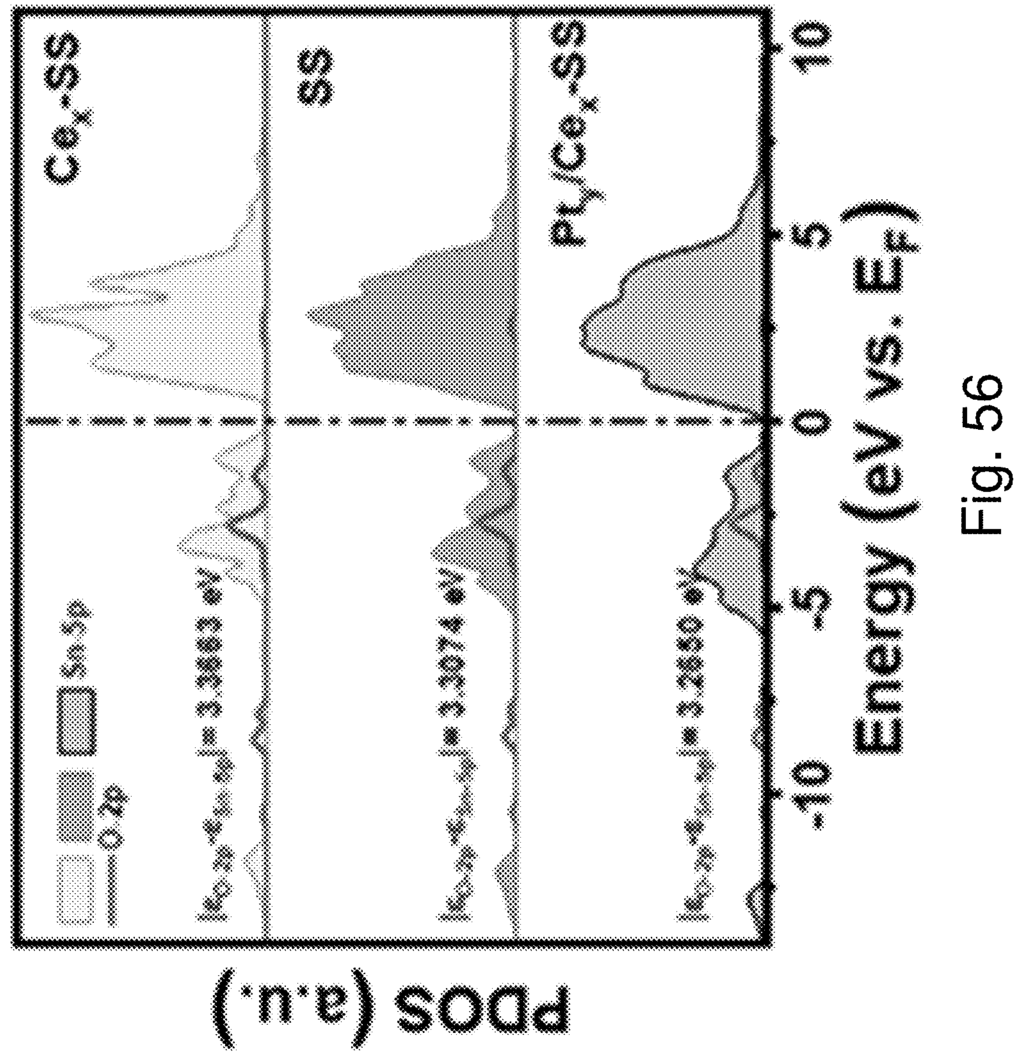
FIG. 56 shows the computed PDOS diagrams of Sn-5p and O-2p orbital for $NO_3^-$-adsorbed on SS, $Ce_x$—SS, and $Pt_y/Ce_x$—SS models.

Specifically, $Pt_y/Ce_x$—SS with compressed interlayer spacing may lead to an enhanced coupling of electrons in real space, which is responsible for delocalizing electrons across Sn-p orbitals. As a result, such electron delocalization may play a significant role in altering the electronic interaction of adsorbates. To have a further understanding on this, model of $NO_3^-$ that adsorbed on previous SS, $Ce_x$—SS, and $Pt_y/Ce_x$—SS models is built and the PDOS of Sn-5p and O-2p orbitals are computed (FIG. 56). Evidently, a greater orbital hybridization around the Fermi level (EF) is recognizable between the Sn atom and adsorbed $NO_3^-$, indicating enhanced chemical interaction. Subsequently, the difference between the band center (ε) of Sn-5p and O-2p orbitals exhibits a linear relationship with the interlayer spacing, of which $Pt_y/Ce_x$—SS have the smallest value of 3.2650 eV, lower than those of SS (3.3074 eV), and $Ce_x$—SS (3.3663 eV). Hence, the narrower band center difference demonstrates the crucial function of interlayer spacing regulation in weakening and activating the N═O bonds of $NO_3^-$.

Figure 57:
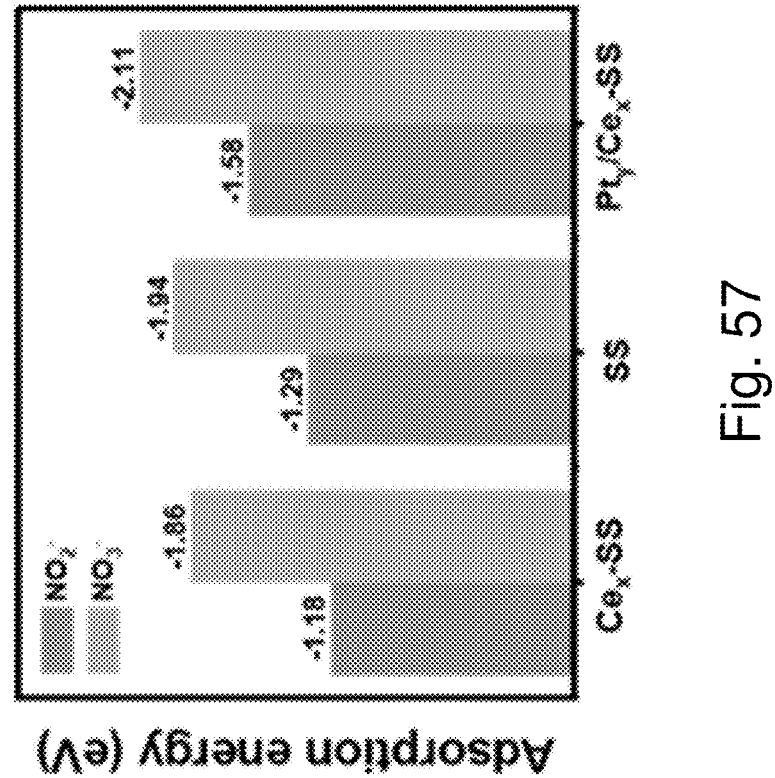
FIG. 57 shows the calculated adsorption energies of $NO_3^-$ and $NO_2^-$ on SS, $Ce_x$—SS, and $Pt_y/Ce_x$—SS models.

Furthermore, $Ce_x$—SS, SS, and $Pt_y/Ce_x$—SS with gradually compressed interlayer spacing reveal promoted absorption energy (ΔE) of $NO_3^-$ and $NO_2^-$, suggesting the enhanced chemical affinity towards $NO_3^-$ and $NO_2^-$ and further prove the reliable effect of interlayer spacing regulation (FIG. 57). It is also noted that the $\Delta E_{NO2-}$ of $Pt_y/Ce_x$—SS reaches −1.58 eV, while that for $Ce_x$—SS only has a value of −1.18 eV. The stronger absorption of $NO_2^-$ inhibits the generation of $HNO_2$ by-product and can facilitate the following conversion of $NO_2^-$—$NH_3$, which is consistent with the experimental results and plays a decisive role in the improvement of $eNO_3RR$ (FIG. 46).

Figure 58A:
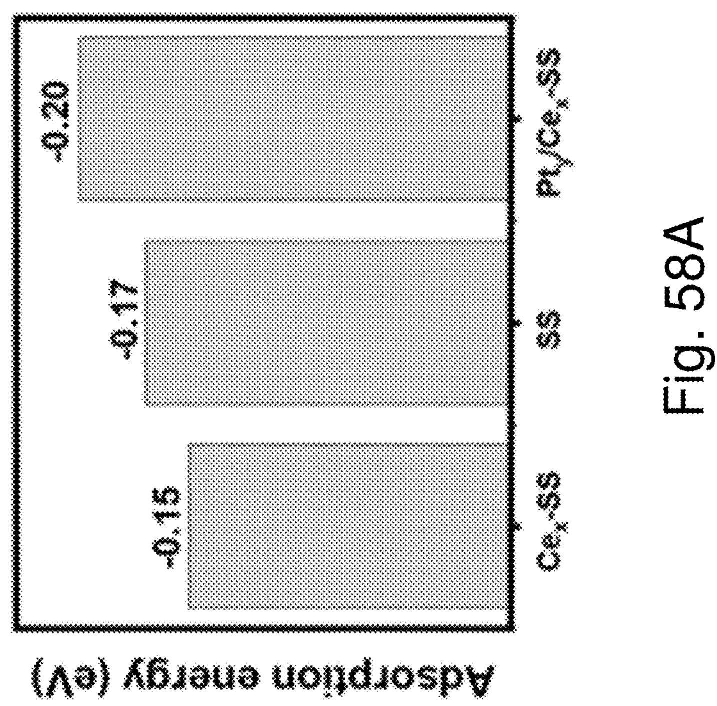
FIG. 58A shows the calculated adsorption energies of $H_2O$.
Figure 58B:
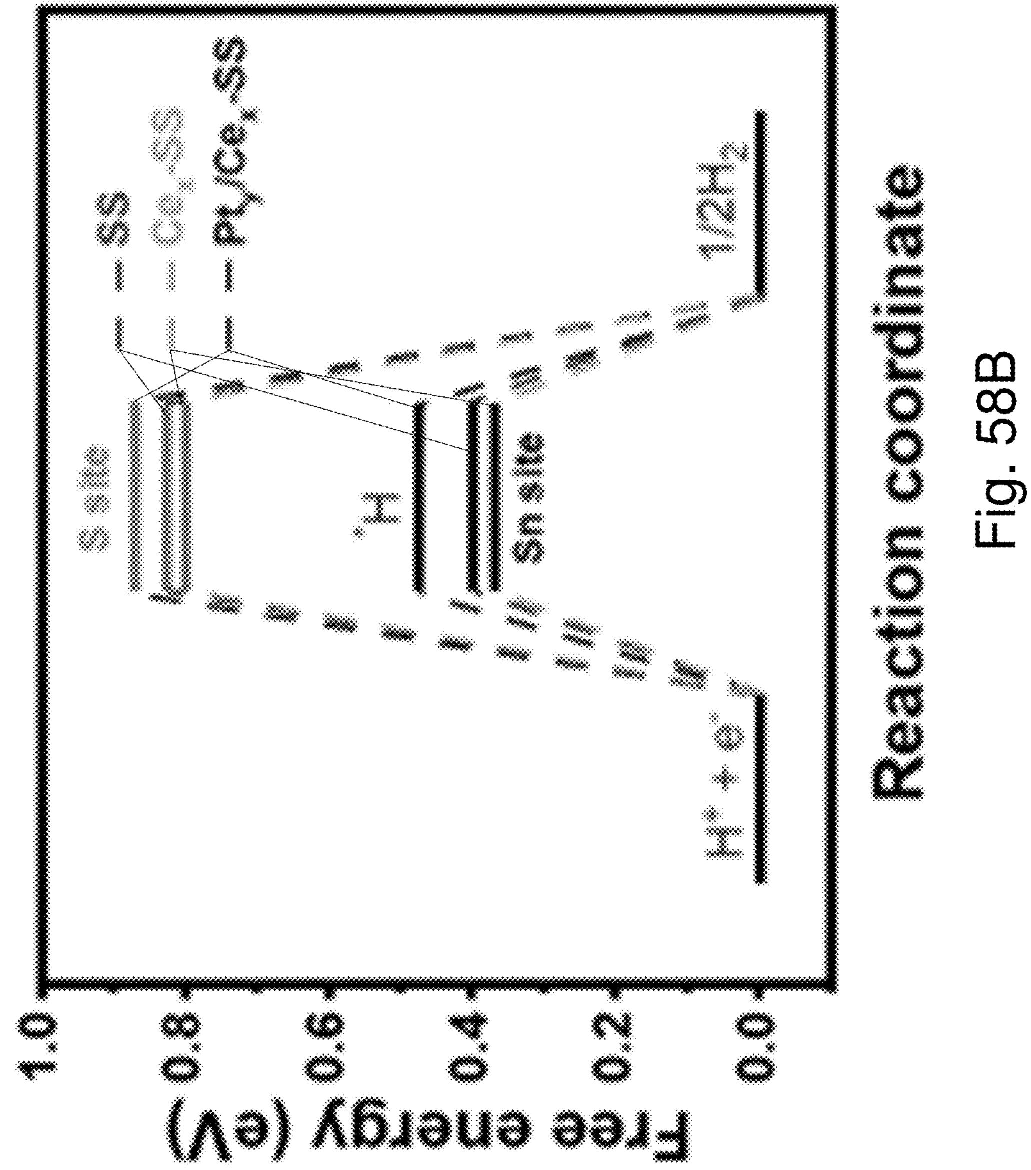
FIG. 58B shows the Gibbs free energy diagram for HER on Sn sites or S sites over SS, $Ce_x$—SS, and $Pt_y/Ce_x$—SS models.

To evaluate the HER performance on the catalysts, the absorption energy of $H_2O$ and Gibbs adsorption free energies (ΔG) of *H is computed (FIGS. 58A and 58B). In particular, all the binding energies of $H_2O$ are much weaker than that of $NO_3^-$ and $NO_2^-$ in each sample, ensuring the strong interaction of $NO_3^-$ and $NO_2^-$ for their further reduction. Also, no matter whether on Sn or S site, the calculated $\Delta G_{H+}$ on $Pt_y/Ce_x$—SS is much higher than that on SS and $Ce_x$—SS, and all the $\Delta G_{H+}$ are positive values, demonstrating the obstructive HER activity. Overall, assisted by the diatomic Pt—Ce pairs, the SS NS with compressed interlayer spacing leads to the delocalization of p-orbital electrons, and such delocalized electrons enhance the chemical affinity between catalytic sites and $NO_3^-$ and $NO_2^-$ reactants. Additionally, the compressed interlayer spacing increases the $\Delta G_{H*}$ and thus inhibits the unwanted HER activity. Consequently, these are the origin of the remarkable performance of the $Pt_{0.9}/Ce_{0.5}$—SS for $eNO_3RR$.

Figure 59:
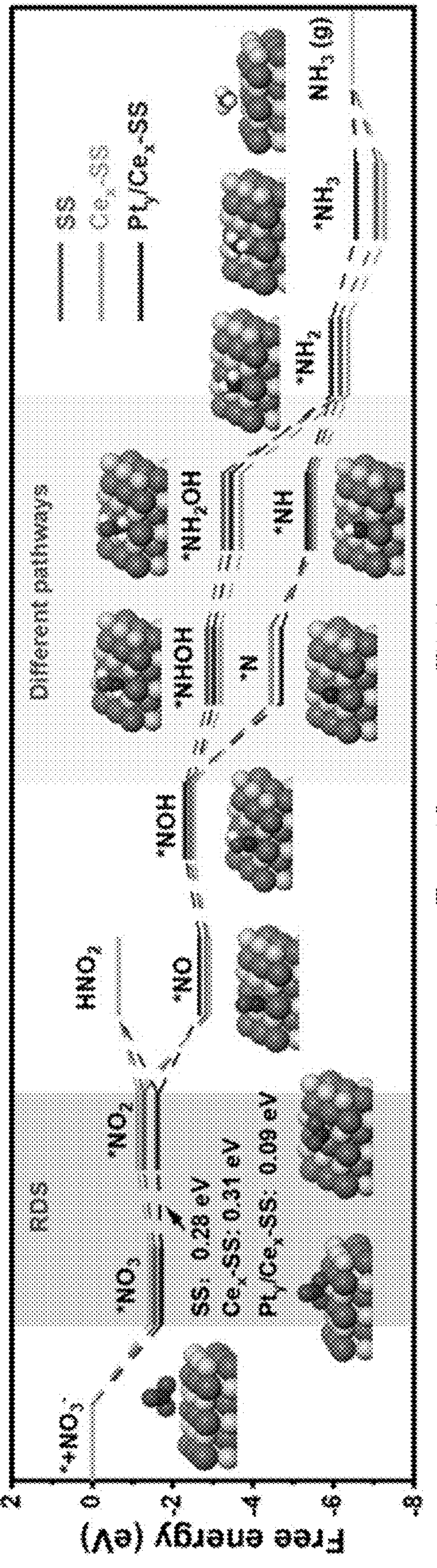
FIG. 59 shows the Gibbs free energy diagram of various intermediates generated during $eNO_3RR$ pathways over SS, $Ce_x$—SS, and $Pt_y/Ce_x$—SS models. The insets are the structural models that represent the adsorption form of various intermediates on $Pt_y/Ce_x$—SS during $eNO_3RR$. The azure, mauve, red, blue, and white balls refer to S, Sn, O, N and H atoms.
Figure 60:
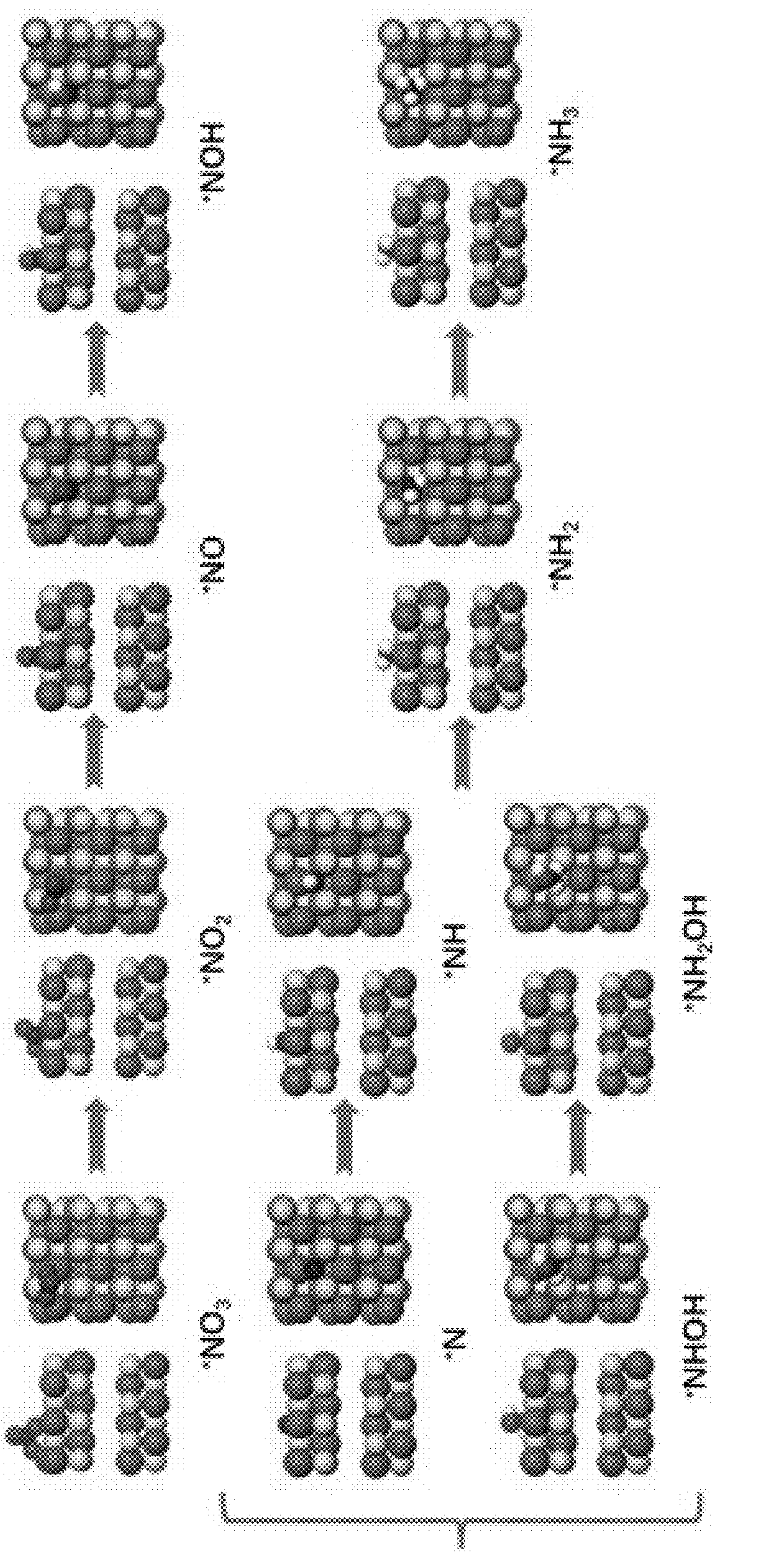
FIG. 60 shows the front- and top-view of structural models of adsorbed various intermediates during $eNO_3RR$ on SS NS. The azure, mauve, red, blue, and white balls refer to S, Sn, O, N and H atoms.
Figure 61:
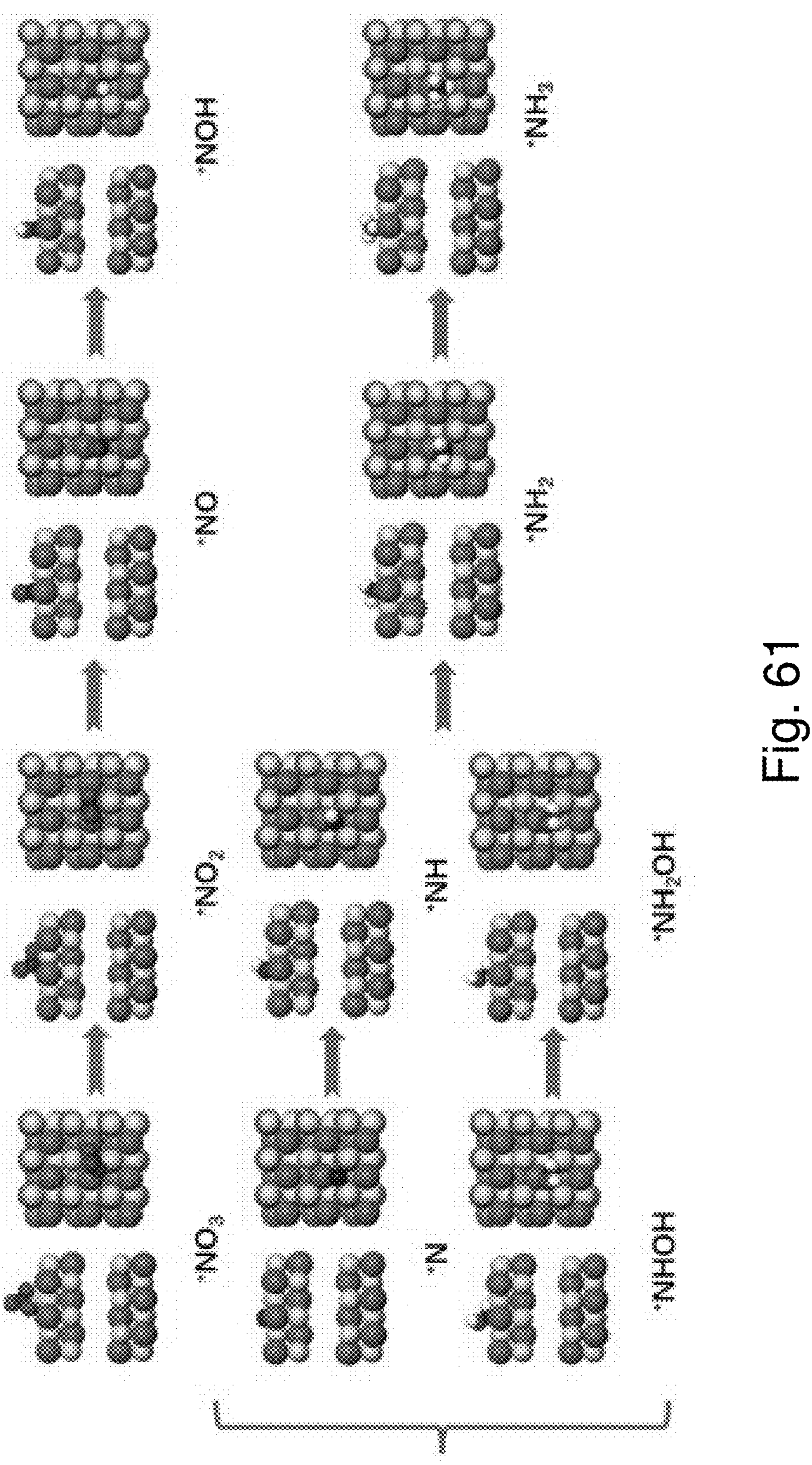
FIG. 61 shows the front- and top-view of structural models of adsorbed various intermediates during $eNO_3RR$ on $Ce_x$—SS. The azure, mauve, gray, red, blue, and white balls refer to S, Sn, Ce, O, N and H atoms.
Figure 62:
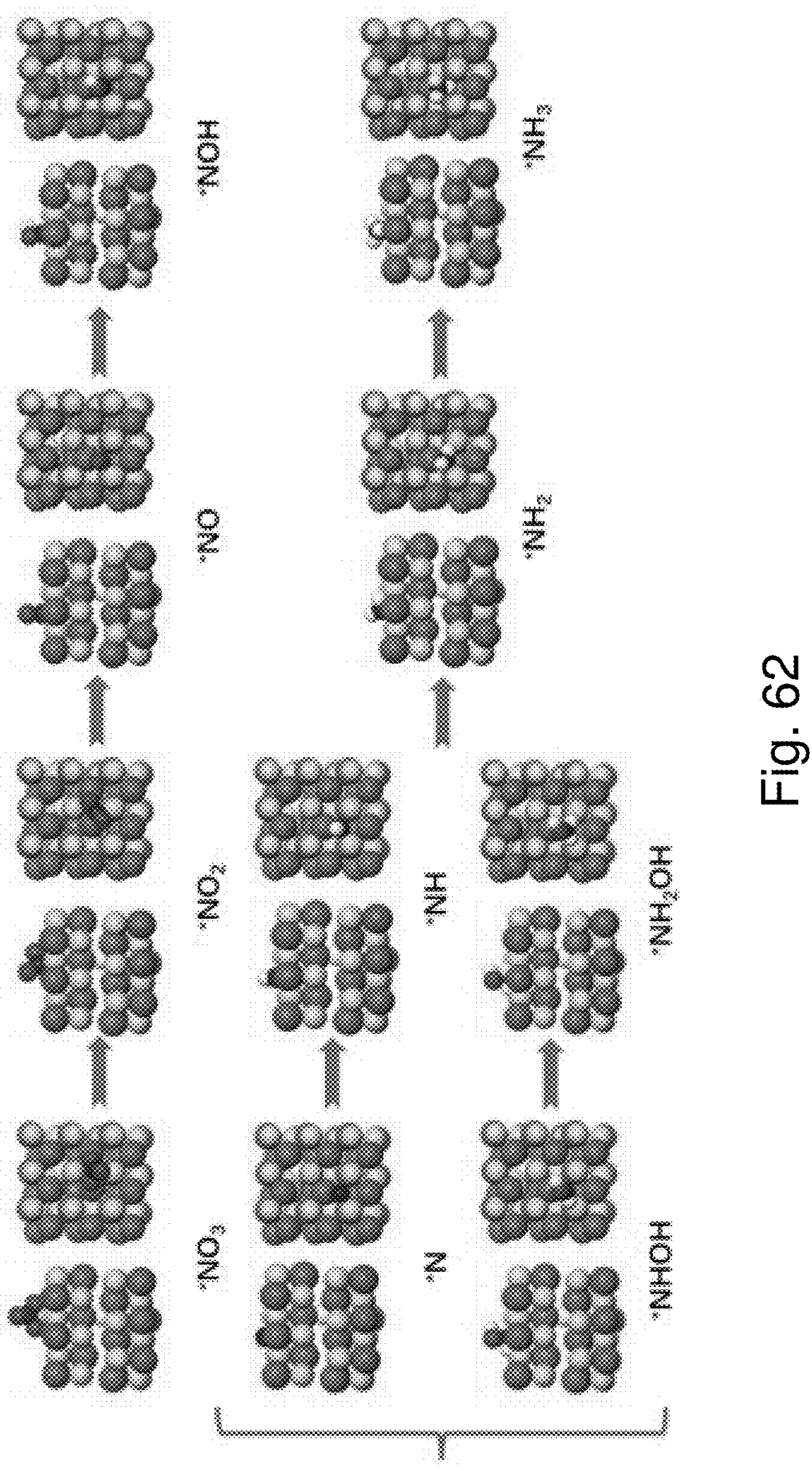
FIG. 62 shows the front- and top-view of structural models of adsorbed various intermediates during $eNO_3RR$ on $Pt_y/Ce_x$—SS. The azure, mauve, gray, off-white, red, blue, and white balls refer to S, Sn, Ce, Pt, O, N and H atoms.

Based on the DFT calculation, the possible reaction pathways is proposed and the corresponding ΔG of each intermediate over $Ce_x$—SS. SS, and $Pt_y/Ce_x$—SS models is calculated (FIGS. 59-62). Generally, the $eNO_3RR$ process includes the adsorption of $NO_3^-$, deoxygenation, hydrogenation, and the desorption of $NH_3$. For the hydrogenation, two possible pathways are proposed, i.e., *NOH→*NHOH→*$NH_2OH$ and *NOH→*N→*NH. As depicted in FIG. 59, the downward trend from $NO_3^-$ to *$NO_3$ suggests an energetically favorable reaction. However, in the following *$NO_3$→*$NO_2$, $Pt_y/Ce_x$—SS involve an uphill free energy increment (+0.09 eV), and those for SS and $Ce_x$—SS are +0.28 eV and +0.31 eV, respectively. These upward thermodynamic changes reveal this system's rate-determine step (RDS).

The stark contrast from $Pt_y/Ce_x$—SS to SS and $Ce_x$—SS indicates the promotion of RDS thermodynamically by the interlayer spacing regulation. Further, it theoretically gives the origin of the remarkable performance of $Pt_{0.9}/Ce_{0.5}$—SS. Moreover, the higher ΔG of $Pt_y/Ce_x$—SS for producing $HNO_2$ demonstrates the difficulty in desorbing *$NO_2$. Subsequently, due to the unfavorable hydrogen absorption over the catalysts, the protonation of *NO→*NOH requires energy uphill again. Overall, the higher $NO_3^-$ →*$NO_3$ but lower *$NO_2$→$NO_2^-$ energy change and the facilitated RDS (*$NO_3$→*$NO_2$) sufficiently illustrate that the interlayer spacing regulation strategy can effectively facilitate the conversion from $NO_3^-$ to $NH_3$ for both activity and selectivity.

The invention has been given by way of example only, and various other modifications of and/or alterations to the described embodiment may be made by persons skilled in the art without departing from the scope of the invention as specified in the appended claims.

The invention claimed is:

1. A catalyst in ammonia synthesis comprising:

a first layer of metal monochalcogenide-based material;

a second layer of metal monochalcogenide-based material stacked with and is spaced from the first layer of metal monochalcogenide-based material by a separation distance;

wherein the metal monochalcogenide-based material includes SnS; the metal monochalcogenide-based material is doped by a lanthanide atom; the first and second layers of metal monochalcogenide-based material are intercalated by a metal intercalating atom that covalently bonds the first and second layers of metal monochalcogenide-based material at a bonding site, the metal intercalating atom being a transition metal atom.

2. The catalyst as claimed in claim 1, wherein the lanthanide atom is Ce.

3. The catalyst as claimed in claim 1, wherein intercalated first and second layers of metal monochalcogenide-based material has a general formula of $A_y/B_x$–MX, A is the intercalating metal atom, B is the lanthanide atom and MX represents the first and second layers of metal monochalcogenide-based material.

4. The catalyst as claimed in claim 3, wherein MX is SnS, B is Ce and A is Pt.

5. The catalyst as claimed in claim 3, wherein y is about 0.3 at. % to about 1.2 at. % and x is about 0.1 at. % to about 1 at. %.

6. The catalyst as claimed in claim 1, wherein the separation distance is about 5.220±0.031 Å to about 5.697±0.025 Å.

7. The catalyst as claimed in claim 3, wherein the intercalated first and second layers of metal monochalcogenide-based material is $Pt_{0.9}/Ce_{0.5}$—SnS.

8. The catalyst as claimed in claim 7, wherein the separation distance is about 5.434±0.025 Å.

9. The catalyst as claimed in claim 7, wherein the catalyst has a Faradaic efficiency of ammonia of about 94.12% and a yield rate of about 0.3056 mmol $cm^{-2}$ $h^{-1}$ for ammonia at −0.5 V vs. RHE.

10. A method of preparing the catalyst as claimed in claim 1, comprising the steps of:

a) forming a two-dimensional metal dichalcogenide-based material by a hydrothermal process;

b) introducing a trivalent cation of a lanthanide atom to form a doped two-dimensional metal dichalcogenide-based material; and c) converting the doped two dimensional metal dichalcogenide-based material to a doped two dimensional metal monochalcogenide-based material by way of electrochemical reduction.

11. The method as claimed in claim 10 further comprising the step of:

b1) performing electrochemical intercalation of a metal atom after step b).

12. The method as claimed in claim 11, wherein the step b1) and step c) are conducted simultaneously.

13. The method in claim 10, wherein the step a) and the step b) are conducted simultaneously during the hydrothermal process.

14. The method as claimed in claim 10, wherein the two-dimensional metal dichalcogenide-based material is $SnS_2$, the lanthanide atom is Ce and the doped two-dimensional metal monochalcogenide-based material is $Ce_xSnS$, x is about 0.1 at. % to about 1 at. %.

15. The method as claimed in claim 11, wherein the metal atom is Pt, the doped two-dimensional metal monochalcogenide-based material is $Pt_y/Ce_x$—SnS, x is about 0.1 at. % to about 1 at. %, and y is about 0.3 at. % to about 1.2 at. %.

16. An electrochemical ammonia synthesizing device, comprising:

an anode including a carbon-based anode material;

a cathode including the catalyst as claimed in claim 1; and an electrolyte including a nitrate source in electrical communication with the anode and the cathode;

wherein the electrolyte has a pH of about 11.5.

* * * * *